US012640082B2

(12) United States Patent
Jo et al.

(10) Patent No.: US 12,640,082 B2
(45) Date of Patent: May 26, 2026

(54) DISPLAY DEVICE

(71) Applicant: Samsung Display Co., LTD., Yongin-si (KR)

(72) Inventors: Jun Young Jo, Yongin-si (KR); Sang Won Seok, Yongin-si (KR); Seung Woo Sung, Yongin-si (KR); Na Ra On, Yongin-si (KR); Dong Eup Lee, Yongin-si (KR); Yun Kyeong In, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/229,104

(22) Filed: Aug. 1, 2023

(65) Prior Publication Data

US 2024/0054940 A1 Feb. 15, 2024

(30) Foreign Application Priority Data

Aug. 12, 2022 (KR) ........................ 10-2022-0101575
Apr. 25, 2023 (KR) ........................ 10-2023-0054205

(51) Int. Cl.
*G09G 3/298* (2013.01)
*G09G 3/20* (2006.01)
*G09G 3/3233* (2016.01)

(52) U.S. Cl.
CPC ......... *G09G 3/2983* (2013.01); *G09G 3/2074* (2013.01); *G09G 3/3233* (2013.01);
(Continued)

(58) Field of Classification Search
CPC ..... H10K 59/121; H10K 59/123; H10K 59/88
See application file for complete search history.

(56) References Cited

U.S. PATENT DOCUMENTS

2006/0102902 A1* 5/2006 Lee ..................... H01L 27/1296 257/E27.111
2007/0234152 A1* 10/2007 Kwon .................. G09G 3/3233 714/726

(Continued)

FOREIGN PATENT DOCUMENTS

| | | | |
|---|---|---|---|
| CN | 112038373 | A | 12/2020 |
| KR | 2021-0055850 | A | 5/2021 |
| WO | WO 2022/095236 | A1 | 5/2022 |

OTHER PUBLICATIONS

EPO Extended European Search Report dated Jan. 5, 2024, issued in European Patent Application No. 23190324.6 (12 pages).

*Primary Examiner* — Bipin Gyawali
(74) *Attorney, Agent, or Firm* — Womble Bond Dickinson (US) LLP

(57) ABSTRACT

A display device includes: a main display area and a sub-display area having a plurality of transmission parts; a plurality of main pixel electrodes; a plurality of sub-pixel electrodes and a plurality of dummy electrodes in the sub-display area, the dummy electrodes being electrically connected to any one of the main pixel electrodes; and a plurality of connection electrodes connecting any one of the plurality of main pixel electrodes and any one of the plurality of dummy pixel electrodes to each other, wherein the sub-display area includes a first sub-display area having the transmission parts and the sub-pixel electrodes and a second sub-display area having the sub-pixel electrodes and the dummy pixel electrodes, and at least portions of the plurality of connection electrodes are between the dummy pixel electrodes adjacent to each other or between the dummy pixel electrode and the main pixel electrode adjacent to the dummy pixel electrode.

19 Claims, 27 Drawing Sheets

(52) U.S. Cl.
CPC . *G09G 2300/02* (2013.01); *G09G 2300/0413* (2013.01); *G09G 2300/0452* (2013.01)

(56) References Cited

U.S. PATENT DOCUMENTS

| | | | | |
|---|---|---|---|---|
| 2019/0051708 | A1* | 2/2019 | Jeong | H10K 59/88 |
| 2021/0183983 | A1* | 6/2021 | Bang | H10K 59/122 |
| 2021/0202588 | A1 | 7/2021 | Cho et al. | |
| 2021/0210584 | A1 | 7/2021 | Youn et al. | |
| 2022/0069028 | A1 | 3/2022 | Jang et al. | |
| 2022/0310743 | A1 | 9/2022 | Yi et al. | |
| 2023/0169900 | A1* | 6/2023 | Han | G09G 3/3233 345/206 |
| 2023/0290807 | A1* | 9/2023 | Song | H10H 29/142 |
| 2023/0354680 | A1* | 11/2023 | Li | H10K 59/131 |
| 2023/0363229 | A1* | 11/2023 | Jo | H10K 59/353 |
| 2024/0144873 | A1* | 5/2024 | Huang | G09G 3/3233 |
| 2024/0257730 | A1* | 8/2024 | Liu | H10K 59/1201 |
| 2024/0276798 | A1* | 8/2024 | Liu | H10K 50/865 |
| 2024/0361656 | A1* | 10/2024 | Sugimoto | G02F 1/13629 |
| 2024/0397762 | A1* | 11/2024 | Chen | H10K 59/131 |
| 2025/0006122 | A1* | 1/2025 | Zhang | G09G 3/3208 |
| 2025/0008773 | A1* | 1/2025 | Lu | H10K 59/1201 |

* cited by examiner

DISPLAY DEVICE

CROSS-REFERENCE TO RELATED APPLICATIONS

The present application claims priority to and the benefit of Korean Patent Application No. 10-2022-0101575 filed on Aug. 12, 2022, and Korean Patent Application No. 10-2023-0054205 filed on Apr. 25, 2023 in the Korean Intellectual Property Office, the entire content of each of which is incorporated herein by reference.

BACKGROUND

1. Field

Aspects of some embodiments of the disclosure relate to a display device.

2. Description of the Related Art

As the information society develops, the demand for display devices for displaying images has increased and various uses and applications for display devices has diversified. For example, display devices have been applied to various electronic devices such as smartphones, digital cameras, laptop computers, navigation devices, and smart televisions. The display devices may be flat panel display devices such as liquid crystal display devices, field emission display devices, or organic light emitting display devices. Among such flat panel display devices, a light emitting display device may display images without a backlight unit providing light to a display panel because each of the pixels of the display panel may include light emitting elements that may emit light by themselves.

The display device may further include pixels emitting predetermined colors of light in response to data signals, scan lines, data lines, and power lines for driving the pixels, a scan driver outputting scan signals to the scan lines, and a display driver outputting data voltages to the data lines.

The above information disclosed in this Background section is only for enhancement of understanding of the background and therefore the information discussed in this Background section does not necessarily constitute prior art.

SUMMARY

Aspects of some embodiments of the present disclosure include a display device that may be capable of preventing or reducing the visibility of a boundary between different emission areas and has a relatively low feeing of distinguishment between different areas within a display area.

However, aspects of embodiments according to the present disclosure are not restricted to those specifically set forth herein. The above and other aspects of embodiments according to the present disclosure will become more apparent to one of ordinary skill in the art to which the disclosure pertains by referencing the detailed description of the disclosure given below.

According to some embodiments of the present disclosure, a display device includes a main display area and a sub-display area which is surrounded by the main display area and in which a plurality of transmission parts are located, a plurality of main pixel electrodes in the main display area, a plurality of sub-pixel electrodes in the sub-display area and a plurality of dummy pixel electrodes in the sub-display area and electrically connected to any one of the main pixel electrodes, respectively, and a plurality of connection electrodes connecting any one of the plurality of main pixel electrodes and any one of the plurality of dummy pixel electrodes to each other, respectively, wherein the sub-display area includes a first sub-display area in which the transmission parts and the sub-pixel electrodes are located and a second sub-display area which surrounds the first sub-display area and in which the sub-pixel electrodes and the dummy pixel electrodes are located, and at least portions of the plurality of connection electrodes are between the dummy pixel electrodes adjacent to each other or between the dummy pixel electrode and the main pixel electrode adjacent to the dummy pixel electrode.

According to some embodiments, an interval between the main pixel electrodes adjacent to each other and an interval between the dummy pixel electrodes adjacent to each other may be greater than an interval between the dummy pixel electrode and the other connection electrode that is not connected to the dummy pixel electrode.

According to some embodiments, an arrangement in which the plurality of main pixel electrodes and the plurality of dummy pixel electrodes may be spaced apart from each other is different from an arrangement in which the plurality of sub-pixel electrodes are spaced apart from each other.

According to some embodiments, the plurality of main pixel electrodes may overlap a pixel circuit unit electrically connected to the main pixel electrodes, the plurality of sub-pixel electrodes may be arranged to overlap a sub-pixel circuit unit electrically connected to the sub-pixel electrodes, and the dummy pixel electrodes may do not overlap the pixel circuit unit and the sub-pixel circuit unit.

According to some embodiments, the main pixel electrodes may include a first main pixel electrode of a light emitting element emitting light of a first color and a second main pixel electrode of a light emitting element emitting light of a second color different from the first color, the dummy pixel electrodes may include a first dummy pixel electrode connected to the first main pixel electrode and in a light emitting element emitting the light of the first color and a second dummy pixel electrode connected to the second main pixel electrode and in a light emitting element emitting the light of the second color, and an interval between the first main pixel electrode and the first dummy pixel electrode may be greater than an interval between the first main pixel electrode and the second dummy pixel electrode.

According to some embodiments, the sub-pixel electrodes may include a first sub-pixel electrode of a light emitting element emitting the light of the first color and a second sub-pixel electrode of a light emitting element emitting the light of the second color, and an interval between the first sub-pixel electrode and the first dummy pixel electrode may be greater than an interval between the second sub-pixel electrode and the first dummy pixel electrode.

According to some embodiments, the main pixel electrodes may include a first main pixel electrode, a second main pixel electrode, and a third main pixel electrode spaced apart from the first main pixel electrode in a first direction, the dummy pixel electrodes may include a first dummy pixel electrode spaced apart from the third main pixel electrode in a second direction and connected to the first main pixel electrode through a first connection electrode and a second dummy pixel electrode spaced apart from the second main pixel electrode in the second direction and connected to the second main pixel electrode through a second connection electrode, and the first connection electrode may be spaced apart from the second dummy pixel electrode in the second direction.

According to some embodiments, the second connection electrode may be between the first main pixel electrode and the third dummy pixel electrode.

According to some embodiments, the dummy pixel electrodes may further include a third dummy pixel electrode spaced apart from the first main pixel electrode in the second direction and connected to the third main pixel electrode through a third connection electrode, and the third connection electrode may surround the first dummy pixel electrode.

According to some embodiments, a dummy pixel electrode adjacent to a boundary at one side of the first sub-display area in the first direction among boundaries between the first sub-display area and the second sub-display area and a dummy pixel electrode adjacent to a boundary at the other side of the first sub-display area in the first direction among the boundaries between the first sub-display area and the second sub-display area may be different from each other.

According to some embodiments, the plurality of main pixel electrodes may include a plurality of connected pixel electrodes electrically connected to the dummy pixel electrodes and a plurality of independent pixel electrodes that are not connected to the dummy pixel electrodes, and a channel region of a first transistor of a pixel circuit unit electrically connected to the independent pixel electrode may have a length different from that of a channel region of a first transistor of a pixel circuit unit electrically connected to the connected pixel electrode.

According to some embodiments, the connected pixel electrodes may surround the sub-display area, and the independent pixel electrodes surround the connected pixel electrodes.

According to some embodiments, the sub-display area may include a plurality of sub-pixels including the sub-pixel electrodes, and any one of the transmission parts may be between the plurality of sub-pixels spaced apart from each other in one direction.

According to some embodiments, the transmission parts may include first transmission parts within the first sub-display area and second transmission parts formed to be in contact with the second sub-display area at a boundary between the first sub-display area and the second sub-display area, and an area of the first transmission part may be greater than an area of the second transmission part.

According to some embodiments of the present disclosure, a display device comprises a substrate including a main display area and a sub-display area which is surrounded by the main display area and in which a plurality of transmission parts are located, a thin film transistor layer including a pixel circuit unit in the main display area on the substrate, a sub-pixel circuit unit not to overlapping the transmission parts in the sub-display area on the substrate, and a via layer on the pixel circuit unit and the sub-pixel circuit unit, a plurality of main pixel electrodes on the via layer and spaced apart from each other in the main display area, a plurality of sub-pixel electrodes and a plurality of dummy pixel electrodes on the via layer and spaced apart from each other in the sub-display area and a plurality of connection electrodes electrically connected to any one of the plurality of dummy pixel electrodes and any one of the plurality of main pixel electrodes, respectively, a plurality of light emitting layers on the main pixel electrodes, the sub-pixel electrodes, and the dummy pixel electrodes, respectively, and a common electrode on the plurality of light emitting layers, wherein the main pixel electrodes overlap the pixel circuit unit, the sub-pixel electrodes overlap the sub-pixel circuit unit, and the dummy pixel electrodes do not overlap the pixel circuit unit and the sub-pixel circuit unit.

According to some embodiments, the thin film transistor layer may further include a lower metal layer on the substrate, a buffer layer on the lower metal layer, a first semiconductor layer on the buffer layer, a gate insulating layer on the first semiconductor layer, a gate conductive layer on the gate insulating layer, an interlayer insulating layer on the gate conductive layer, and a data conductive layer on the interlayer insulating layer, and the via layer is on the data conductive layer.

According to some embodiments, the lower metal layer may overlap the pixel circuit unit and the sub-pixel circuit unit, and do not overlap the transmission parts.

According to some embodiments, the first semiconductor layer, the gate insulating layer, the gate conductive layer, the interlayer insulating layer, and the data conductive layer may not be in the transmission part, but only a portion of the via layer is in the transmission part.

According to some embodiments, the sub-display area may include a first sub-display area in which the sub-pixel electrodes and the transmission parts are located and a second sub-display area which surrounds the first sub-display area and in which the sub-pixel electrodes and the dummy pixel electrodes are located, and the dummy pixel electrodes may surround the first sub-display area.

According to some embodiments, the thin film transistor layer may include a lower metal layer on the substrate and including a plurality of opening patterns formed to overlap the transmission parts, and the transmission parts may include first transmission parts within the first sub-display area and second transmission parts formed to be in contact with the second sub-display area and having a smaller area than the first transmission parts.

According to some embodiments, a display device may prevent or reduce visibility of a boundary between two display areas having emission areas having different densities by further including additional light emitting elements between different display areas.

The characteristics of embodiments according to the present disclosure are not limited to the aforementioned characteristics, and various other characteristics are included in the specification.

BRIEF DESCRIPTION OF THE DRAWINGS

The above and other aspects and features of embodiments according to the present disclosure will become more apparent by describing in more detail aspects of some embodiments thereof with reference to the attached drawings, in which.

DETAILED DESCRIPTION

Hereinafter, aspects of some embodiments will be described in more detail with reference to the accompanying drawings.

Figure 1:
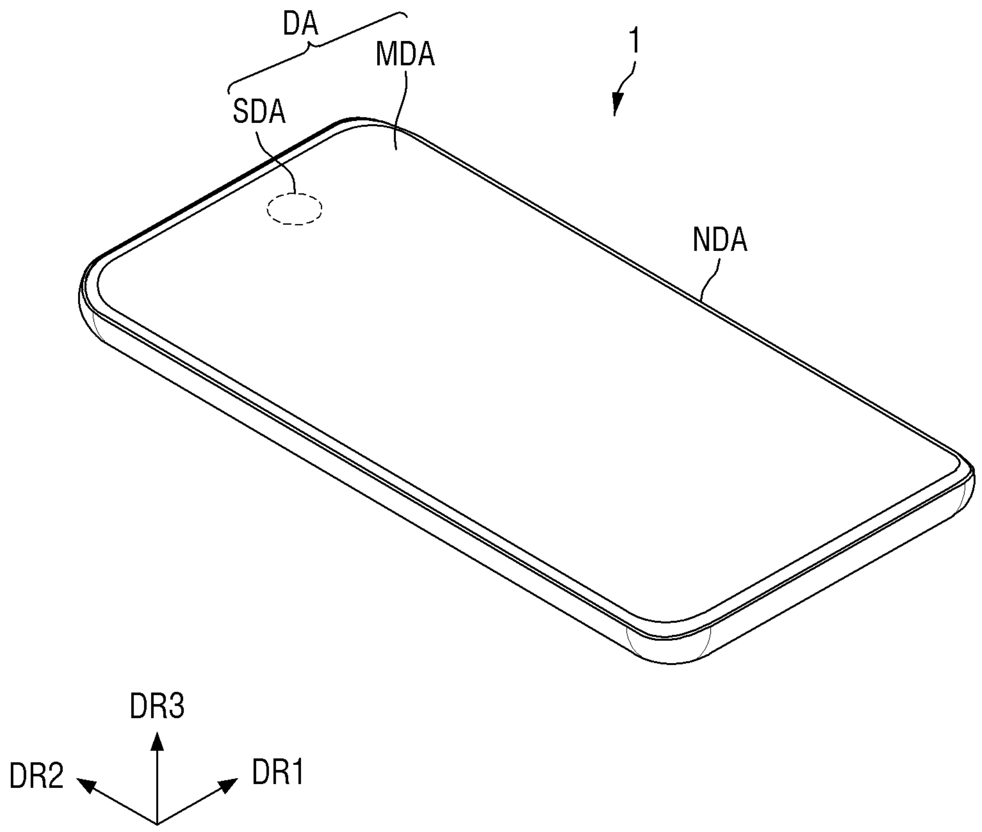
FIG. 1 is a schematic perspective view of an electronic device according to some embodiments.

FIG. 1 is a perspective view illustrating an electronic device according to some embodiments.

Referring to FIG. 1, an electronic device 1 displays a moving image (e.g., a video image) or a still image (e.g., a static image). The electronic device 1 may refer to all electronic devices that provide display screens. For example, televisions, laptop computers, monitors, billboards, the Internet of Things (IoT), mobile phones, smartphones, tablet personal computers (PCs), electronic watches, smart watches, watch phones, head mounted displays, mobile communication terminals, electronic notebooks, electronic books, portable multimedia players (PMPs), navigation devices, game machines, digital cameras, camcorders, and the like, which provide display screens, may be included in the electronic device 1.

The electronic device 1 may include a display device 10 (see FIG. 2) providing a display screen. Examples of the display device may include an inorganic light emitting diode display device, an organic light emitting display device, a quantum dot light emitting display device, a plasma display device, a field emission display device, and the like. Hereinafter, a case where an inorganic light emitting diode display device is applied as an example of the display device will be described by way of example, but embodiments according to the present disclosure are not limited thereto, and the same technical spirit may be applied to other display devices if applicable.

A shape of the electronic device 1 may be variously modified. For example, the electronic device 1 may have a shape such as a rectangular shape with a width greater than a length, a rectangular shape with a length greater than a width, a square shape, a rectangular shape with rounded corners (vertices), other polygonal shapes, or a circular shape. A shape of a display area DA of the electronic device 1 may also be similar to an overall shape of the electronic device 1. In FIG. 1, the electronic device 1 having a rectangular shape with a great length in a second direction DR2 has been illustrated. Additionally, the electronic device 1 may be capable of being folded or bent, according to some embodiments.

The electronic device 1 may include a display area DA and a non-display area NDA. The display area DA is an area at which images may be displayed, and the non-display area NDA is an area at which images are not capable of being displayed. The display area DA may also be referred to as an active area, and the non-display area NDA may also be referred to as a non-active area. The display area DA may occupy substantially the center of the electronic device 1, with the non-display area NDA surrounding (e.g., in a periphery or outside a footprint of) the display area DA.

The display area DA may include a main display area MDA and a sub-display area SDA. The sub-display area SDA is an area in which components for adding various functions to the electronic device 1 are located, and may correspond to a component area. For example, the components located in the sub-display area SDA may include sensors, lights, speakers, and the like, and one or more pixels may further be located in the sub-display area SDA as described in more detail below.

Figure 2:
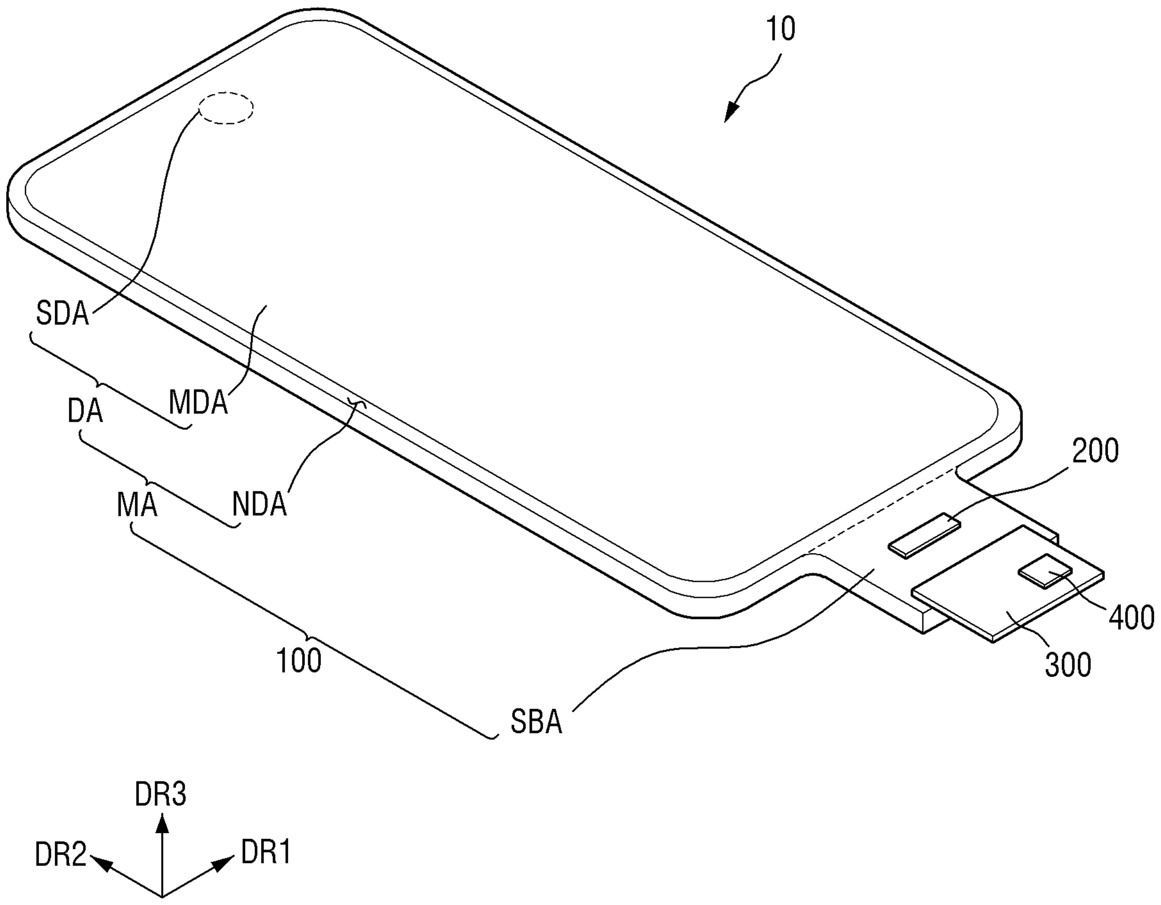
FIG. 2 is a perspective view of a display device included in the electronic device according to some embodiments.
Figure 3:
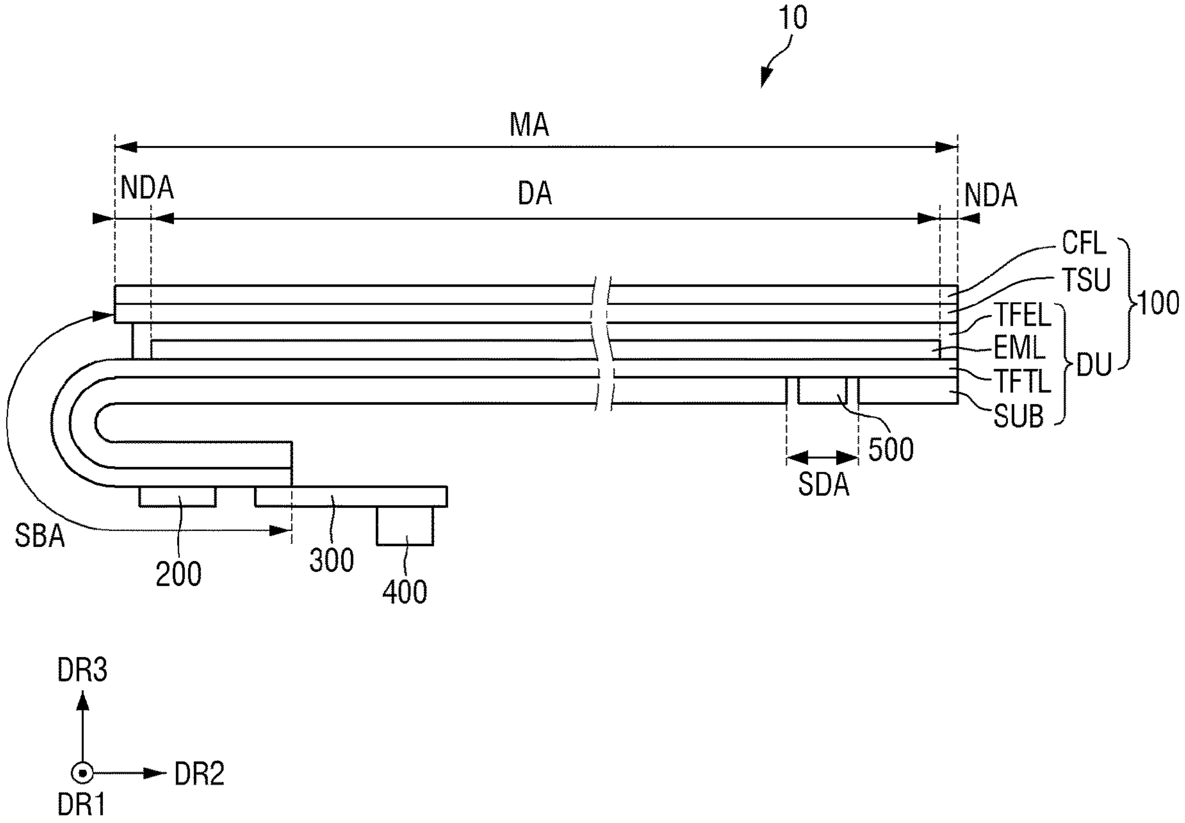
FIG. 3 is a cross-sectional view of the display device of FIG. 2 viewed from the side according to some embodiments.

FIG. 2 is a perspective view of a display device included in the electronic device according to some embodiments. FIG. 3 is a cross-sectional view of the display device of FIG. 2 viewed from the side according to some embodiments. FIG. 2 illustrates a state in which a sub-area SBA of the display device 10 included in the electronic device 1 is not bent and is unbent. FIG. 3 illustrates that the sub-area SBA of the display device 10 is bent to a lower surface of the display device 10.

Referring to FIGS. 2 and 3, the electronic device 1 according to some embodiments may include the display device 10. The display device 10 may provide a screen displayed by the electronic device 1. The display device 10 may have a shape similar to that of the electronic device 1 in a plan view. For example, the display device 10 may have a shape similar to a rectangular shape having short sides in a first direction DR1 and long sides in the second direction DR2. A corner where the short side in the first direction DR1 and the long side in the second direction DR2 meet may be rounded with a curvature, but is not limited thereto, and may also be right-angled. The shape of the display device 10 in a plan view is not limited to the rectangular shape, and may be a shape similar to other polygonal shapes, a circular shape, or an elliptical shape.

The display device 10 may include a display panel 100, a display driver 200, a circuit board 300, and a touch driver 400.

The display panel 100 may include a main area MA and a sub-area SBA.

The main area MA may include a display area DA including pixels displaying an image and a non-display area NDA arranged around the display area DA. The display area DA may include a main display area MDA and a sub-display area SDA. The display area DA may emit light from a plurality of emission areas or a plurality of opening areas. For example, the display panel 100 may include pixel circuits including switching elements, a pixel defining film defining the emission areas or the opening areas, and self-light emitting elements.

For example, the self-light emitting element may include at least one of an organic light emitting diode (LED) including an organic light emitting layer, a quantum dot LED including a quantum dot light emitting layer, an inorganic LED including an inorganic semiconductor, or a micro LED, but embodiments according to the present disclosure are not limited thereto.

The non-display area NDA may be an area outside the display area DA. The non-display area NDA may be defined as an edge area of the main area MA of the display panel 100. The non-display area NDA may include a gate driver supplying gate signals to gate lines, and fan-out lines connecting the display driver 200 and the display area DA to each other.

The sub-area SBA may be an area extending from one side of the main area MA. The sub-area SBA may include a flexible material that may be bent, folded, and rolled. For example, when the sub-area SBA is bent, the sub-area SBA may overlap the main area MA in a thickness direction (third direction DR3). The sub-area SBA may include the display driver 200 and pad parts connected to the circuit board 300. According to some embodiments, the sub-area SBA may be omitted, and the display driver 200 and the pad parts may be located in the non-display area NDA.

The display driver 200 may output signals and voltages for driving the display panel 100. The display driver 200 may supply data voltages to data lines. The display driver 200 may supply source voltages to power lines and supply gate control signals to the gate driver. The display driver 200 may be formed as an integrated circuit (IC) and be mounted on the display panel 100 in a chip on glass (COG) manner, a chip on plastic (COP) manner, or an ultrasonic bonding manner. As an example, the display driver 200 may be located in the sub-area SBA, and may overlap the main area MA in the thickness direction by bending of the sub-area SBA. As another example, the display driver 200 may be mounted on the circuit board 300.

The circuit board 300 may be attached onto the pad parts of the display panel 100 using an anisotropic conductive film (ACF). Lead lines of the circuit board 300 may be electrically connected to the pad parts of the display panel 100. The circuit board 300 may be a flexible printed circuit board, a printed circuit board, or a flexible film such as a chip on film.

The touch driver 400 may be mounted on the circuit board 300. The touch driver 400 may be connected to a touch sensing unit of the display panel 100. The touch driver 400 may supply touch driving signals to a plurality of touch electrodes of the touch sensing unit and sense change amounts in capacitance between the plurality of touch electrodes. For example, the touch driving signal may be a pulse signal having a predetermined frequency. The touch driver 400 may decide whether or not an input has occurred and calculate input coordinates, based on the change amounts in capacitance between the plurality of touch electrodes. The touch driver 400 may be formed as an integrated circuit (IC).

The display panel 100 may include a display layer DU, a touch sensing layer TSU, and a color filter layer CFL. The display layer DU may include a substrate SUB, a thin film transistor layer TFTL, a light emitting element layer EML, and a thin film encapsulation layer TFEL.

The substrate SUB may be a base substrate or a base member. The substrate SUB may be a flexible substrate that may be bent, folded, and rolled. For example, the substrate SUB may include a polymer resin such as polyimide (PI), but is not limited thereto. According to some embodiments, the substrate SUB may include a glass material or a metal material.

The thin film transistor layer TFTL may be located on the substrate SUB. The thin film transistor layer TFTL may include a plurality of thin film transistors constituting pixel circuits of pixels. The thin film transistor layer TFTL may further include gate lines, data lines, power lines, gate control lines, fan-out lines connecting the display driver 200 and the data lines to each other, and lead lines connecting the display driver 200 and the pad parts to each other. Each of the thin film transistors may include a semiconductor region, a source electrode, a drain electrode, and a gate electrode. For example, when the gate driver is formed on one side of the non-display area NDA of the display panel 100, the gate driver may include thin film transistors.

The thin film transistor layer TFTL may be located in the display area DA, the non-display area NDA, and the sub-area SBA. The thin film transistors of each of the pixels, the gate lines, the data lines, and the power lines of the thin film transistor layer TFTL may be located in the display area DA. The gate control lines and the fan-out lines of the thin film transistor layer TFTL may be located in the non-display area NDA. The lead lines of the thin film transistor layer TFTL may be located in the sub-area SBA.

The light emitting element layer EML may be located on the thin film transistor layer TFTL. The light emitting element layer EML may include a plurality of light emitting elements each including a first electrode, a second electrode, and a light emitting layer to emit light and a pixel defining film defining the pixels. The plurality of light emitting elements of the light emitting element layer EML may be located in the display area DA.

According to some embodiments, the light emitting layer may be an organic light emitting layer including an organic material. The light emitting layer may include a hole transporting layer, an organic light emitting layer, and an electron transporting layer. When the first electrode receives a voltage through the thin film transistor of the thin film transistor layer TFTL and the second electrode receives a common voltage, holes and electrons may move to the organic light emitting layer through the hole transporting layer and the electron transporting layer, respectively, and may be combined with each other in the organic light emitting layer to emit light.

According to some embodiments, the light emitting element may include a quantum dot light emitting diode including a quantum dot light emitting layer, an inorganic light emitting diode including an inorganic semiconductor, or a micro light emitting diode.

The display device 10 according to some embodiments may include a plurality of color filters located on the light emitting elements of the light emitting element layer EML. Each of the color filters may selectively transmit light of a specific wavelength therethrough and block or absorb light of other wavelengths. The color filters may absorb some of light introduced from the outside of the display device 10 to reduce reflected light by external light. Accordingly, the color filters may prevent or reduce distortion of colors due to external light reflection. Because the color filters are located on the light emitting elements, the display device 10 may not require a separate substrate for the color filters. Accordingly, a thickness of the display device 10 may be relatively small.

The thin film encapsulation layer TFEL may cover an upper surface and side surfaces of the light emitting element layer EML, and may protect the light emitting element layer EML. The thin film encapsulation layer TFEL may include at least one inorganic film and at least one organic film for encapsulating the light emitting element layer EML.

The touch sensing layer TSU may be located on the thin film encapsulation layer TFEL. The touch sensing layer TSU may include a plurality of touch electrodes for sensing a user's touch in a capacitance manner and touch lines connecting the plurality of touch electrodes and the touch driver 400 to each other. For example, the touch sensing layer TSU may sense the user's touch using a mutual capacitance manner or a self-capacitance manner.

According to some embodiments, the touch sensing layer TSU may be located on a separate substrate located on the display layer DU. In this case, the substrate supporting the touch sensing layer TSU may be a base member encapsulating the display layer DU.

The plurality of touch electrodes of the touch sensing layer TSU may be located in a touch sensor area overlapping the display area DA. The touch lines of the touch sensing layer TSU may be located in a touch peripheral area overlapping the non-display area NDA.

In some embodiments, the display device 10 may further include an optical device 500. The optical device 500 may be located in the sub-display area SDA. The optical device 500 may emit or receive light of infrared, ultraviolet, and visible light bands. For example, the optical device 500 may be an optical sensor sensing light incident on the display device 10, such as a proximity sensor, an illuminance sensor, and a camera sensor or an image sensor.

The color filter layer CFL may be located on the thin film encapsulation layer TFEL. The color filter layer CFL may include a plurality of color filters corresponding to the plurality of emission areas, respectively. Each of the color filters may selectively transmit light of a specific wavelength therethrough and block or absorb light of other wavelengths. The color filter layer CFL may absorb some of light introduced from the outside of the display device 10 to reduce reflected light by external light. Accordingly, the color filter layer CFL may prevent or reduce distortion of colors due to external light reflection.

Because the color filter layer CFL is directly located on the thin film encapsulation layer TFEL, the display device 10 may not require a separate substrate for the color filter layer CFL. Accordingly, a thickness of the display device 10 may be relatively small.

Figure 4:
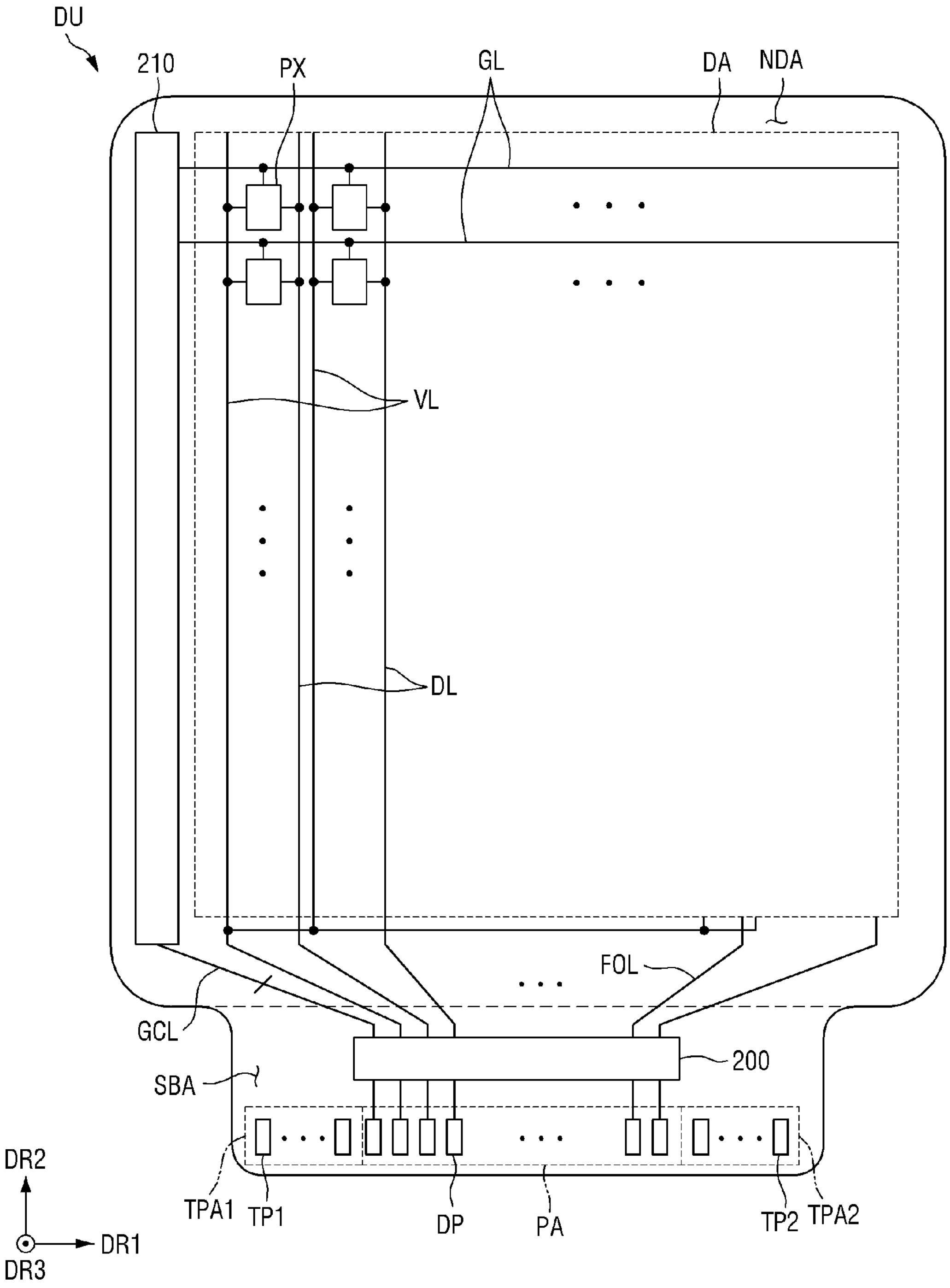
FIG. 4 is a plan view illustrating a display layer of the display device according to some embodiments.

FIG. 4 is a plan view illustrating a display layer of the display device according to some embodiments.

Referring to FIG. 4, the display layer DU may include a display area DA and a non-display area NDA.

The display area DA may be located at the center of the display panel 100. A plurality of pixels PX, a plurality of gate lines GL, a plurality of data lines DL, and some (e.g., second power lines VL2) of a plurality of power lines may be located in the display area DA. Each of the plurality of pixels PX may be defined as a minimum unit emitting light.

The plurality of gate lines GL may supply gate signals received from a gate driver 210 to the plurality of pixels PX. The plurality of gate lines GL may extend in the first direction DR1, and may be spaced apart from each other in the second direction DR2 crossing the first direction DR1.

The plurality of data lines DL may supply data voltages received from the display driver 200 to the plurality of pixels PX. The plurality of data lines DL may extend in the second direction DR2, and may be spaced apart from each other in the first direction DR1.

The second power lines VL2 of the plurality of power lines may supply a source voltage received from the display driver 200 to the plurality of pixels PX. Here, the source voltage may be at least one of a driving voltage, an initialization voltage, or a reference voltage. A plurality of second power lines VL2 may extend in the second direction DR2, and may be spaced apart from each other in the first direction DR1.

The non-display areas NDA may surround the display area DA. Some (e.g., first power lines VL1) of the plurality of power lines, the gate driver 210, fan-out lines FOL, and gate control lines GCL may be located in the non-display area NDA. The gate driver 210 may generate a plurality of gate signals based on gate control signals, and may sequentially supply the plurality of gate signals to the plurality of gate lines GL according to a set order.

The fan-out lines FOL may extend from the display driver 200 to the display area DA. The fan-out lines FOL may supply the data voltages received from the display driver 200 to the plurality of data lines DL.

The gate control lines GCL may extend from the display driver 200 to the gate driver 210. The gate control lines GCL may supply the gate control signals received from the display driver 200 to the gate driver 210. It has been illustrated in FIG. 4 that the gate driver 210 is located only in a non-display area NDA located on the left side of the display area DA, but embodiments according to the present disclosure are not limited thereto. In some embodiments, the display device 10 may include a plurality of gate drivers 210 located respectively on the left side and the right side of the display area DA.

The first power lines VL1 of the plurality of power lines may be located in the non-display area NDA while surrounding the display area DA. The first power lines VL1 may supply a source voltage received from the display driver 200 to the plurality of pixels PX. Here, the source voltage may be a low potential source voltage.

The sub-area SBA may include the display driver 200, a pad area PA, and first and second touch pad areas TPA1 and TPA2.

The display driver 200 may output signals and voltages for driving the display panel 100 to the fan-out lines FOL. The display driver 200 may supply the data voltages to the data lines DL through the fan-out lines FOL. The data voltages may be supplied to the plurality of pixels PX, and may control luminance of the plurality of pixels PX. The display driver 200 may supply the gate control signals to the gate driver 210 through the gate control lines GCL.

The pad area PA, the first touch pad area TPA1, and the second touch pad area TPA2 may be located at an edge of the sub-area SBA. The pad area PA, the first touch pad area TPA1, and the second touch pad area TPA2 may be electrically connected to the circuit board 300 using a material such as an anisotropic conductive film or a self assembly anisotropic conductive paste (SAP).

The pad area PA may include a plurality of display pad parts DP. The plurality of display pad parts DP may be connected to a graphic system through the circuit board 300. The plurality of display pad parts DP may be connected to the circuit board 300 to receive digital video data, and may supply the digital video data to the display driver 200.

Figure 5:
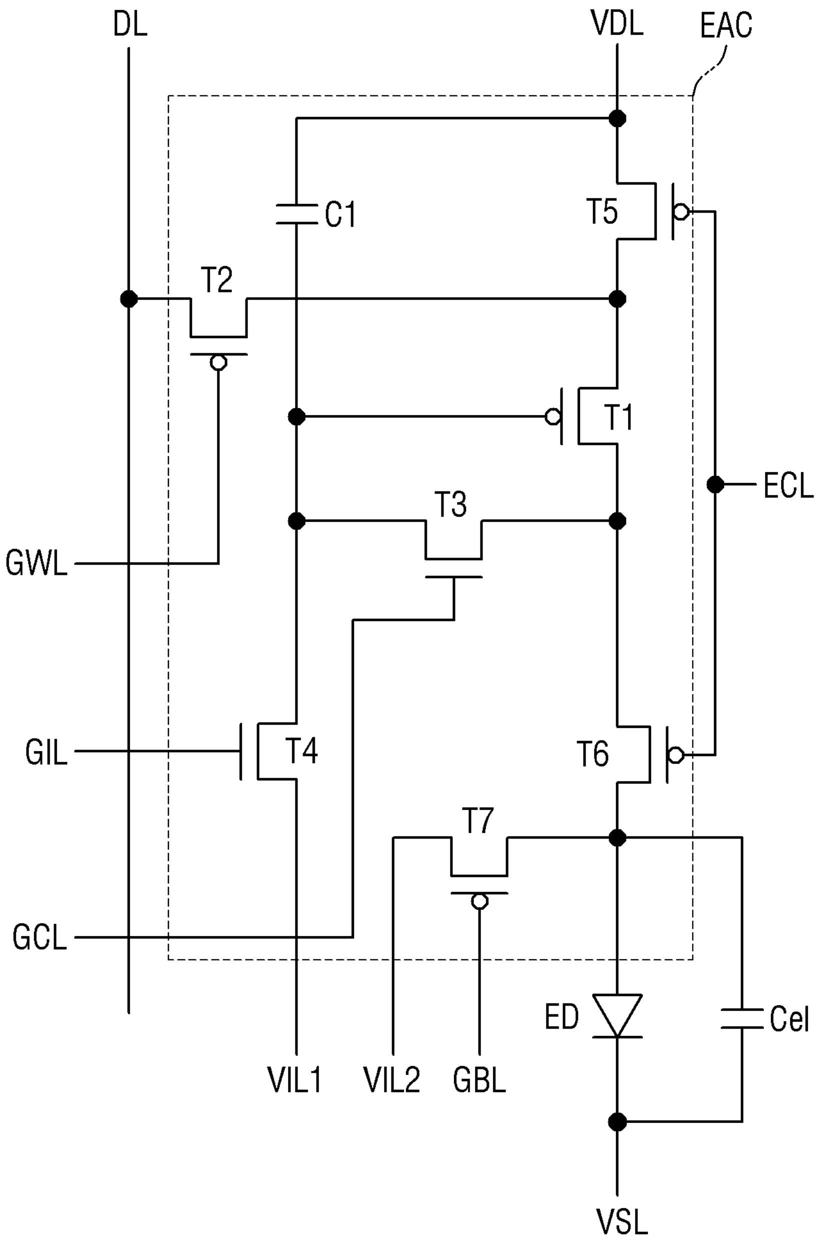
FIG. 5 is a pixel circuit diagram of one pixel according to some embodiments.

FIG. 5 is a pixel circuit diagram of one pixel according to some embodiments.

Referring to FIG. 5, a pixel PX may be connected to at least one of scan lines GWL, GIL, GCL, or GBL, any one of emission control lines ECL, and any one of data lines. For example, the pixel PX may be connected to a write scan line GWL, an initialization scan line GIL, a control scan line GCL, a bias scan line GBL, an emission control line EL, and a data line DL. An electrical connection structure of the pixel PX to be described below may be applied to each of a main pixel MPX and a sub-pixel SPX to be described later.

The pixel PX includes a light emitting element ED and a pixel driving unit PDU. The pixel driving unit PDU includes a driving transistor, switch elements, and a capacitor C1. The driving transistor and the switch elements include first to seventh transistors T1, T2, T3, T4, T5, T6, and T7.

The first transistor T1 includes a gate electrode, a first electrode, and a second electrode. The first transistor T1 controls a drain-source current (hereinafter, referred to as a "driving current") flowing between the first electrode and the second electrode according to a data voltage applied to the gate electrode.

The light emitting element ED emits light according to the driving current. An amount of light emitted from the light emitting element ED may be proportional to the driving current.

The light emitting element ED may be an organic light emitting diode including a pixel electrode, a common electrode, and an organic light emitting layer located between the pixel electrode and the common electrode. Alternatively, the light emitting element ED may be an inorganic light emitting element including a pixel electrode, a common electrode, and an inorganic semiconductor located between the pixel electrode and the common electrode. Alternatively, the light emitting element ED may be a quantum dot light emitting element including a pixel electrode, a common electrode, and a quantum dot light emitting layer located between the pixel electrode and the common electrode. Alternatively, the light emitting element ED may be a micro light emitting diode.

The pixel electrode of the light emitting element ED may be connected to one electrode of the sixth transistor T6 and one electrode of the seventh transistor T7, and the common electrode of the light emitting element ED may be connected to a first voltage line VSL. A parasitic capacitance Cel may be formed between the pixel electrode and the common electrode of the light emitting element ED.

The capacitor C1 is formed between the gate electrode of the first transistor T1 and a second voltage line VDL. One electrode of the capacitor C1 may be connected to the gate electrode of the first transistor T1, and the other electrode of the capacitor C1 may be connected to the second voltage line VDL.

A gate electrode of the seventh transistor T7 may be connected to the bias scan line GBL, and a gate electrode of the second transistor T2 may be connected to the write scan line GWL. A gate electrode of the third transistor T3 may be connected to the control scan line GCL, and a gate electrode of the fourth transistor T4 may be connected to the initialization scan line GIL. One electrode of the second transistor T2 may be connected to the data line DTL. One electrode of the third transistor T3 may be connected to the second electrode of the first transistor T1, and the other electrode of the third transistor T3 may be connected to one electrode of the capacitor C1. One electrode of the fourth transistor T4 may be connected to a first initialization voltage line VIL1, and the other electrode of the seventh transistor T7 may be connected to a second initialization voltage line VIL2. A first initialization voltage applied to the first initialization voltage line VIL1 and a second initialization voltage applied to the second initialization voltage line VIL2 may be different voltages.

In the display device 10 according to some embodiments, the first transistor T1, the second transistor T2, the fifth transistor T5, the sixth transistor T6, and the seventh transistor T7 of one pixel PX may be formed as P-type metal oxide semiconductor field effect transistors (MOSFETs), and the third transistor T3 and the fourth transistor T4 of one pixel PX may be formed as N-type MOSFETs. An active layer of each of the first transistor T1, the second transistor T2, the fifth transistor T5, the sixth transistor T6, and the seventh transistor T7 formed as the P-type MOSFETs may be made of polysilicon, and an active layer of each of the third transistor T3 and the fourth transistor T4 formed as the N-type MOSFETs may be made of an oxide semiconductor. In this case, the transistors made of the polysilicon and the transistors made of the oxide semiconductor may be located at different layers, and thus, an area in which the transistors are located in each of the pixels PX may be reduced. Alternatively, in FIG. 5, the seventh transistor T7 may be formed as an N-type MOSFET. In this case, an active layer of the seventh transistor T7 may also be made of an oxide semiconductor.

The third transistor T3 and the fourth transistor T4 are formed as the N-type MOSFETs, and may thus be turned on when scan signals of a gate high voltage is applied to the control scan line GCL and the initialization scan line GIL. In contrast, the first transistor T1, the second transistor T2, the fifth transistor T5, the sixth transistor T6, and the seventh transistor T7 are formed as the P-type MOSFETs, and may thus be turned on when scan signals and an emission signal of a gate low voltage are applied to the bias scan line GBL, the write scan line GWL, and the emission control line ECL, respectively.

Figure 6:
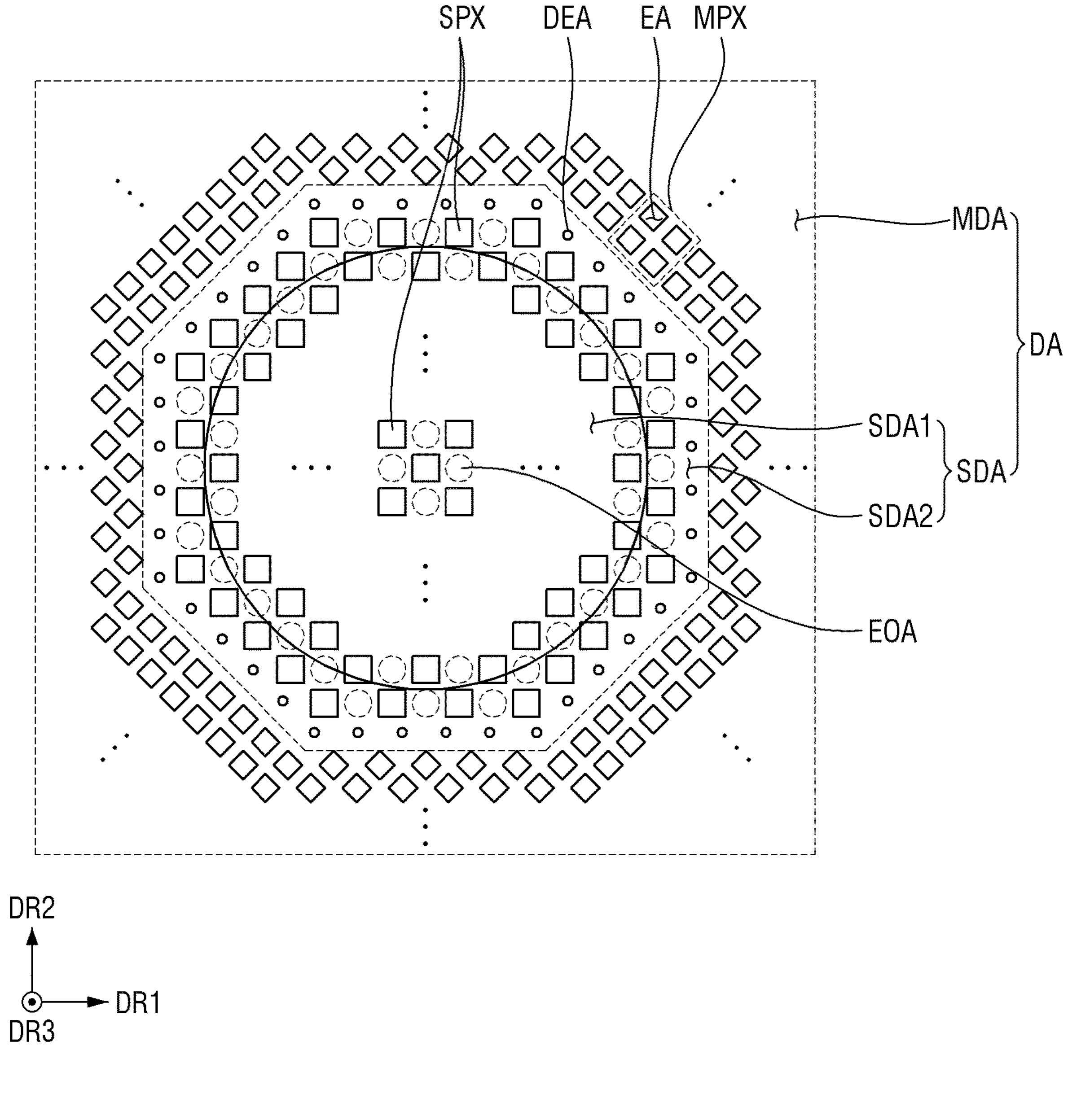
FIG. 6 is a plan view illustrating arrangements of pixels in a main display area and a sub-display area of the display device according to some embodiments.

FIG. 6 is a plan view illustrating arrangements of pixels located in a main display area and a sub-display area of the display device according to some embodiments. FIG. 6 illustrates arrangements of pixels MPX and SPX located in a sub-display area SDA and a main display area MDA around the sub-display area SDA in the display area DA of the display device 10.

Referring to FIG. 6, in the display device 10 according to some embodiments, the display area DA may include a main display area MDA and a sub-display area SDA. The sub-display area SDA may be an area in which components are located below the substrate SUB of the display device 10, as described above. A plurality of main pixels MPX may be arranged in the main display area MDA, and a plurality of sub-pixels SPX and a plurality of transmission parts EOA may be arranged in the sub-display area SDA. Each of the main pixels MPX and the sub-pixels SPX may include one or more emission areas EA, and light emitting elements ED (see FIG. 8) may be located in the respective emission areas EA to emit light. On the other hand, the transmission parts EOA may be areas in which the light emitting elements ED are not located unlike the pixels MPX and SPX and some of a plurality of layers located on the substrate SUB are removed. Light emitted from components located below the sub-display area SDA or received by the components may be transmitted through the transmission parts EOA. Different main pixels MPX may be repeatedly located in the main display area MDA, while the transmission parts EOA may be located between the plurality of sub-pixels SPX in the sub-display area SDA.

The sub-display area SDA may include a first sub-display area SDA1 and a second sub-display area SDA2 arranged around the first sub-display area SDA1. The second sub-display area SDA2 may be an area that surrounds the first sub-display area SDA1 and becomes a boundary between the main display area MDA and the sub-display area SDA. The sub-pixels SPX and the transmission parts EOA are located in each of the first sub-display area SDA1 and the second sub-display area SDA2, but arrangements and densities of the sub-pixels SPX and the transmission parts EOA in the first sub-display area SDA1 and the second sub-display area SDA2 may be different from each other.

As described later, arrangements and densities of the pixels MPX and SPX in the main display area MDA and the sub-display area SDA are different from each other, and thus, there may be differences in luminance and resolution in the main display area MDA and the sub-display area SDA even though the main display area MDA and the sub-display area SDA include the main pixels MPX and the sub-pixels SPX, respectively. When arrangements of the pixels MPX and SPX in different areas are designed without considering a difference between the arrangements of the pixels MPX and SPX in the main display area MDA and the sub-display area SDA, a boundary between the main display area MDA and the sub-display area SDA may be viewed. In the display device 10 according to some embodiments, the sub-display area SDA may includes the first sub-display area SDA1 and the second sub-display area SDA2, and the second sub-display area SDA2 may include light emitting elements for preventing or reducing visibility of a boundary between the main display area MDA and the first sub-display area SDA1.

The second sub-display area SDA2 may include a plurality of sub-pixels SPX and transmission parts EOA located adjacent to the first sub-display area SDA1 and may include a plurality of dummy emission areas DEA located adjacent to the main display area MDA at an outer portion thereof. Sub-emission areas SEA are emission areas located at the outermost portion of the sub-display area SDA, and may be located between the main pixels MPX of the main display area MDA and the sub-pixels SPX of the sub-display area SDA. Light emitting elements ED are located in the dummy emission areas DEA to emit light, but driving circuits for driving the light emitting elements ED may not be located in the dummy emission areas DEA. The light emitting elements ED of the dummy emission areas DEA may be electrically connected to the light emitting elements ED included in the main pixels MPX of the main display area MDA and may emit light together with the light emitting elements ED included in the main pixels MPX of the main display area MDA. The display device 10 may prevent or reduce visibility of a boundary between specific areas within the display area DA by including the dummy emission areas DEA offsetting a luminance difference due to the difference between the arrangements of the pixels MPX and SPX located in the main display area MDA and the sub-display area SDA.

Hereinafter, arrangements and structures of the pixels MPX and SPX of the main display area MDA and the sub-display area SDA of the display device 10 will be described in detail with reference to other drawings.

Figure 7:
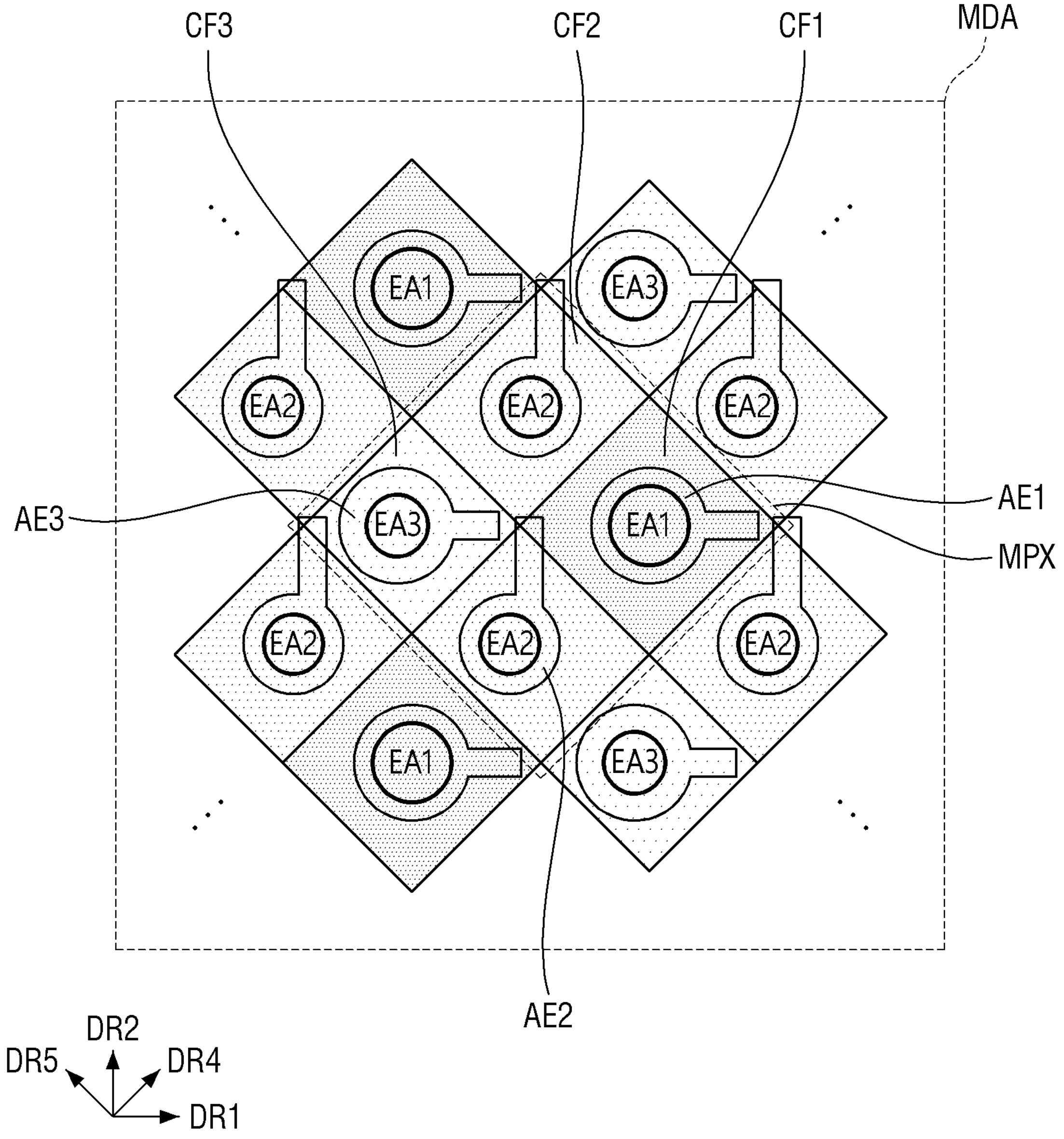
FIG. 7 is a plan view illustrating arrangements of pixel electrodes and color filters of a main pixel located in the main display area of FIG. 6 according to some embodiments.

FIG. 7 is a plan view illustrating arrangements of pixel electrodes and color filters of a main pixel located in the main display area of FIG. 6.

Referring to FIG. 7, the display device 10 according to some embodiments may include a plurality of emission areas EA1, EA2, and EA3 located in the main display area MDA. The emission areas EA1, EA2, and EA3 may include first emission areas EA1, second emission areas EA2, and third emission areas EA3 that emit light of different colors. The first to third emission areas EA1, EA2, and EA3 may emit red light, green light, or blue light, respectively, and colors of the light emitted from the respective emission areas EA1, EA2, and EA3 may be different depending on types of light emitting element ED1, ED2, and ED3 (see FIG. 8) to be described later. According to some embodiments, the first emission area EA1 may emit first light, which is the red light, the second emission area EA2 may emit second light, which is the green light, and the third emission area EA3 may emit third light, which is the blue light. However, embodiments according to the present disclosure are not limited thereto.

The plurality of emission areas EA1, EA2, and EA3 may be arranged in a PenTile™ type of arrangement, for example, a diamond PenTile™ arrangement. For example, the first emission areas EA1 and the third emission areas EA3 may be arranged such that they are spaced apart from each other in the first direction DR1, and may be alternately arranged in the first direction DR1 and the second direction DR2. In an arrangement of the emission areas EA1, EA2, and EA3, the first emission areas EA1 and the third emission areas EA3 may be alternately arranged in the first direction DR1 in a first row and a third row. The first emission areas EA1 and the third emission areas EA3 may be alternately arranged in the second direction DR2 in a first column and a third column.

The second emission areas EA2 may be spaced apart from other adjacent second emission areas EA2 in the first direction DR1 and the second direction DR2, and may be spaced apart from adjacent first emission areas EA1 and third emission areas EA3 in a fourth direction DR4 or a fifth direction DR5. A plurality of second emission areas EA2 may be repeatedly arranged along the first direction DR1 and the second direction DR2, and the second emission areas EA2 and the first emission areas EA1 or the second emission areas EA2 and the third emission areas EA3 may be alternately arranged along the fourth direction DR4 or the fifth direction DR5. In the arrangement of the emission areas EA1, EA2, and EA3, the second emission areas EA2 may be repeatedly arranged in the first direction DR1 in a second row and a fourth row, and the second emission areas EA2 may be repeatedly arranged in the second direction DR2 in a second column and a fourth column.

The first to third emission areas EA1, EA2, and EA3 may be defined, respectively, by a plurality of openings OPE1, OPE2, and OPE3 formed in a pixel defining film PDL (see FIG. 8) of a light emitting element layer EML to be described later. For example, the first emission area EA1 may be defined by a first opening OPE1 of the pixel defining film PDL, the second emission area EA2 may be defined by a second opening OPE2 of the pixel defining film PDL, and the third emission area EA3 may be defined by a third opening OPE3 of the pixel defining film PDL.

Areas of the emission areas EA1, EA2, and EA3 may change depending on sizes of the openings OPE1, OPE2, and OPE3. Intensities of the light emitted from the emission areas EA1, EA2, and EA3 may change depending on the areas of the emission areas EA1, EA2, and EA3, and a color feeling of a screen displayed on the display device 10 or the electronic device 1 may be controlled by adjusting the areas of the emission area EA1, EA2, and EA3. According to some embodiments, areas or sizes of the first to third emission areas EA1, EA2, and EA3 may be the same as each other. According to some embodiments of FIG. 7, an area or a diameter of the first emission area EA1 may be greater than areas or diameters of the second emission area EA2 and the third emission area EA3, and an area or a diameter of the third emission area EA3 may be greater than an area or a diameter of the second emission area EA2.

However, embodiments according to the present disclosure are not limited thereto. The areas of the emission areas EA1, EA2, and EA3 may be freely adjusted according to a color feeling of the screen required by the display device 10 and the electronic device 1. In addition, the areas of the emission areas EA1, EA2, and EA3 may be related to light efficiency, lifespan of the light emitting elements ED, and the like, and may have a trade-off relationship with external light reflection. The areas of the emission areas EA1, EA2, and EA3 may be adjusted in consideration of the above factors. For example, the areas or the diameters of the first emission area EA1, the second emission area EA2, and the third emission area EA3 may be the same as each other.

In the display device 10 having the arrangement of the emission areas EA1, EA2, and EA3 as illustrated in FIG. 7, one first emission area EA1, two second emission areas EA2, and one third emission area EA3 located adjacent to each other may form one pixel group. For example, the main pixel MPX of the main display area MDA may include one first emission area EA1, two second emission areas EA2, and one third emission area EA3. One pixel group may include the emission areas EA1, EA2, and EA3 emitting light of different colors to express a white gradation. However, embodiments according to the present disclosure are not limited thereto, and a combination of the emission areas EA1, EA2, and EA3 constituting one pixel group may be variously modified depending on an arrangement of the emission areas EA1, EA2, and EA3, colors of the light emitted by the emission areas EA1, EA2, and EA3, and the like.

The display device 10 may include a plurality of pixel electrodes AE1, AE2, and AE3 arranged to correspond to the emission areas EA1, EA2, and EA3, respectively. For example, the display device 10 may include first pixel electrodes AE1 arranged to correspond to the first emission areas EA1, second pixel electrodes AE2 arranged to correspond to the second emission areas EA2, and third pixel electrodes AE3 arranged to correspond to the third emission areas EA3. Each of the first to third pixel electrodes AE1, AE2, and AE3 may be electrically connected to a driving circuit of the thin film transistor layer TFTL. Each of the pixel electrodes AE1, AE2, and AE3 may be one electrode of each of the light emitting elements ED1, ED2, and ED3, and receives an electrical signal applied from the thin film transistor layer TFTL, such that the light emitting elements ED1, ED2, and ED3 may emit light.

The first to third pixel electrodes AE1, AE2, and AE3 may have greater diameters in a plan view than the openings OPE1, OPE2, and OPE3 of the pixel defining film PDL. Each of the first to third pixel electrodes AE1, AE2, and AE3 may have a greater area than each of the emission areas EA1, EA2, and EA3. In addition, the first to third pixel electrodes AE1, AE2, and AE3 may have shapes to be electrically connected to driving circuits located therebelow. For example, the first to third pixel electrodes AE1, AE2, and AE3 may include protruding parts protruding in one direction from areas overlapping the emission areas EA1, EA2, and EA3, respectively. The protruding parts may be portions in which contact holes to be connected to conductive layers located therebelow are formed.

In the main display area MDA, an arrangement of the plurality of pixel electrodes AE1, AE2, and AE3 may be the same as the arrangement of the emission areas EA1, EA2, and EA3. For example, the pixel electrodes AE1, AE2, and AE3 belonging to the main pixel MPX may be arranged in a PenTile™ type.

The display device 10 may include a plurality of color filters CF1, CF2, and CF3 located on the emission areas EA1, EA2, and EA3. The plurality of color filters CF1, CF2, and CF3 may be arranged to correspond to the emission areas EA1, EA2, and EA3, respectively. For example, the color filters CF1, CF2, and CF3 may be located in a plurality of opening holes OPT1, OPT2, and OPT3 of a light blocking layer BM arranged to correspond to the emission areas EA1, EA2, and EA3 or the openings OPE1, OPE2, and OPE3, respectively. The opening holes OPT1, OPT2, and OPT3 of the light blocking layer may be formed to overlap the openings OPE1, OPE2, and OPE3, respectively, and may form light emitting areas through which the light emitted from the emission areas EA1, EA2, and EA3 is emitted. Each of the color filters CF1, CF2, and CF3 may have a greater area than each of the openings OPE1, OPE2, and OPE3, and may completely cover each of the light emitting areas formed by the opening holes OPT1, OPT2, and OPT3 of the light blocking layer BM.

The color filters CF1, CF2, and CF3 may include first color filters CF1, second color filters CF2, and third color filters CF3 arranged to correspond to different emission areas EA1, EA2, and EA3, respectively. The color filters CF1, CF2, and CF3 may include colorants such as dyes or pigments absorbing light of wavelength bands other than light of a specific wavelength band, and may be arranged to correspond to the colors of the light emitting from the emission areas EA1, EA2, and EA3. For example, the first color filter CF1 may be a red color filter arranged to overlap the first emission area EA1 and transmitting only the first light, which is the red light, therethrough. The second color filter CF2 may be a green color filter arranged to overlap the second emission area EA2 and transmitting only the second light, which is the green light, therethrough, and the third color filter CF3 may be a blue color filter arranged to overlap the third emission area EA3 and transmitting only the third light, which is the blue light, therethrough.

Similar to the arrangement of the emission areas EA1, EA2, and EA3, the color filters CF1, CF2, and CF3 may be arranged in a PenTile™ type of arrangement, for example, a diamond PenTile™ type. For example, the first color filters CF1 and the third color filters CF3 may be alternately arranged in the first direction DR1 and the second direction DR2. In an arrangement of the color filters CF1, CF2, and CF3, the first color filters CF1 and the third color filters CF3 may be alternately arranged in the first direction DR1 in the first row and the third row. The first color filters CF1 and the third color filters CF3 may be alternately arranged in the second direction DR2 in the first column and the third column.

The second color filters CF2 may be spaced apart from other adjacent second color filters CF2 in the first direction DR1 and the second direction DR2, and may be spaced apart from adjacent first color filters CF1 and third color filters CF3 in the fourth direction DR4 or the fifth direction DR5. A plurality of second color filters CF2 may be repeatedly arranged along the first direction DR1 and the second direction DR2, and the second color filters CF2 and the first color filters CF1 or the second color filters CF2 and the third color filters CF3 may be alternately arranged along the fourth direction DR4 or the fifth direction DR5. In the arrangement of the color filters CF1, CF2, and CF3, the second color filters CF2 may be repeatedly arranged in the first direction DR1 in the second row and the fourth row, and the second color filters CF2 may be repeatedly arranged in the second direction DR2 in the second column and the fourth column.

Figure 8:
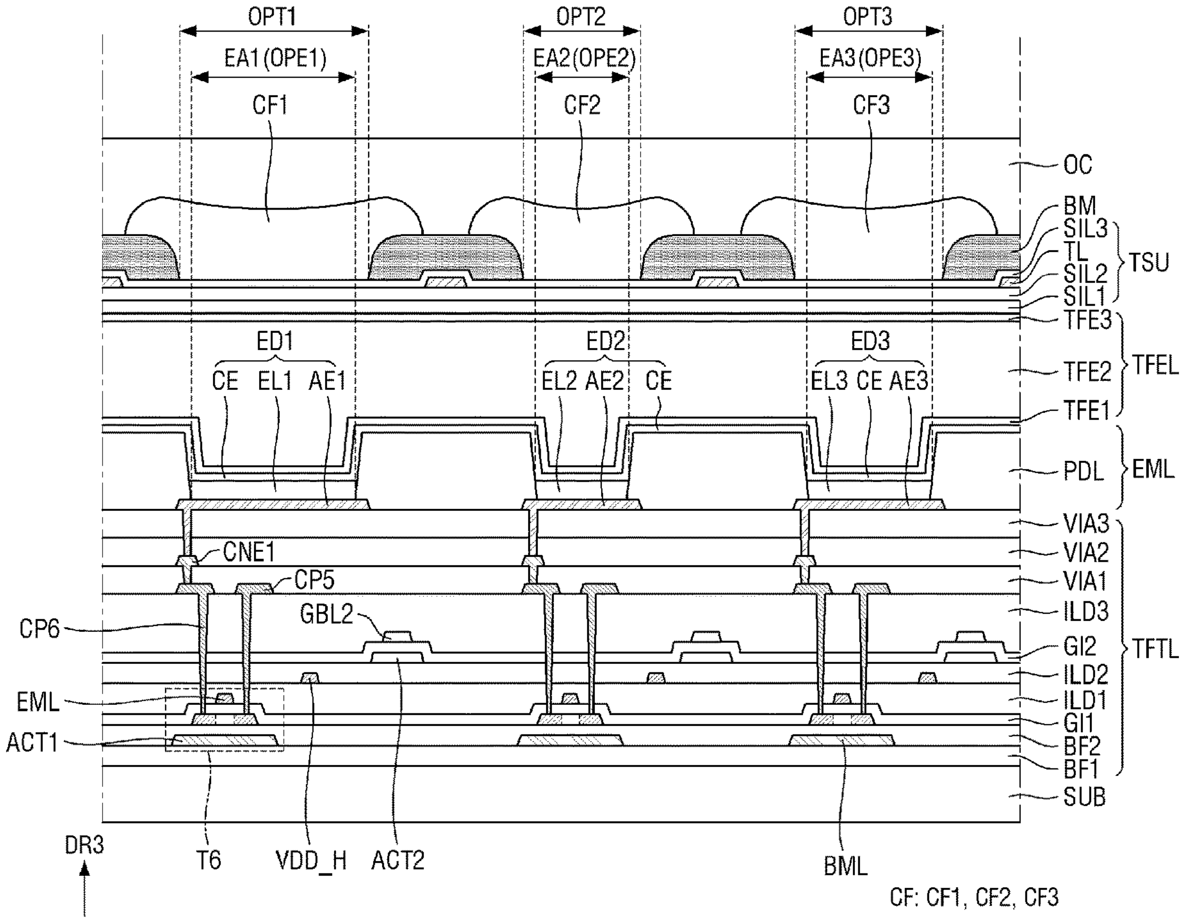
FIG. 8 is a schematic cross-sectional view illustrating a structure of the main pixel of FIG. 7 according to some embodiments.
Figure 9:
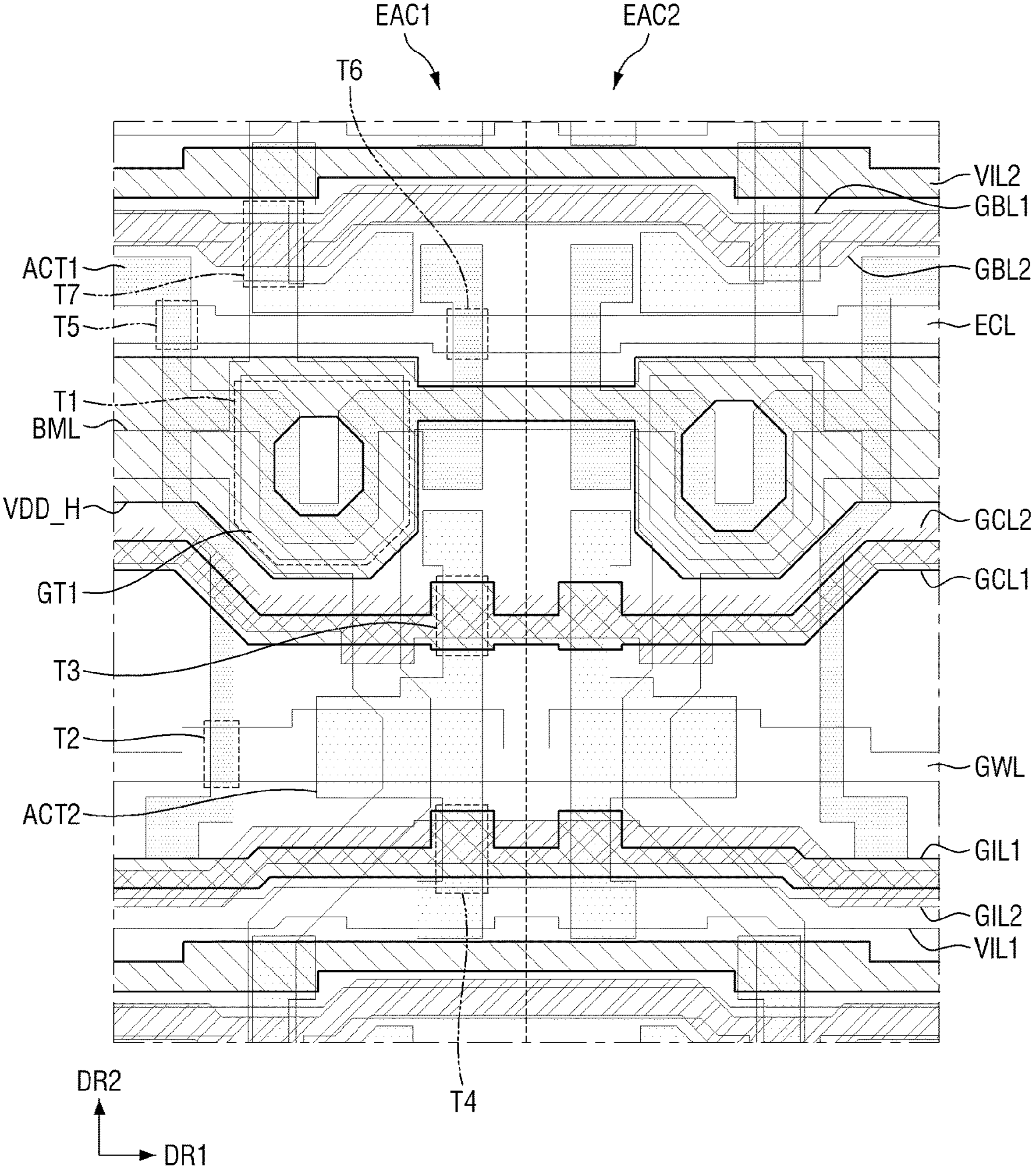
FIGS. 9 to 11 are layout diagrams of the main pixel of the display device according to some embodiments.
Figure 10:
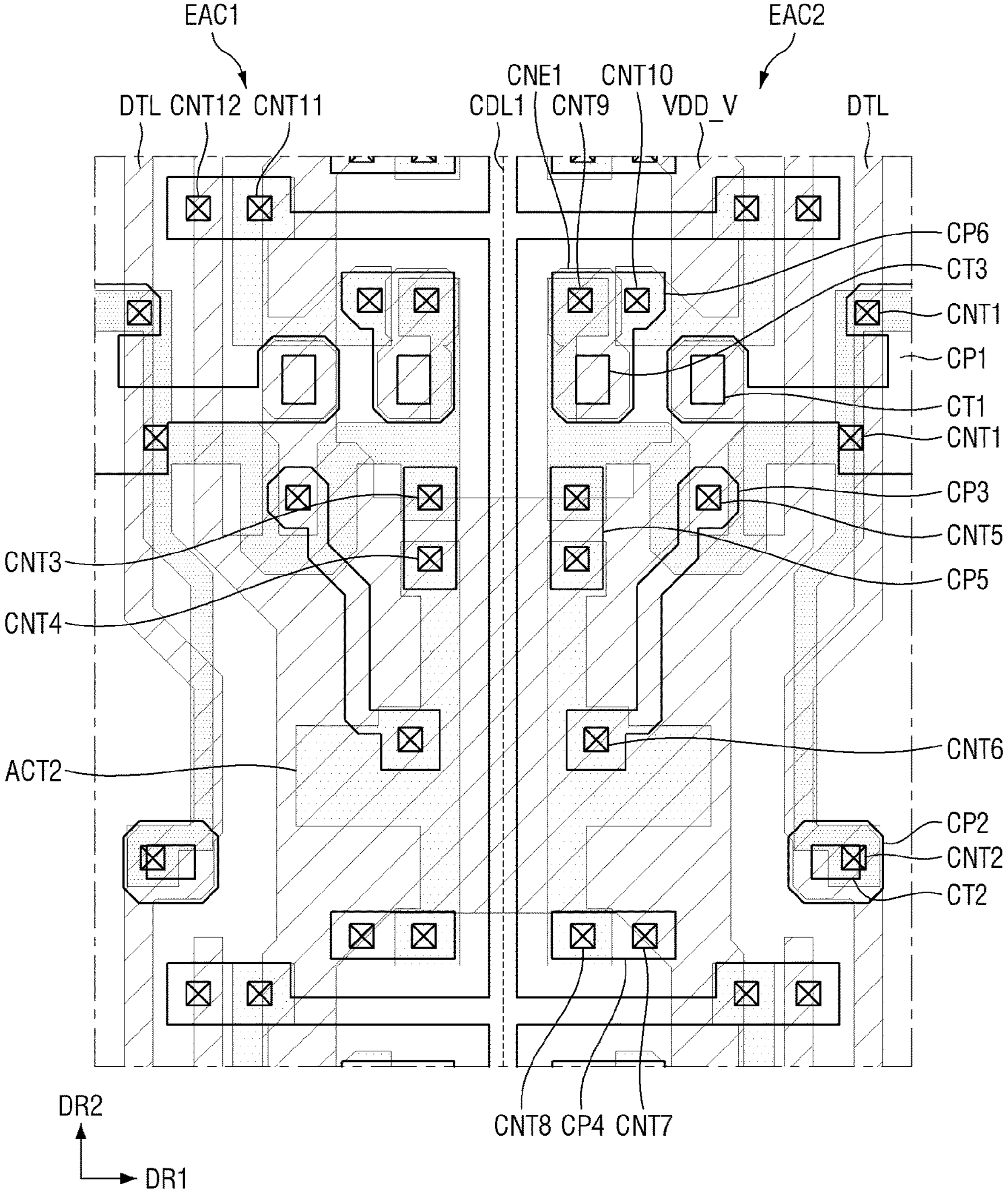
Figure 11:
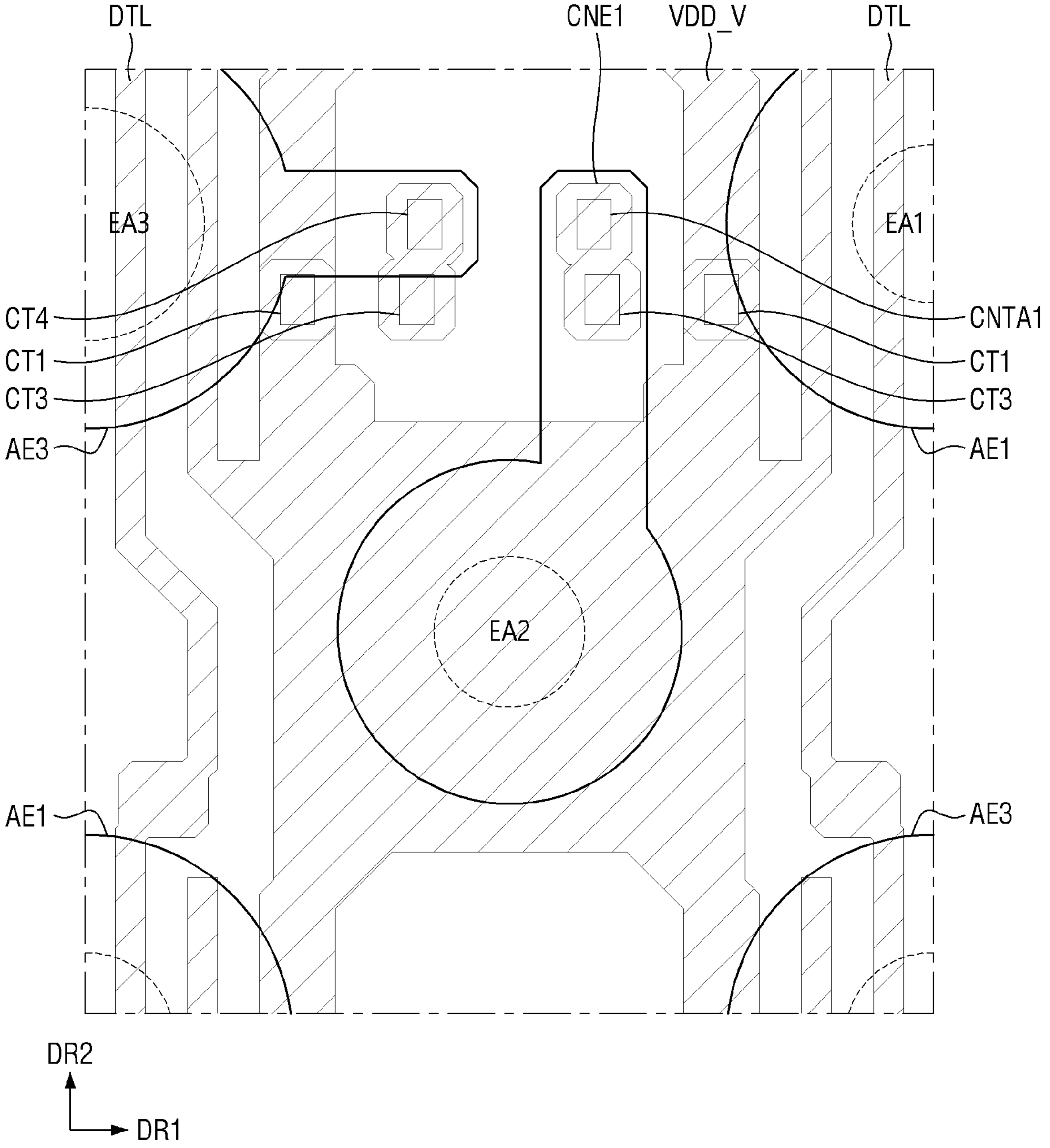

FIG. 8 is a schematic cross-sectional view illustrating a structure of the main pixel of FIG. 7. FIGS. 9 to 11 are layout diagrams of the main pixel of the display device according to some embodiments. FIGS. 9 to 11 are layout diagrams illustrating a plurality of semiconductor layers and a plurality of conductive layers as a plurality of lines and electrodes located in pixel driving units PDU of two pixel circuits adjacent to each other in the first direction DR1. FIG. 8 is a schematic cross-sectional view of the first to third emission areas EA1, EA2, and EA3 of the main pixel MPX located in the main display area MDA.

Referring to FIGS. 8 to 11, the display device 10 may include a plurality of pixel circuit units EAC1 and EAC2, and different pixel circuit units EAC1 and EAC2 may be electrically connected to different light emitting elements ED1, ED2, and ED3, respectively. For example, a first pixel circuit unit EAC1 and a second pixel circuit unit EAC2 may be located adjacent to each other in the first direction DR1 and may be electrically connected respectively to two light emitting elements ED1, ED2, and ED3, located adjacent to each other, of the same main pixel MPX or different main pixels MPX. The first pixel circuit unit EAC1 and the second pixel circuit unit EAC2 may be electrically connected respectively to two light emitting elements ED1, ED2, and ED3 located adjacent to each other in a plan view.

Two pixel circuit units EAC1 and EAC2 adjacent to each other in the first direction DR1 may include lines and electrodes located symmetrical to each other. For example, in the first pixel circuit unit EAC1 and the second pixel circuit unit EAC2, lines connected to each of the first pixel circuit unit EAC1 and the second pixel circuit unit EAC2 and semiconductor layers of transistors may be arranged in specific patterns, and the patterns of the first pixel circuit unit EAC1 and the second pixel circuit unit EAC2 may have a symmetrical structure. As illustrated in FIGS. 9 and 10, patterns of lines and electrodes located in the first pixel circuit unit EAC1 and patterns of lines and electrodes located in the second pixel circuit unit EAC2 may have a symmetrical structure or a flip structure with respect to a virtual line extending in the second direction DR2. In the display device 10, the patterns of the lines and the electrodes may be repeatedly arranged based on a pair of pixel circuit units EAC1 and EAC2. According to some embodiments, the same patterns as the lines and the electrodes of the first pixel circuit unit EAC1 and the second pixel circuit unit EAC2 may be repeatedly arranged in pixel circuit units EAC1 and EAC2 adjacent to the first pixel circuit unit EAC1 and the second pixel circuit unit EAC2 in the first direction DR1 or the second direction DR2.

The display device 10 may include a substrate SUB and a plurality of semiconductor layers, a plurality of conductive layers, and a plurality of insulating layers located on the substrate SUB. The semiconductor layers, the conductive layers, and the insulating layers may constitute elements or lines of the pixel driving unit PDU, respectively.

The substrate SUB may be a base substrate or a base member. The substrate SUB may be a flexible substrate that may be bent, folded, and rolled. As an example, the substrate SUB may include a polymer resin such as polyimide (PI), but is not limited thereto. As another example, the substrate SUB may include a glass material or a metal material.

A first buffer layer BF1 may be located on the substrate SUB. The first buffer layer BF1 may protect thin film transistors and the light emitting elements ED1, ED2, and ED3 from moisture permeating through the substrate SUB vulnerable to moisture permeation. The first buffer layer BF1 may include a plurality of inorganic films that are alternately stacked. For example, the first buffer layer BF1 may be formed as multiple films in which one or more inorganic films of a silicon nitride layer, a silicon oxynitride layer, a silicon oxide layer, a titanium oxide layer, and an aluminum oxide layer are alternately stacked. The first buffer layer BF1 may be omitted.

A lower metal layer BML may be located on the first buffer layer BF1. The lower metal layer BML may be located in the main display area MDA and may be arranged to overlap a portion of a first semiconductor layer ACT1. The lower metal layer BML may be substantially arranged to extend in the first direction DR1 and the second direction DR2 and may be arranged in a mesh shape over the entirety of the main display area MDA. An extension part having a relatively great width may be located at a portion where portions of the lower metal layer BML extending in the first direction DR1 and the second direction DR2 cross each other, and the extension part may overlap an active layer of the first transistor T1 of the first semiconductor layer ACT1 in the third direction DR3, which is the thickness direction.

The lower metal layer BML may include a material blocking light to prevent or reduce instances of light being incident on the active layer of the first transistor T1 or may be electrically connected to the active layer of the first transistor T1 to serve to stabilize electrical characteristics of the first transistor T1. According to some embodiments, the first transistor T1 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof. In some embodiments, the lower metal layer BML may be omitted.

The second buffer layer BF2 may be located on the first transistor T1. The second buffer layer BF2 may protect the thin film transistors and light emitting layers of the light emitting elements ED from moisture permeating through the substrate SUB vulnerable to moisture permeation, similar to the first buffer layer BF1.

The first semiconductor layer ACT1 may be located on the second buffer layer BF2. The first semiconductor layer ACT1 may include polycrystalline silicon or single crystal silicon. However, embodiments according to the present disclosure are not limited thereto.

The first semiconductor layer ACT1 may include active layers of the first transistor T1, the second transistor T2, the fifth transistor T5, and the sixth transistor T6. As described later, active layers of the third transistor T3, the fourth transistor T4, and the seventh transistor T7 may be located at a second semiconductor layer ACT2.

The first semiconductor layer ACT1 of the first pixel circuit unit EAC1 and the first semiconductor layer ACT1 of the second pixel circuit unit EAC2 may have a symmetric structure. Shapes of patterns of the first semiconductor layers ACT1 located in the respective pixel circuit units EAC1 and EAC2 may have a symmetrical structure with respect to a boundary between the first pixel circuit unit EAC1 and the second pixel circuit unit EAC2.

The active layer of the first transistor T1 may include a channel layer, a first electrode, and a second electrode. The channel layer of the first transistor T1 may overlap a first gate electrode GT1 of a first gate conductive layer and the extension part of the lower metal layer BML. The first electrode of the first transistor T1 may be connected to a second electrode of the second transistor T2 and a second electrode of the fifth transistor T5. The second electrode of the first transistor T1 may be connected to a first electrode of the sixth transistor T6.

The active layer of the second transistor T3 may include a channel layer, a first electrode, and the second electrode. The channel layer of the second transistor T2 may overlap a write scan line GWL of the first gate conductive layer. A portion of the write scan line may serve as a gate electrode of the second transistor T2. The first electrode of the second transistor T2 may be electrically connected to a data line DTL. The second electrode of the second transistor T2 may be connected to the first electrode of the first transistor T1. The first electrode of the second transistor T2 may be in contact with a second conductive pattern CP2 of a first data conductive layer and may be electrically connected to a data line DTL of a second data conductive layer through the second conductive pattern CP2.

The active layer of the fifth transistor T5 may include a channel layer, a first electrode, and the second electrode. The channel layer of the fifth transistor T5 may overlap an emission control line ECL of the first gate conductive layer. A portion of the emission control line ECL may serve as a gate electrode of the fifth transistor T5. The first electrode of the fifth transistor T5 may be electrically connected to a first vertical line VDD_V. The second electrode of the fifth transistor T5 may be connected to the first electrode of the first transistor T1. The first electrode of the fifth transistor T5 may be electrically connected to the first vertical line VDD_V of the second data conductive layer through a first conductive pattern CP1 of the first data conductive layer.

The active layer of the sixth transistor T6 may include a channel layer, the first electrode, and a second electrode. The channel layer of the sixth transistor T6 may overlap the emission control line ECL of the first gate conductive layer. A portion of the emission control line ECL may serve as a gate electrode of the sixth transistor T6. The first electrode of the sixth transistor T6 may be connected to the second electrode of the first transistor T1. The second electrode of the sixth transistor T6 may be electrically connected to a second electrode of the seventh transistor T7 and the pixel electrodes AE1, AE2, and AE3 of the light emitting elements ED. The second electrode of the sixth transistor T6 may be electrically connected to the pixel electrodes AE1, AE2, and AE3 through a sixth conductive pattern CP6 of the first data conductive layer and a first connection pattern CNE1 of the second data conductive layer.

The active layers of the first transistor T1, the second transistor T2, the fifth transistor T5, and the sixth transistor T6 may be formed as one pattern connected to each other at the first semiconductor layer ACT1. As described later, the active layers of the third transistor T3 and the fourth transistor T4 may be located at the second semiconductor layer ACT2 located at a layer different from the first semiconductor layer ACT1 unlike the other transistors. The third transistor T3 and the fourth transistor T4 may also be electrically connected to the other transistors through connection electrodes of the first data conductive layer.

A first gate insulating layer GI1 may be located on the first semiconductor layer ACT1 and the second buffer layer BF2. The first gate insulating layer GI1 may serve as a gate insulating film of transistors.

The first gate conductive layer may be located on the first gate insulating layer GI1. The first gate conductive layer may include a first initialization voltage line VIL1, the write scan line GWL, the first gate electrode GT1 of the first transistor T1, the emission control line ECL, and bias scan lines GBL.

The first gate electrode GT1 of the first transistor T1 may be arranged to overlap the channel layer of the first transistor T1 in the first semiconductor layer ACT1. In addition, the first gate electrode GT1 of the first transistor T1 may overlap the extension part of the lower metal layer BML. First gate electrodes GT1 of a plurality of first transistors T1 may be arranged to be spaced apart from each other in the first direction DR1 and the second direction DR2 across the entirety of the main display area MDA. The first gate electrode GT1 of the first transistor T1 may be formed integrally with a first capacitance electrode of a capacitor C1. The first capacitance electrode of the capacitor C1 may be a portion of the first gate electrode GT1 of the first transistor T1.

The first initialization voltage line VIL1 may extend in the first direction DR1. The first initialization voltage line VIL may be located on the lower side of each of the pixel circuit units EAC1 and EAC2, which is the other side of each of the pixel circuit units EAC1 and EAC2 in the second direction DR2. The first initialization voltage line VIL1 may be electrically connected to a first electrode of the fourth transistor T4. The first initialization voltage line VIL1 may be electrically connected to the first electrode of the fourth transistor T4 through a fourth conductive pattern CP4 of the first data conductive layer.

The write scan line GWL may extend in the first direction DR1. The write scan line GWL may be spaced apart from the first initialization voltage line VIL in the second direction DR2 and may be located on the upper side of the first initialization voltage line VIL1, which is one side of the first initialization voltage line VIL1 in the second direction DR2. The write scan line GWL may be arranged to overlap the channel layer of the second transistor T2, and a portion of the write scan line GWL may be a gate electrode of the second transistor T2.

The emission control line ECL may extend in the first direction DR1. The emission control line ECL may be spaced apart from the first gate electrode GT1 of the first transistor T1 in the second direction DR2 and may be located on the upper side of the first gate electrode GT1. The emission control line ECL may be arranged to overlap the channel layers of the fifth transistor T5 and the sixth transistor T6, and portions of the emission control line ECL may be gate electrodes of the fifth transistor T5 and the sixth transistor T6.

The bias scan lines GBL1 and GBL2 may extend in the first direction DR1. The bias scan lines GBL1 and GBL2 may be spaced apart from the emission control line ECL in the second direction DR2 and may be located on the upper side of the emission control line ECL. The bias scan lines GBL1 and GBL2 may include a first bias scan line GBL1 located at the first gate conductive layer and a second bias scan line GBL2 located at a third gate conductive layer to be described later. The first bias scan line GBL1 and the second bias scan line GBL2 may be arranged to overlap each other and extend in the first direction DR1. The first bias scan line GBL1 and the second bias scan line GBL2 may be arranged to overlap a channel layer of the seventh transistor T7, respectively, and a portion of the first bias scan line GBL1 and a portion of the second bias scan line GBL2 may be gate electrodes of the seventh transistor T7. The seventh transistor T7 may have a structure in which the gate electrodes are located above and below the active layer, respectively.

A first interlayer insulating layer ILD1 may be located on the first gate conductive layer. The first interlayer insulating layer ILD1 may function as an insulating film between the first gate conductive layer and other layers located on the first gate conductive layer, and protect the first gate conductive layer.

A second gate conductive layer may be located on the first interlayer insulating layer ILD1. The second gate conductive layer may include a first initialization scan line GIL1, a first control scan line GCL1, and a first horizontal line VDD_H.

The first initialization scan line GIL1 may extend in the first direction DR1. The first initialization scan line GIL1 may be located on the lower side of the pixel circuit units EAC1 and EAC2. The first initialization scan line GIL1 may be arranged to overlap a channel layer of the fourth transistor T4. A portion of the first initialization scan line GIL1 may be a gate electrode of the fourth transistor T4.

The first control scan line GCL1 may extend in the first direction DR1. The first control scan line GCL1 may be spaced apart from the first initialization scan line GIL1 in the second direction DR2 and may be located on the upper side of the first initialization scan line GIL1. The first control scan line GCL1 may be arranged to overlap a channel layer of the third transistor T3. A portion of the first control scan line GCL1 may be a gate electrode of the third transistor T3.

The first horizontal line VDD_H may extend in the first direction DR1. The first horizontal line VDD_H may be spaced apart from the first control scan line GCL1 in the second direction DR2 and may be located on the upper side of the first control scan line GCL1. The first horizontal line VDD_H may be arranged to overlap the first gate electrode GT1 of the first gate conductive layer and may serve as a second capacitance electrode of the capacitor C1.

A second interlayer insulating layer ILD2 may be located on the second gate conductive layer. The second interlayer insulating layer ILD2 may function as an insulating film between the second gate conductive layer and other layers located on the second gate conductive layer, and protect the second gate conductive layer.

The second semiconductor layer ACT2 may be located on the second interlayer insulating layer ILD2. The second semiconductor layer ACT2 may include an oxide semiconductor layer. The second semiconductor layer ACT2 may include active layers of the third transistor T3, the fourth transistor T4, and the seventh transistor T7.

The active layer of the third transistor T3 may include the channel layer, a first electrode, and a second electrode. The channel layer of the third transistor T3 may overlap the first control scan line GCL1 of the second gate conductive layer and a second control scan line GCL2 of a third gate conductive layer. A portion of the first control scan line GCL1 and a portion of the second control scan line GCL2 may serve as gate electrodes of the third transistor T3. The third transistor T3 may have a structure in which the gate electrodes are located above and below the active layer, respectively.

The first electrode of the third transistor T3 may be electrically connected to the second electrode of the first transistor T1. The second electrode of the third transistor may be connected to the first capacitance electrode of the capacitor C1 and the first electrode of the fourth transistor T4. The second electrode of the third transistor T3 may be electrically connected to the first capacitance electrode of the capacitor C1 and the first gate electrode GT1 of the first transistor T1 through a third conductive pattern CP3 of the first data conductive layer. The first electrode of the third transistor T3 may be electrically connected to the second electrode of the first transistor T1 through a fifth conductive pattern CP5 of the first data conductive layer.

The active layer of the fourth transistor T4 may include the channel layer, the first electrode, and a second electrode. The channel layer of the fourth transistor T4 may overlap the first initialization scan line GIL1 of the second gate conductive layer and a second initialization scan line GIL2 of the third gate conductive layer. A portion of the first initialization scan line GIL1 and a portion of the second initialization scan line GIL2 may serve as gate electrodes of the fourth transistor T4. Similar to the third transistor T3, the fourth transistor T4 may have a structure in which the gate electrodes are located above and below the active layer, respectively.

The first electrode of the fourth transistor T4 may be connected to the second electrode of the third transistor T3. The second electrode of the fourth transistor T4 may be electrically connected to the first initialization voltage line VIL1. The second electrode of the fourth transistor T4 may be electrically connected to the first initialization voltage line VIL1 through the fourth conductive pattern CP4 of the first data conductive layer.

The active layer of the seventh transistor T7 may include the channel layer, a first electrode, and the second electrode. The channel layer of the seventh transistor T7 may overlap the first bias scan line GBL1 of the first gate conductive layer and the second bias scan line GBL2 of the third gate conductive layer. Portions of the bias scan lines GBL1 and GBL2 may serve as the gate electrodes of the seventh transistor T7. The first electrode of the seventh transistor T7 may be electrically connected to a second initialization voltage line VIL2. The second electrode of the seventh transistor T7 may be electrically connected to the second electrode of the sixth transistor T6 and the pixel electrodes AE1, AE2, and AE3 of the light emitting elements ED. The first electrode of the seventh transistor T7 may be electrically connected to the second initialization voltage line VIL2 of the third gate conductive layer through a first voltage connection line CDL1 of the first data conductive layer.

A second gate insulating layer GI2 may be located on the second semiconductor layer ACT2. The second gate insulating layer GI2 may serve as a gate insulating film of transistors.

The third gate conductive layer may be located on the second gate insulating layer GI2. The third gate conductive layer may include the second initialization scan line GIL2, the second control scan line GCL2, the second bias scan line GBL2, and the second initialization voltage line VIL2.

The second initialization scan line GIL2 may extend in the first direction DR1. The second initialization scan line GIL2 may be located on the lower side of the pixel circuit units EAC1 and EAC2. The second initialization scan line GIL2 may be arranged to overlap the channel layer of the fourth transistor T4. The second initialization scan line GIL2 may overlap the first initialization scan line GIL1 of the second gate conductive layer in the thickness direction and extend in the same direction as the first initialization scan line GIL1. In some embodiments, the first initialization scan line GIL1 and the second initialization scan line GIL2 may have substantially the same pattern shape in a plan view.

The second control scan line GCL2 may extend in the first direction DR1. The second control scan line GCL2 may be spaced apart from the second initialization scan line GIL2 in the second direction DR2 and may be located on the upper side of the second initialization scan line GIL2. The second control scan line GCL2 may be arranged to overlap the channel layer of the third transistor T3. The second control scan line GCL2 may overlap the first control scan line GCL1 of the second gate conductive layer in the thickness direction and extend in the same direction as the first control scan line GCL1. In some embodiments, the first control scan line GCL1 and the second control scan line GCL2 may have substantially the same pattern shape in a plan view.

The second initialization voltage line VIL2 may extend in the first direction DR1. The second initialization voltage line VIL2 may be located on the upper side of the pixel circuit units EAC1 and EAC2. The second initialization voltage line VIL2 may be electrically connected to the first electrode of the seventh transistor T7. The second initialization voltage line VIL2 may be electrically connected to the first electrode of the seventh transistor T7 through the first voltage connection line CDL1 of the first data conductive layer.

The second bias scan line GBL2 may extend in the first direction DR1. The second bias scan line GBL2 may be spaced apart from the second initialization voltage line VIL2 in the second direction DR2 and may be located on the lower side of the second initialization voltage line VIL2. The second bias scan line GBL2 may be arranged to overlap the first bias scan line GBL1 of the first gate conductive layer.

A third interlayer insulating layer ILD3 may be located on the third gate conductive layer. The third interlayer insulating layer ILD3 may function as an insulating film between the third gate conductive layer and other layers located on the third gate conductive layer, and protect the third gate conductive layer.

The first data conductive layer may be located on the third interlayer insulating layer ILD3. The first data conductive layer may include the first voltage connection line CDL1 and a plurality of conductive patterns CP1, CP2, CP3, CP4, CP5, and CP6. The first voltage connection line CDL1 and the plurality of conductive patterns CP1, CP2, CP3, CP4, CP5, and CP6 may be connected to lines or semiconductor layers located at different layers, respectively, to electrically connect the lines or the semiconductor layers located at the different layers to each other.

The first to sixth conductive patterns CP1, CP2, CP3, CP4, CP5, and CP6 may be connected to layers located below the first data conductive layer through contact holes CNT1 to CNT12 penetrating through insulating layers located therebelow. Each of a plurality of contact holes CNT1 to CNT12 may penetrate through at least portions of the first gate insulating layer GI1, the second gate insulating layer GI2, the first interlayer insulating layer ILD1, the second interlayer insulating layer ILD2, and the third interlayer insulating layer ILD3.

For example, the first conductive pattern CP1 may be connected to the first semiconductor layer ACT1 through a first contact hole CNT1. The first conductive pattern CP1 may be connected to each of the first transistor T1 and the fifth transistor T5.

The second conductive pattern CP2 may be in contact with the first semiconductor layer ACT1 through a second contact hole CNT2. The second conductive pattern CP2 may be electrically connected to the second transistor T2.

The third conductive pattern CP3 may be in contact with the first gate electrode GT1 of the first transistor T1 through a fifth contact hole CNT5. In addition, the third conductive pattern CP3 may be in contact with the second semiconductor layer ACT2 through a sixth contact hole CNT6. The third conductive pattern CP3 may be electrically connected to the first gate electrode GT1 of the first transistor T1 and the third transistor T3.

The fourth conductive pattern CP4 may be connected to the first initialization voltage line VIL1 through a seventh contact hole CNT7. In addition, the fourth conductive pattern CP4 may be connected to the second semiconductor layer ACT2 through an eighth contact hole CNT8. The fourth conductive pattern CP4 may be electrically connected to each of the first initialization voltage line VIL1 and the fourth transistor T4.

The fifth conductive pattern CP5 may be connected to the first semiconductor layer ACT1 through a third contact hole CNT3 and be connected to the second semiconductor layer ACT2 through a fourth contact hole CNT4. The fifth conductive pattern CP5 may be electrically connected to each of the third transistor T3 and the sixth transistor T6.

The sixth conductive pattern CP6 may be connected to the first semiconductor layer ACT1 through a ninth contact hole CNT9 and be connected to the second semiconductor layer ACT2 through a tenth contact hole CNT10. The sixth conductive pattern CP6 may be electrically connected to each of the sixth transistor T6 and the seventh transistor T7.

The first voltage connection line CDL1 may extend in the second direction DR2 at the boundary between the pixel circuit units EAC1 and EAC2 adjacent to each other in the first direction DR1. Portions of the first voltage connection line CDL1 may protrude from a portion extending in the second direction DR2 to both sides in the first direction DR1, and the protruding portions may be connected to each of the seventh transistor T7 and the second initialization voltage line VIL2. The first voltage connection line CDL1 may be in contact with the second semiconductor layer ACT2 through an eleventh contact hole CNT11 and may be in contact with the second initialization voltage line VIL2 through a twelfth contact hole CNT12. The first voltage connection line CDL1 may be electrically connected to the seventh transistor T7 and the second initialization voltage line VIL2.

A first via layer VIA1 may be located on the first data conductive layer. The first via layer VIA1 may planarize a step formed by layers located therebelow while protecting the layers located therebelow.

The second data conductive layer may be located on the first via layer VIA1. The second data conductive layer may include a plurality of data lines DTL, the first vertical line VDD_V, and the first connection pattern CNE1.

The plurality of data lines DTL may extend in the second direction DR2. The data line DTL may be located in each of the two pixel circuit units EAC1 and EAC2 adjacent to each other. Two data lines DTL, which is a pair of data lines DTL, may be spaced apart from each other in the first direction DR1 with the first vertical line VDD_V interposed therebetween. The data line DTL of the first pixel circuit unit EAC1 may be located on the left side of the first vertical line VDD_V, and the data line DTL of the second pixel circuit unit EAC2 may be located on the right side of the first vertical line VDD_V.

According to some embodiments, data lines DTL of other pixel circuit units adjacent to the pixel circuit units EAC1 and EAC2 of FIGS. 9 and 10 in the first direction DR1 may be located adjacent to boundaries in contact with the pixel circuit units EAC1 and EAC2 of FIGS. 9 and 10. In other words, in the display device 10, pattern shapes of the lines, the semiconductor layers, and the electrodes illustrated in FIGS. 9 and 10 may be repeatedly arranged in the first direction DR1 and the second direction DR2 over the entirety of the main display area MDA. In the display device 10, the data lines DTL may be located adjacent to any one of boundaries between two pixel circuit units to each other in the first direction DR1, and the first vertical line VDD_V and the first voltage connection line CDL1 may be located at the other of the boundaries.

Each of the data lines DTL may be connected to the second conductive pattern CP2 through a second contact part CT2. The data line DTL may be electrically connected to the second transistor T2 of the first semiconductor layer ACT1 through the second conductive pattern CP2.

The first vertical line VDD_V may extend in the second direction DR2 and may be spaced apart from the data line DTL in the first direction DR1. The first vertical line VDD_V may have a relatively greater width in the first direction DR1 than the data line DTL. The first vertical line VDD_V of the two pixel circuit units EAC1 and EAC2 adjacent to each other may be located between two different data lines DTL. A first source voltage may be applied to the first vertical line VDD_V. The first vertical line VDD_V may be connected to the first conductive pattern CP1 through a first contact part CT1 and be electrically connected to the fifth transistor T5 through the first conductive pattern CP1.

The first connection pattern CNE1 may be connected to the sixth conductive pattern CP6 through a third contact part CT3. The first connection electrode CNE1 may be electrically connected to the sixth transistor T6 of the first semiconductor layer ACT1 through the sixth conductive pattern CP6.

A second via layer VIA2 may be located on the second data conductive layer. The second via layer VIA2 may planarize a step formed by layers located therebelow while protecting the layers located therebelow.

A third via layer VIA3 may be located on the second via layer VIA2. The third via layer VIA3 may planarize a step formed by layers located therebelow while protecting the layers located therebelow.

According to some embodiments, each of the above-described first to third gate conductive layers, first data conductive layer, and second data conductive layer may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof. Each of the above-described first and second gate insulating layers GI1 and GI2 and first to third interlayer insulating layers ILD1, ILD2, and ILD3 may include a plurality of inorganic layers that are alternately stacked. For example, each of the first and second gate insulating layers GI1 and GI2 and the first to third interlayer insulating layers ILD1, ILD2, and ILD3 may be formed as double layers in which inorganic layers including at least one of silicon oxide ($SiO_x$), silicon nitride ($SiN_x$), or silicon oxynitride ($SiO_xN_y$) are stacked or multiple layers in which these layers are alternately stacked. However, embodiments according to the present disclosure are not limited thereto. In some embodiments, the first to third interlayer insulating layer ILD1, ILD2, and ILD3 may also be made of an organic insulating material such as polyimide (PI). The first via layer VIA1 to the third via layer VIA3 may be made of an organic insulating material such as polyimide (PI).

The light emitting element layer EML may be located on the thin film transistor layer TFTL. The light emitting element layer EML may include light emitting elements ED1, ED2, and ED3 and a pixel defining film PDL. The light emitting elements ED1, ED2, and ED3 may include pixel electrodes AE1, AE2, and AE3, light emitting layers EL1, EL2, and EL3, and a common electrode CE, respectively.

The pixel electrodes AE1, AE2, and AE3 of the light emitting elements ED1, ED2, and ED3 may be located on the third via layer VIA3. The pixel electrodes AE1, AE2, and AE3 of the light emitting elements ED1, ED2, and ED3 may be connected to the first connection patterns CNE1 through first pixel contact holes CNTA1 penetrating through the second via layer VIA2 and the third via layer VIA3. The pixel electrodes AE1, AE2, and AE3 may be made of a metal material having high reflectivity, such as a stacked structure (Ti/Al/Ti) of aluminum and titanium, a stacked structure (ITO/Al/ITO) of aluminum and indium tin oxide (ITO), an APC alloy, and a stacked structure (ITO/APC/ITO) of an APC alloy and ITO. The APC alloy is an alloy of silver (Ag), palladium (Pd), and copper (Cu).

The pixel electrodes AE1, AE2, and AE3 may include a first pixel electrode AE1, a second pixel electrode AE2, and a third pixel electrode AE3 spaced apart from each other. The first to third pixel electrodes AE1, AE2, and AE3 may be arranged to correspond to the first to third emission areas EA1, EA2, and EA3, respectively. The first to third pixel electrodes AE1, AE2, and AE3 may be arranged to correspond to openings OPE1, OPE2, and OPE3 of a pixel defining film PDL to be described later, respectively, and the light emitting layers EL1, EL2, and EL3 may be located on portions of the first to third pixel electrodes AE1, AE2, and AE3 corresponding to the openings OPE1, OPE2, and OPE3 of the pixel defining film PDL, respectively.

The first to third pixel electrodes AE1, AE2, and AE3 may be electrically connected to the pixel circuit units EAC1 and EAC2 of FIGS. 9 to 11, respectively. The first to third pixel electrodes AE1, AE2, and AE3 may be electrically connected to the first transistors T1 and the sixth transistors T6 of the pixel circuit units EAC1 and EAC2, respectively. As illustrated in FIG. 11, different second and third pixel electrodes AE2 and AE3 may be connected to different first connection patterns CNE1 through first pixel contact holes CNTA1, respectively. The pixel circuit units EAC1 and EAC2 illustrated in FIGS. 9 to 11 may be pixel circuit units electrically connected to the second and third pixel electrodes AE2 and AE3, respectively. According to some embodiments, other pixel electrodes may be electrically connected to other pixel circuit units adjacent to the pixel circuit units EAC1 and EAC2 of FIGS. 9 to 11. An arrangement of the pixel electrodes AE1, AE2, and AE3 may be designed in consideration of an arrangement of the pixel defining film PDL and the emission areas EA1, EA2, and EA3, and the pixel electrodes AE1, AE2, and AE3 may include protruding parts protruding in one direction to be electrically connected to the first connection patterns CNE1 of the thin film transistor layer TFTL.

The pixel defining film PDL may be located on the third via layer VIA3 and may be located on portions of the pixel electrodes AE1, AE2, and AE3. The pixel defining film PDL may include openings OPE1, OPE2, and OPE3 exposing portions of the pixel electrodes AE1, AE2, and AE3. The pixel defining film PDL may include a first opening OPE1 overlapping the first pixel electrode AE1, a second opening OPE2 overlapping the second pixel electrode AE2, and a third opening OPE3 overlapping the third pixel electrode AE3. The pixel defining film PDL may be formed as an organic film made of an acrylic resin, an epoxy resin, a phenolic resin, a polyamide resin, a polyimide resin, or the like.

The light emitting layers EL1, EL2, and EL3 may be located on the pixel electrodes AE1, AE2, and AE3, respectively. The light emitting layers EL1, EL2, and EL3 may be organic light emitting layers made of an organic material, and may be formed on the pixel electrodes AE1, AE2, and AE3, respectively, through a deposition process. When a predetermined voltage is applied to the pixel electrodes AE1, AE2, and AE3 of the light emitting elements ED1, ED2, and ED3 and the common electrode CE of the light emitting elements ED1, ED2, and ED3 receives a common voltage or a cathode voltage, holes and electrons may move to the light emitting layers EL1, EL2, and EL3 through hole transporting layers and electron transporting layers, respectively, and may be combined with each other in the light emitting layers EL1, EL2, and EL3 to emit light.

The light emitting layers EL1, EL2, and EL3 may include a first light emitting layer EL1, a second light emitting layer EL2, and a third light emitting layer EL3 located in the different emission areas EA1, EA2, and EA3, respectively. The first light emitting layer EL1 may be located on the first pixel electrode AE1 in the first emission area EA1, the second light emitting layer EL2 may be located on the second pixel electrode AE2 in the second emission area EA2, and the third light emitting layer EL3 may be located on the third pixel electrode AE3 in the third emission area EA3. The first to third light emitting layers EL1, EL2, and EL3 may be light emitting layers of the first to third light emitting elements ED1, ED2 and ED3, respectively. Each of the light emitting layers EL1, EL2, and EL3 may include an organic material to emit light of a predetermined color. For example, each of the light emitting layers EL1, EL2, and EL3 may include a hole transporting layer, an organic material layer, and an electron transporting layer. The first light emitting layer EL1 may be a light emitting layer emitting the red light, which is the light of the first color, the second light emitting layer EL2 may be a light emitting layer emitting the green light, which is the light of the second color, and the third light emitting layer EL3 may be a light emitting layer emitting the blue light, which is the light of the third color.

The common electrode CE may be located on the light emitting layers EL1, EL2, and EL3 and the pixel defining film PDL. The common electrode CE may be formed to cover the light emitting layers EL1, EL2, and EL3. The common electrode CE may be arranged over the entirety of the light emitting element layer EML. According to some embodiments, a capping layer may be formed on the common electrode CE.

In a top emission structure, the common electrode CE may be made of a transparent conductive material (TCO) such as ITO or indium zinc oxide (IZO) capable of transmitting light therethrough or a semi-transmissive conductive material such as magnesium (Mg), silver (Ag), or an alloy of magnesium (Mg) and silver (Ag). When the common electrode CE is made of the semi-transmissive conductive material, light emitting efficiency of each of light emitting units may be increased by a micro cavity.

The thin film encapsulation layer TFEL may be located on the light emitting element layer EML. The thin film encapsulation layer TFEL may include at least one inorganic film in order to prevent or reduce instances of oxygen, contaminants, or moisture from penetrating into the light emitting elements ED1, ED2, and ED3. In addition, the thin film encapsulation layer TFEL may include at least one organic film in order to protect the light emitting elements ED1, ED2, and ED3 from foreign substances such as dust.

According to some embodiments, the thin film encapsulation layer TFEL may include a first encapsulation layer TFE1, a second encapsulation layer TFE2, and a third encapsulation layer TFE3 that are sequentially stacked. The first encapsulation layer TFE1 and the third encapsulation layer TFE3 may be inorganic encapsulation layers, and the second encapsulation layer TFE2 located between the first encapsulation layer TFE1 and the third encapsulation layer TFE3 may be an organic encapsulation layer.

Each of the first encapsulation layer TFE1 and the third encapsulation layer TFE3 may include one or more inorganic insulating materials. The inorganic insulating material may include aluminum oxide, titanium oxide, tantalum oxide, hafnium oxide, zinc oxide, silicon oxide, silicon nitride, and/or silicon oxynitride.

The second encapsulation layer TFE2 may include a polymer-based material. The polymer-based material may include an acrylic resin, an epoxy-based resin, polyimide, polyethylene, and the like. For example, the second encapsulation layer TFE2 may include an acrylic resin such as polymethyl methacrylate or polyacrylic acid. The second encapsulation layer TFE2 may be formed by curing a monomer or applying a polymer.

The touch sensing layer TSU may be located on the thin film encapsulation layer TFEL. The touch sensing layer TSU may include a first touch insulating layer SIL1, a second touch insulating layer SIL2, touch electrodes TL, and a third touch insulating layer SIL3.

The first touch insulating layer SIL1 may be located on the thin film encapsulation layer TFEL. The first touch insulating layer SIL1 may have insulating and optical functions. The first touch insulating layer SIL1 may include at least one inorganic film. Optionally, the first touch insulating layer SIL1 may be omitted.

The second touch insulating layer SIL2 may cover the first touch insulating layer SIL1. According to some embodiments, touch electrodes of another layer may be further located on the first touch insulating layer SIL1, and the second touch insulating layer SIL2 may cover such touch electrodes TL. The second touch insulating layer SIL2 may have insulating and optical functions. For example, the second touch insulating layer SIL2 may be an inorganic film including at least one of a silicon nitride layer, a silicon oxynitride layer, a silicon oxide layer, a titanium oxide layer, or an aluminum oxide layer.

Some of the touch electrodes TL may be located on the second touch insulating layer SIL2. Each of the touch electrodes TL may not overlap the first to third emission areas EA1, EA2, and EA3. Each of the touch electrodes TL may be formed as a single layer made of molybdenum (Mo), titanium (Ti), copper (Cu), aluminum (Al), or indium tin oxide (ITO) or be formed as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO.

The third touch insulating layer SIL3 may cover the touch electrodes TL and the second touch insulating layer SIL2. The third touch insulating layer SIL3 may have insulating and optical functions. The third touch insulating layer SIL3 may be made of the material described as being in the second touch insulating layer SIL2.

The light blocking layer BM may be located on the touch sensing layer TSU. The light blocking layer BM may include the plurality of opening holes OPT1, OPT2, and OPT3 arranged to overlap the emission areas EA1, EA2, and EA3. For example, a first opening hole OPT1 may be arranged to overlap the first emission area EA1. A second opening hole OPT2 may be arranged to overlap the second emission area EA2, and a third opening hole OPT3 may be arranged to overlap the third emission area EA3. An area or a size of each of the opening holes OPT1, OPT2, and OPT3 may be greater than the area or the size of each of the emission areas EA1, EA2, and EA3 defined by the pixel defining film PDL. The opening holes OPT1, OPT2, and OPT3 of the light blocking layer BM are formed to be greater than the emission areas EA1, EA2, and EA3, and accordingly, the light emitted from the emission areas EA1, EA2, and EA3 may be viewed by a user not only from a front surface but also from side surfaces of the display device 10.

The light blocking layer BM may include a light absorbing material. For example, the light blocking layer BM may include an inorganic black pigment or an organic black pigment. The inorganic black pigment may be carbon black, and the organic black pigment may include at least one of lactam black, perylene black, or aniline black, but embodiments according to the present disclosure are not limited thereto. The light blocking layer BM may prevent or reduce color mixing due to permeation of visible light between the first to third emission areas EA1, EA2, and EA3 to improve a color gamut of the display device 10.

The display device 10 may include a plurality of color filters CF1, CF2, and CF3 located on the emission areas EA1, EA2, and EA3. The plurality of color filters CF1, CF2, and CF3 may be arranged to correspond to the emission areas EA1, EA2, and EA3, respectively. For example, the color filters CF1, CF2, and CF3 may be located on the light blocking layer BM including the plurality of opening holes OPT1, OPT2, and OPT3 arranged to correspond to the emission areas EA1, EA2, and EA3. The opening holes of the light blocking layer BM may be formed to overlap the emission areas EA1, EA2, and EA3 and may form light emitting areas through which the light emitted from the emission areas EA1, EA2, and EA3 is emitted. Each of the color filters CF1, CF2, and CF3 may have a greater area than each of the opening holes of the light blocking layer BM, and each of the color filters CF1, CF2, and CF3 may completely cover the light emitting area formed by each of the opening holes.

The color filters CF1, CF2, and CF3 may include a first color filter CF1, a second color filter CF2, and a third color filter CF3 arranged to correspond to the different emission areas EA1, EA2, and EA3, respectively. The color filters CF1, CF2, and CF3 may include colorants such as dyes or pigments absorbing light of wavelength bands other than light of a specific wavelength band, and may be arranged to correspond to the colors of the light emitting from the emission areas EA1, EA2, and EA3. For example, the first color filter CF1 may be a red color filter arranged to overlap the first emission area EA1 and transmitting only the first light, which is the red light, therethrough. The second color filter CF2 may be a green color filter arranged to overlap the second emission area EA2 and transmitting only the second light, which is the green light, therethrough, and the third color filter CF3 may be a blue color filter arranged to overlap the third emission area EA3 and transmitting only the third light, which is the blue light, therethrough.

The plurality of color filters CF1, CF2, and CF3 may be spaced apart from other adjacent color filters CF1, CF2, and CF3 on the light blocking layer BM. The color filters CF1, CF2, and CF3 may have greater areas than the opening holes OPT1, OPT2, and OPT3 of the light blocking layer BM while covering the opening holes OPT1, OPT2, and OPT3 of the light blocking layer BM, respectively, but may have areas enough to be spaced apart from other color filters CF1, CF2, and CF3 on the light blocking layer BM. However, embodiments according to the present disclosure are not limited thereto. The plurality of color filters CF1, CF2, and CF3 may be arranged to partially overlap other adjacent color filters CF1, CF2, and CF3. Different color filters CF1, CF2, and CF3 may overlap each other on a light blocking layer BM to be described later, which is an area that does not overlap the emission areas EA1, EA2, and EA3. In the display device 10, the color filters CF1, CF2, and CF3 are arranged to overlap each other, and accordingly, an intensity of reflected light by external light may be reduced. Furthermore, a color feeling of the reflected light by the external light may be controlled by adjusting arrangements, shapes, areas, and the like, of the color filters CF1, CF2, and CF3 in a plan view.

The color filters CF1, CF2, and CF3 may be located on the light blocking layer BM. The different color filters CF1, CF2, and CF3 may be arranged to correspond to the different emission areas EA1, EA2, and EA3 or openings OPE1, OPE2, and OPE3 and the opening holes OPT1, OPT2, and OPT3 of the light blocking layer BM, respectively. For example, the first color filter CF1 may be arranged to correspond to the first emission area EA1, the second color filter CF2 may be arranged to correspond to the second emission area EA2, and the third color filter CF3 may be arranged to correspond to the third emission area EA3. The first color filter CF1 may be located in the first opening hole OPT1 of the light blocking layer BM, the second color filter CF2 may be located in the second opening hole OPT2 of the light blocking layer BM, and the third color filter CF3 is located in the third opening hole OPT3 of the light blocking layer BM. Each of the color filters CF1, CF2, and CF3 may be formed to have a greater area than each of the opening holes OPT1, OPT2, and OPT3 of the light blocking layer BM in a plan view, and a portion of each of the color filters CF1, CF2, and CF3 may be directly located on the light blocking layer BM.

An overcoat layer OC may be located on the color filters CF1, CF2, and CF3 to planarize upper ends of the color filters CF1, CF2, and CF3. The overcoat layer OC may be a colorless light transmitting layer that does not have a color of a visible light band. For example, the overcoat layer OC may include a colorless light transmitting organic material such as an acrylic resin.

The structure of the main pixel circuit units EAC1 and EAC2 described above may be a structure of the main pixel MPX located in the main display area MDA. The display device 10 may include the sub-display area SDA having a pixel arrangement and structure different from those of the main display area MDA, and the sub-pixel SPX of the sub-display area SDA may have a pixel circuit unit and an arrangement structure different from those of the main pixel MPX.

Figure 12:
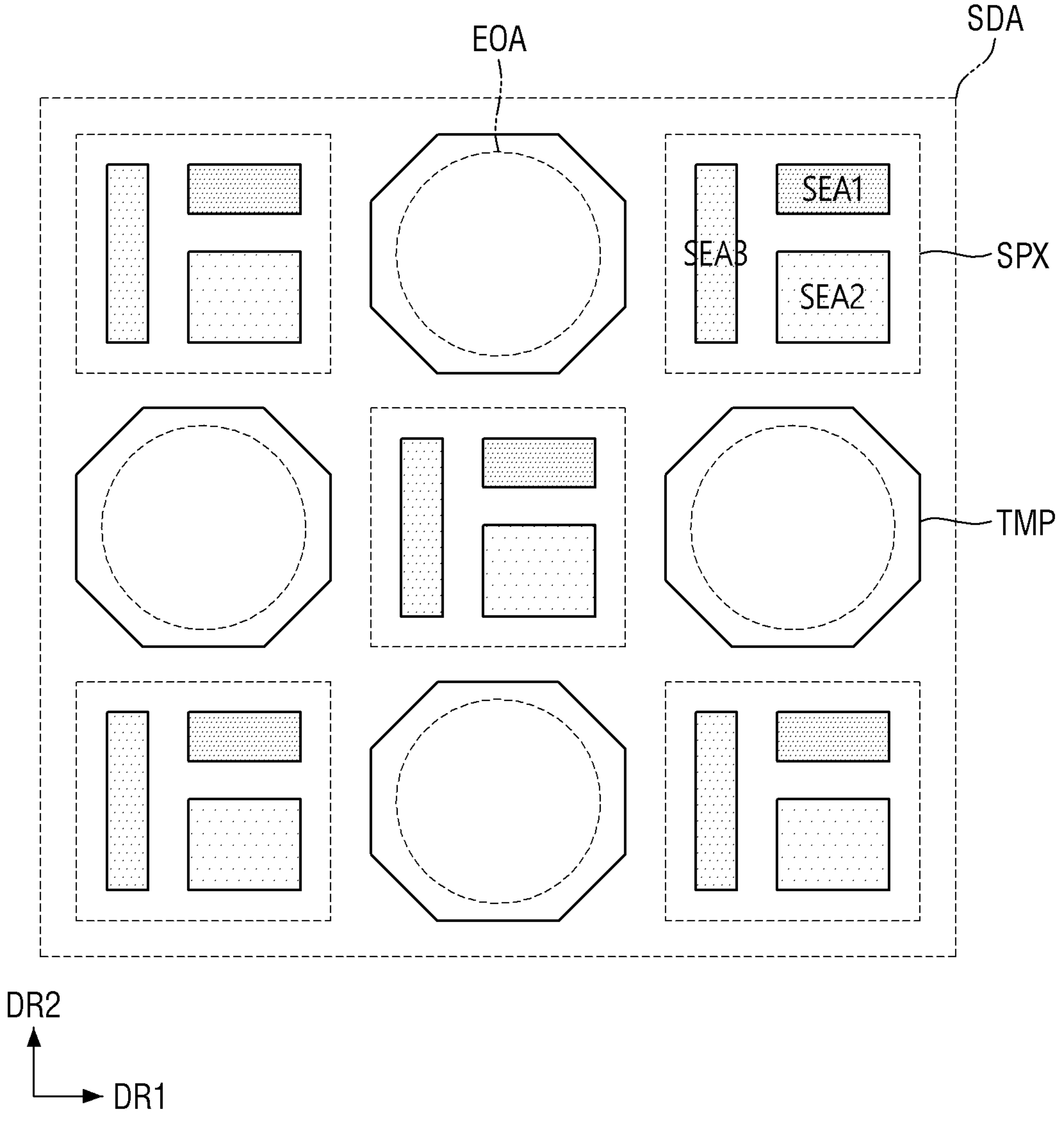
FIG. 12 is a schematic plan view illustrating an arrangement of sub-pixels located in the sub-display area of FIG. 6 according to some embodiments.
Figure 13:
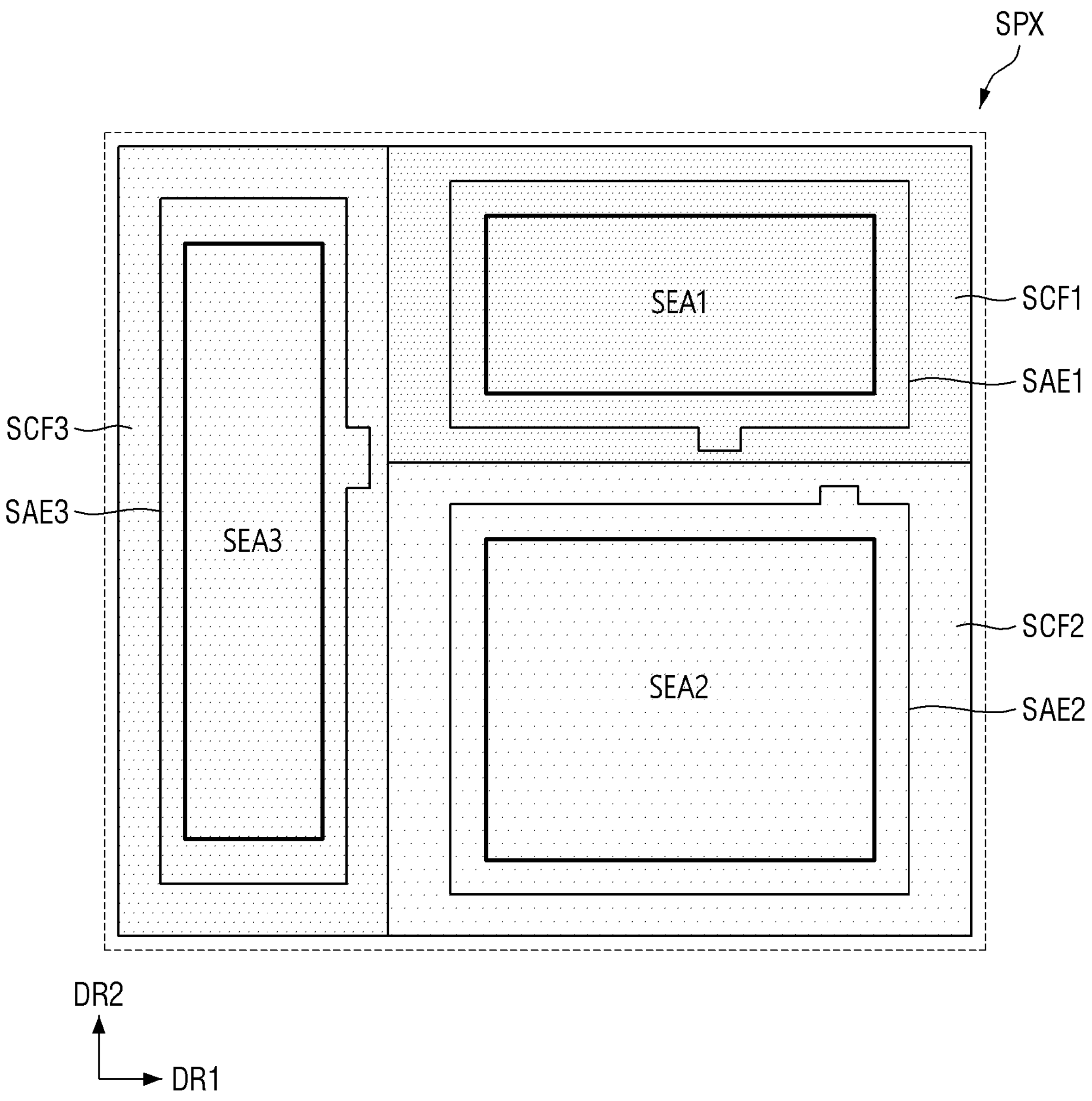
FIG. 13 is a plan view illustrating arrangements of sub-pixel electrodes and color filters of one sub-pixel of FIG. 12 according to some embodiments.

FIG. 12 is a schematic plan view illustrating an arrangement of sub-pixels located in the sub-display area of FIG. 6. FIG. 13 is a plan view illustrating arrangements of sub-pixel electrodes and color filters of one sub-pixel of FIG. 12.

Referring to FIGS. 12 and 13, the display device 10 according to some embodiments may include a plurality of sub-pixels SPX and a plurality of transmission parts EOA located in the sub-display area SDA. The plurality of sub-pixels SPX and the plurality of transmission parts EOA may be arranged in the first direction DR1 and the second direction DR2. The sub-pixels SPX and transmission parts EOA may be alternately and repeatedly arranged along the first direction DR1 and the second direction DR2. In the display device 10, the main display area MDA and the sub-display area SDA are different from each other in arrangements of the pixels MPX and SPX, and the sub-display area SDA is different from the main display area MDA in that the transmission parts EOA are located in the sub-display area SDA. The sub-pixel SPX may be an area in which a plurality of light emitting elements and emission areas are located, similar to the main pixel MPX, and the transmission part EOA may be an area in which a plurality of light emitting elements and emission areas are not located. The transmission part EOA is an area in which light is not emitted because the light emitting elements ED are not located. In the display device 10, the numbers of light emitting elements arranged per unit area in the main display area MDA and the sub-display area SDA may be different from each other. In the display device 10, patterns may be viewed due to a difference between the arrangements of the pixels MPX and SPX in the main display area MDA and the sub-display area SDA, but as described later, it is possible to suppress the patterns from being viewed through the light emitting elements located in the second sub-display area SDA2.

Each of the sub-pixels SPX may include a plurality of sub-emission areas SEA1, SEA2, and SEA3. The sub-pixel SPX may include a first sub-emission area SEA1, a second sub-emission area SEA2, and a third sub-emission area SEA3. The first sub-emission area SEA1 may be an area in which a first light emitting element ED1 emitting light of a red wavelength band is located, and may correspond to the first emission area EA1 of the main pixel MPX. The second sub-emission area SEA2 may be an area in which a second light emitting element ED2 emitting light of a green wavelength band is located, and may correspond to the second emission area EA2 of the main pixel MPX. The third sub-emission area SEA3 may be an area in which a third light emitting element ED3 emitting light of a blue wavelength band is located, and may correspond to the third emission area EA3 of the main pixel MPX.

In the sub-pixel SPX, the first sub-emission area SEA1 and the second sub-emission area SEA2 may be spaced apart from each other in the second direction DR2. The third sub-emission area SEA3 may be spaced apart from each of the first sub-emission area SEA1 and the second sub-emission area SEA2 in the first direction DR1. The first sub-emission area SEA1 may have a shape in which a length measured in the second direction DR2 is smaller than a length measured in the first direction DR1. The second sub-emission area SEA2 may have a shape in which a length measured in the second direction DR2 is the same as a length measured in the first direction DR1. The third sub-emission area SEA3 may have a shape in which a length measured in the second direction DR2 is greater than a length measured in the first direction DR1. Unlike the main display area MDA in which the plurality of emission areas EA1, EA2, and EA3 are arranged to be spaced apart from each other in the fourth and fifth directions DR4 and DR5, in the sub-display area SDA, the first to third sub-emission areas SEA1, SEA2, and SEA3 may be spaced apart from each other in the first direction DR1 or the second direction DR2.

The sub-pixel SPX may include sub-pixel electrodes SAE1, SAE2, and SAE3 and sub-color filters SCF1, SCF2, and SCF3 arranged to correspond to the sub-emission areas SEA1, SEA2, and SEA3, respectively. Each of a first sub-pixel electrode SAE1 and a first sub-color filter SCF1 may be located in the first sub-emission area SEA1, and each of a second sub-pixel electrode SAE2 and a second sub-color filter SCF2 may be located in the second sub-emission area SEA2. Each of a third sub-pixel electrode SAE3 and a third sub-color filter SCF3 may be located in the third sub-emission area SEA3. A plurality of sub-pixel electrodes SAE1, SAE2, and SAE3 and sub-color filters SCF1, SCF2, and SCF3 may have the same structures and roles as the pixel electrodes AE1, AE2, and AE3 and color filters CF1, CF2, and CF3 of the main display area MDA except for their arrangement structures.

Figure 14:
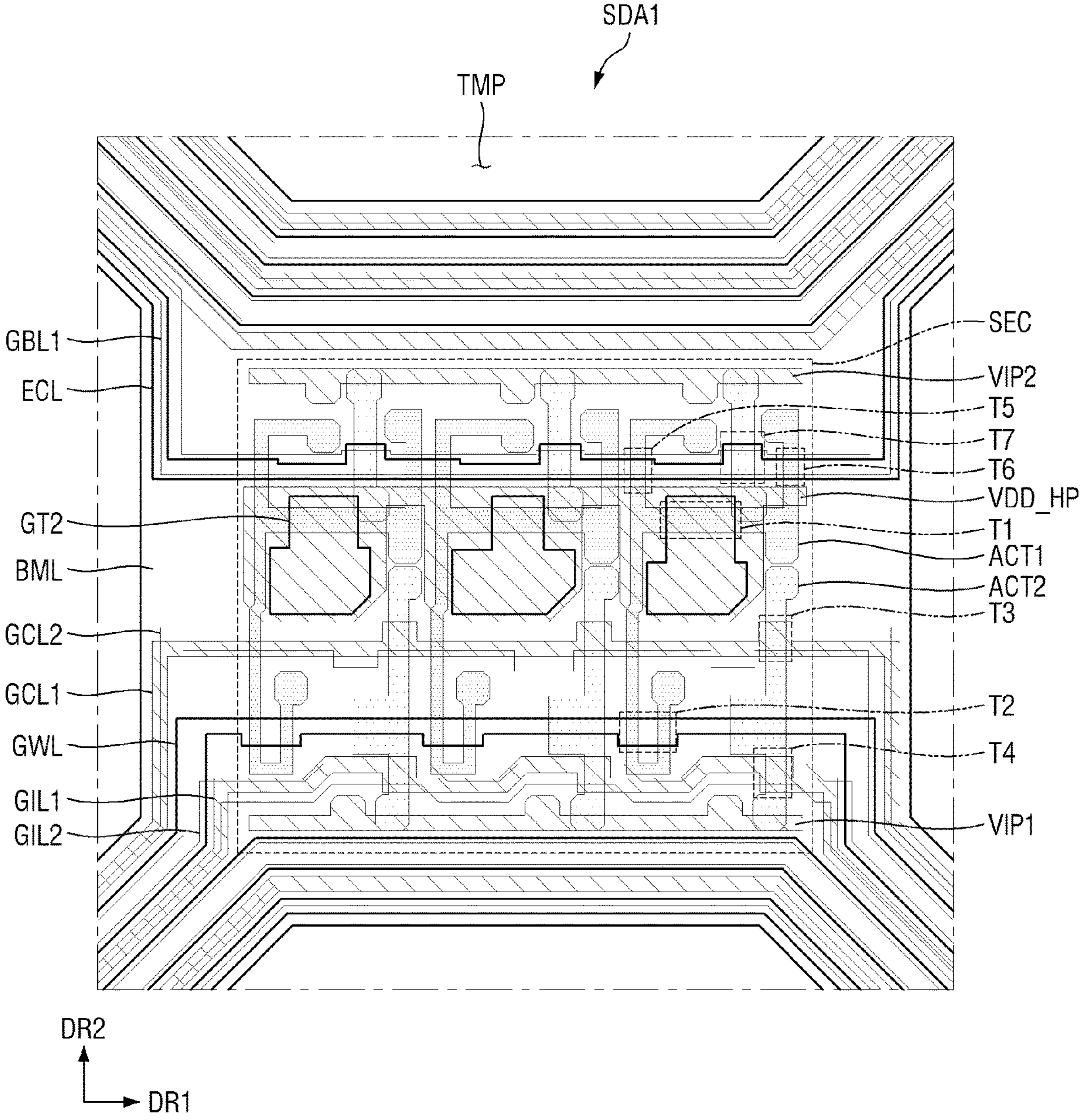
FIGS. 14 to 16 are layout diagrams of the sub-pixel of the display device according to some embodiments.
Figure 15:
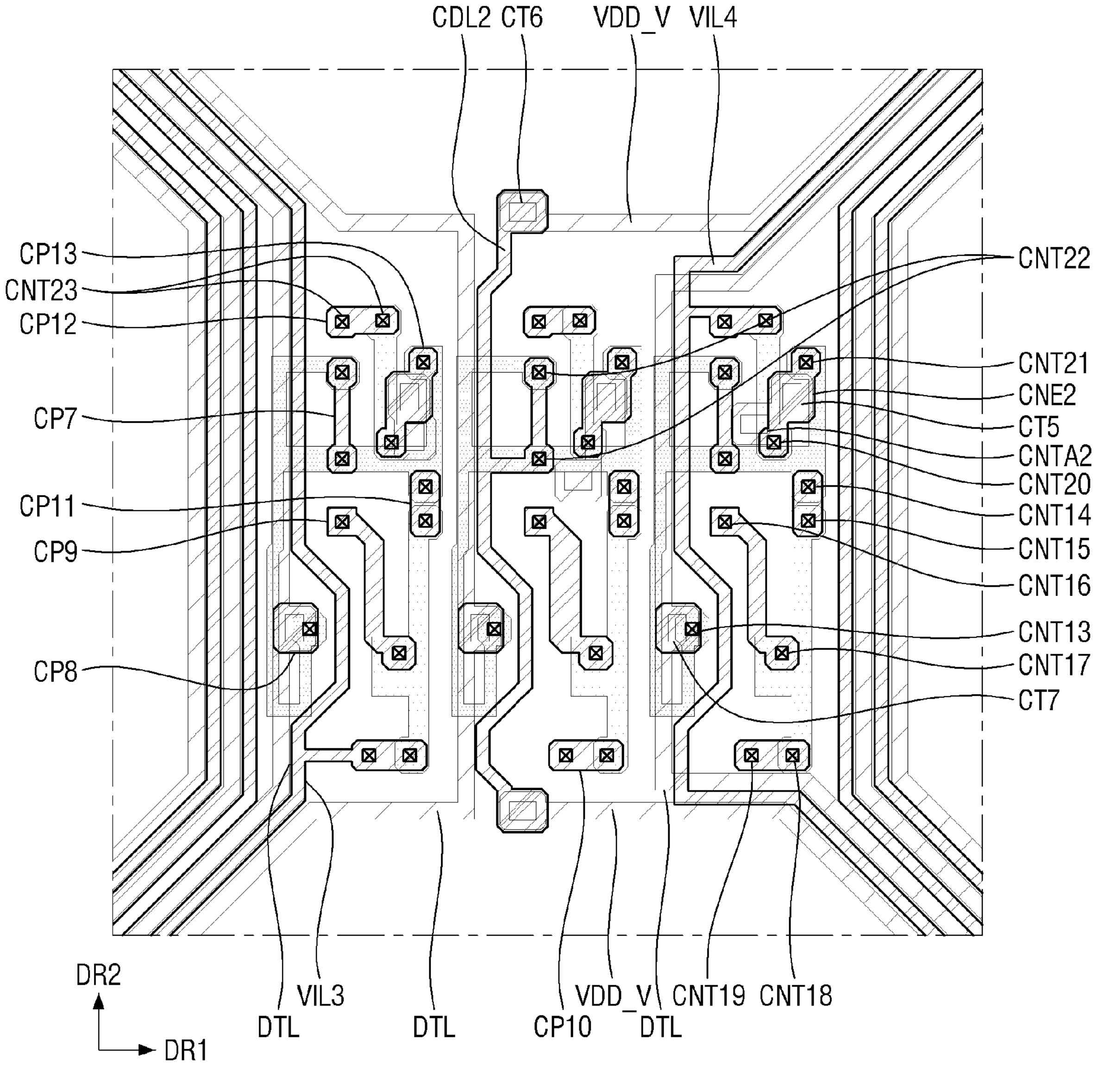
Figure 16:
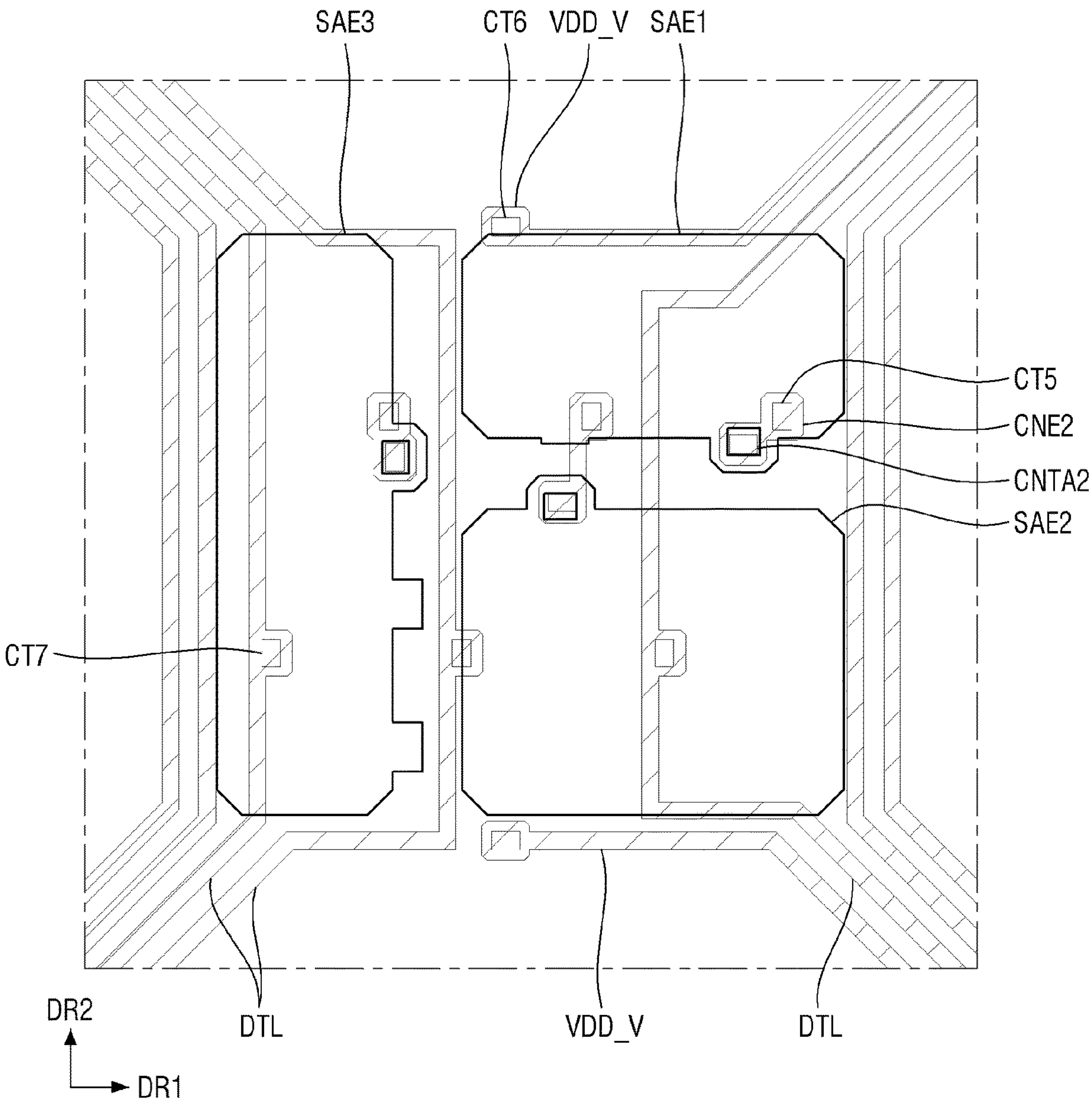
Figure 17:
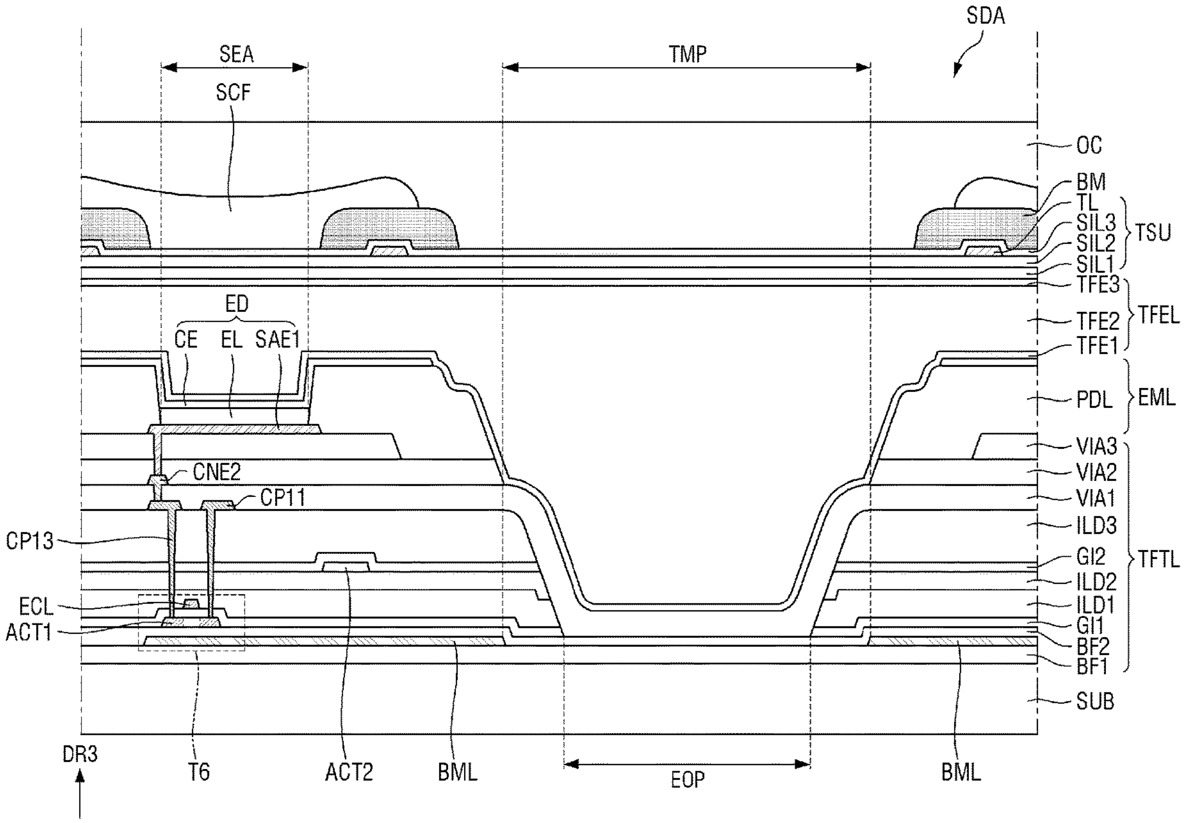
FIG. 17 is a schematic cross-sectional view illustrating structures of the sub-pixel and a transmission part of FIG. 6 according to some embodiments.

FIGS. 14 to 16 are layout diagrams of the sub-pixel of the display device according to some embodiments. FIG. 17 is a schematic cross-sectional view illustrating structures of the sub-pixel and a transmission part of FIG. 11. FIGS. 14 to 17 are layout diagrams illustrating sub-pixel circuit units SEC connected to the respective sub-pixels SPX of the sub-display area SDA. FIG. 17 is a cross-sectional view crossing the transmission part EOA and a portion of the sub-pixel SPX in the sub-display area SDA.

Referring to FIGS. 14 and 17, the display device 10 according to some embodiments may include a sub-pixel circuit unit SEC located in the sub-display area SDA and connected to the plurality of sub-pixels SPX. The sub-pixel circuit units SEC of the sub-pixel SPX may be electrically connected to light emitting elements located in three different sub-emission areas SEA1, SEA2, and SEA3, respectively. Each of the light emitting elements located in one sub-emission area SEA1, SEA2, or SEA3 may be electrically connected to a 7T1C pixel circuit of FIG. 5, and the sub-pixel circuit unit SEC illustrated in FIGS. 14 to 17 may include three 7T1C pixel circuits. That is, 27 transistors and 3 capacitors may be located in the sub-pixel circuit unit SEC illustrated in FIGS. 14 to 17. A pixel circuit to which the respective light emitting elements of the sub-pixel SPX are connected is the same as that described above with reference to FIG. 5. Hereinafter, arrangements and connections of semiconductor layers and lines located in the sub-pixel circuit unit SEC of the sub-pixel SPX will be described. In addition, buffer layers BF1 and BF2, gate insulating layers GI1 and GI2, interlayer insulating layers ILD1, ILD2, and ILD3, and via layers VIA1, VIA2, and VIA3 in a cross-sectional structure are the same as those described above, and a description thereof will thus be omitted below.

The lower metal layer BML may be located on the first buffer layer BF1. The lower metal layer BML may be arranged to overlap a portion of the first semiconductor layer ACT1 in the main display area MDA, but may be entirely arranged except for areas overlapping the transmission parts EOA in the sub-display area SDA. The lower metal layer BML may include a plurality of opening patterns TMP overlapping the sub-pixel circuit unit SEC of the sub-pixel SPX and each overlapping the transmission parts EOA. The opening patterns TMP may be arranged alternately with the sub-pixels SPX in the first direction DR1 and the second direction DR2 in the sub-display area SDA like the transmission parts EOA. The opening patterns TMP of the lower metal layer BML are areas through which light is transmitted, and light passing through the transmission parts EOA and the opening patterns TMP may be received by the optical device 500 located below the sub-display area SDA.

The first semiconductor layer ACT1 may include active layers of a first transistor T1, a second transistor T2, a fifth transistor T5, and a sixth transistor T6 of the sub-pixel circuit unit SEC.

A channel layer of the first transistor T1 may overlap a second gate electrode GT2 of the first gate conductive layer. A channel layer of the second transistor T2 may overlap a write scan line GWL of the first gate conductive layer. A portion of the write scan line may serve as a gate electrode of the second transistor T2. A first electrode of the second transistor T2 may be in contact with an eighth conductive pattern CP8 of the first data conductive layer and may be electrically connected to a data line DTL of the second data conductive layer through the eighth conductive pattern CP8. A channel layer of the fifth transistor T5 may overlap an emission control line ECL of the first gate conductive layer. A portion of the emission control line ECL may serve as a gate electrode of the fifth transistor T5. A first electrode of the fifth transistor T5 may be electrically connected to a first vertical line VDD_V of the second data conductive layer through a seventh conductive pattern CP7 of the first data conductive layer. A channel layer of the sixth transistor T6 may overlap the emission control line ECL of the first gate conductive layer. A portion of the emission control line ECL may serve as a gate electrode of the sixth transistor T6. A second electrode of the sixth transistor T6 may be electrically connected to the sub-pixel electrodes SAE1, SAE2, and SAE3 through a thirteenth conductive pattern CP13 of the first data conductive layer and a second connection pattern CNE2 of the second data conductive layer.

The first gate conductive layer may include the write scan line GWL, the second gate electrode GT2 of the first transistor T1, and the emission control line ECL located in the sub-display area SDA.

The second gate electrode GT2 of the first transistor T1 may be arranged to overlap the channel layer of the first transistor T1 in the first semiconductor layer ACT1. The second gate electrode GT2 of the first transistor T1 may be formed integrally with a first capacitance electrode of a capacitor C1. The first capacitance electrode of the capacitor C1 may be a portion of the second gate electrode GT2 of the first transistor T1.

The write scan line GWL may extend in the first direction DR1. The write scan line GWL may be arranged to overlap the lower metal layer BML and bypass the opening pattern TMP in the sub-display area SDA, and may extend in the first direction DR1 on the lower side of the sub-pixel circuit unit SEC. The write scan line GWL may be arranged to overlap the channel layer of the second transistor T2, and a portion of the write scan line GWL may be a gate electrode of the second transistor T2.

The emission control line ECL may extend in the first direction DR1. The emission control line ECL may be arranged to overlap the lower metal layer BML and bypass the opening pattern TMP in the sub-display area SDA, and may extend in the first direction DR1 on the upper side of the sub-pixel circuit unit SEC. The emission control line ECL may be arranged to overlap the channel layers of the fifth transistor T5 and the sixth transistor T6, and portions of the emission control line ECL may be gate electrodes of the fifth transistor T5 and the sixth transistor T6.

The second gate conductive layer may include a first initialization scan line GIL1, a first control scan line GCL1, a second horizontal line VDD_HP, and a plurality of initialization voltage distribution patterns VIP1 and VIP2 located in the sub-display area SDA.

Each of the first initialization scan line GIL1 and the first control scan line GCL1 may also extend in the first direction DR1. The first initialization scan line GIL1 and the first control scan line GCL1 may be arranged to overlap the lower metal layer BML and bypass the opening pattern TMP in the sub-display area SDA. The first initialization scan line GIL1 may extend in the first direction DR1 on the lower side of the write scan line GWL, and the first control scan line GCL1 may extend in the first direction DR1 on the upper side of the write scan line GWL.

The second horizontal line VDD_HP and the plurality of initialization voltage distribution patterns VIP1 and VIP2 may be connected to conductive patterns of the data conductive layer, respectively, to receive a source voltage or an initialization voltage. The second horizontal line VDD_HP may be located at the center of the sub-pixel circuit unit SEC and may have a shape in which it extends in the first direction DR1. The second horizontal line VDD_HP may be in contact with each of a second voltage connection line CDL2 and the seventh conductive pattern CP. A first source voltage may be applied to the second horizontal line VDD_HP through the second voltage connection line CDL2.

A first initialization voltage distribution pattern VIP1 may be located on the lower side of the sub-pixel circuit unit SEC and may have a shape in which it extends in the first direction DR1, and a second initialization voltage distribution pattern VIP2 may be located on the upper side of the sub-pixel circuit unit SEC and may have a shape in which it extends in the first direction DR1. The first initialization voltage distribution pattern VIP1 may be electrically connected to a third initialization voltage line VIL3 electrically connected to the first initialization voltage line VIL1. In addition, the first initialization voltage distribution pattern VIP1 may be connected to a tenth conductive pattern CP10. The second initialization voltage distribution pattern VIP2 may be electrically connected to a fourth initialization voltage line VIL4 electrically connected to the second initialization voltage line VIL2. In addition, the second initialization voltage distribution pattern VIP2 may be connected to a twelfth conductive pattern CP12.

The second semiconductor layer ACT2 may include active layers of a third transistor T3, a fourth transistor T4, and a seventh transistor T7 located in the sub-pixel circuit unit SEC.

A channel layer of the third transistor T3 may overlap the first control scan line GCL1 of the second gate conductive layer and a second control scan line GCL2 of the third gate conductive layer. A second electrode of the third transistor T3 may be electrically connected to the first capacitance electrode of the capacitor C1 and the second gate electrode GT2 of the first transistor T1 through a ninth conductive pattern CP9 of the first data conductive layer. A first electrode of the third transistor T3 may be electrically connected to a second electrode of the first transistor T1 through an eleventh conductive pattern CP11 of the first data conductive layer.

A channel layer of the fourth transistor T4 may overlap the first initialization scan line GIL1 of the second gate conductive layer and a second initialization scan line GIL2 of the third gate conductive layer. A second electrode of the fourth transistor T4 may be electrically connected to the first initialization voltage line VIL1. The second electrode of the fourth transistor T4 may be electrically connected to the first initialization voltage distribution pattern VIP1 or be electrically connected to the third initialization voltage line VIL3 through the tenth conductive pattern CP10 of the first data conductive layer.

A channel layer of the seventh transistor T7 may overlap a bias scan line GBL of the third gate conductive layer. A first electrode of the seventh transistor T7 may be electrically connected to a second initialization voltage line VIL2. The first electrode of the seventh transistor T7 may be electrically connected to the second initialization voltage distribution pattern VIP2 or be electrically connected to the fourth initialization voltage line VIL4 through the twelfth conductive pattern CP12 of the first data conductive layer.

The third gate conductive layer may include the second initialization scan line GIL2, the second control scan line GCL2, and the bias scan line GBL located in the sub-display area SDA.

Each of the second initialization scan line GIL2, the second control scan line GCL2, and the bias scan line GBL may extend in the first direction DR1. The second initialization scan line GIL2, the second control scan line GCL2, and the bias scan line GBL may be arranged to overlap the lower metal layer BML and bypass the opening pattern TMP in the sub-display area SDA. The second initialization scan line GIL2 may be arranged to extend in a similar pattern to the first initialization scan line GIL1, the second control scan line GCL2 may be arranged to extend in a similar pattern to the second initialization scan line GIL2, and the bias scan line GBL may be arranged to extend in a similar pattern to the emission control line ECL.

The first data conductive layer may include the second voltage connection line CDL2, a plurality of conductive patterns CP7, CP8, CP9, CP10, CP11, CP12, and CP13, the third initialization voltage line VIL3, and the fourth initialization voltage line VIL4 located in the sub-display area SDA.

The second voltage connection line CDL2 may be arranged to extend in the second direction DR2 at the center of the sub-pixel circuit unit SEC.

A portion of the second voltage connection line CDL2 may protrude from a portion extending in the second direction DR2 to one side in the first direction DR1, and the protruding portion may be in contact with the second horizontal line VDD_HP. The second voltage connection line CDL2 may be directly connected to the second horizontal line VDD_HP through twenty-second contact holes CNT22. In addition, the second voltage connection line CDL2 may be electrically connected to a first vertical line VDD_V to be described later.

The third initialization voltage line VIL3 and the fourth initialization voltage line VIL4 may extend in the second direction DR2. The third initialization voltage line VIL3 and the fourth initialization voltage line VIL4 may be arranged to overlap the lower metal layer BML and bypass the opening pattern TMP in the sub-display area SDA. The third initialization voltage line VIL3 may extend in the second direction DR2 on the left side of the sub-pixel circuit unit SEC, and the fourth initialization voltage line VIL4 may extend in the second direction DR2 on the right side of the sub-pixel circuit unit SEC. A portion of the third initialization voltage line VIL3 may protrude in the first direction DR1 to be in contact with portions of the first initialization voltage distribution pattern VIP1 and the second semiconductor layer ACT2. A portion of the fourth initialization voltage line VIL4 may protrude in the first direction DR1 to be in contact with portions of the second initialization voltage distribution pattern VIP2 and the second semiconductor layer ACT2.

According to some embodiments, the third initialization voltage line VIL3 and the fourth initialization voltage line VIL4 may be electrically connected to the first initialization voltage line VIL1 and the second initialization voltage line VIL2, respectively, at the boundary between the sub-display area SDA and the main display area MDA.

The seventh to thirteenth conductive patterns CP7, CP8, CP9, CP10, CP11, CP12, and CP13 may be connected to layers located below the first data conductive layer through contact holes CNT13 to CNT23 penetrating through insulating layers located therebelow. Each of a plurality of contact holes CNT13 to CNT23 may penetrate through at least portions of the first gate insulating layer GI1, the second gate insulating layer GI2, the first interlayer insulating layer ILD1, the second interlayer insulating layer ILD2, and the third interlayer insulating layer ILD3.

For example, the seventh conductive pattern CP7 may be in contact with the first semiconductor layer ACT1 and the second horizontal line VDD_HP through the twenty-second contact holes CNT22. The seventh conductive pattern CP7 may be electrically connected to each of the first transistor T1 and the fifth transistor T5. The eighth conductive pattern CP8 may be in contact with the first semiconductor layer ACT1 through a thirteenth contact hole CNT13. The eighth conductive pattern CP8 may be electrically connected to the second transistor T2.

The ninth conductive pattern CP9 may be in contact with the second gate electrode GT2 of the first transistor T1 through a sixteenth contact hole CNT16. In addition, the ninth conductive pattern CP9 may be in contact with the second semiconductor layer ACT2 through a seventeenth contact hole CNT17. The ninth conductive pattern CP9 may be electrically connected to the second gate electrode GT2 of the first transistor T1 and the third transistor T3. The tenth conductive pattern CP10 may be connected to the first initialization voltage distribution pattern VIP1 through a nineteenth contact hole CNT19. In addition, the tenth conductive pattern CP10 may be connected to the second semiconductor layer ACT2 through an eighteenth contact hole CNT18. The tenth conductive pattern CP10 may be electrically connected to each of the first initialization voltage distribution pattern VIP1 and the fourth transistor T4.

The eleventh conductive pattern CP11 may be connected to the first semiconductor layer ACT1 through a fourteenth contact hole CNT14 and be connected to the second semiconductor layer ACT2 through a fifteenth contact hole CNT15. The eleventh conductive pattern CP11 may be electrically connected to each of the third transistor T3 and the sixth transistor T6.

The twelfth conductive pattern CP12 may be connected to each of the second semiconductor layer ACT2 and the second initialization voltage distribution pattern VIP2 through twenty-third contact holes CNT23. The twelfth conductive pattern CP12 may be electrically connected to the fourth initialization voltage line VIL4.

The thirteenth conductive pattern CP13 may be connected to the first semiconductor layer ACT1 through a twenty-first contact hole CNT21 and be connected to the second semiconductor layer ACT2 through a twentieth contact hole CNT20. The thirteenth conductive pattern CP13 may be electrically connected to each of the sixth transistor T6 and the seventh transistor T7.

The second data conductive layer may include a plurality of data lines DTL, the first vertical line VDD_V, and the second connection pattern CNE2 located in the sub-display area SDA.

The plurality of data lines DTL may extend in the second direction DR2. The data lines DTL may also be arranged to overlap the lower metal layer BML and bypass the opening pattern TMP in the sub-display area SDA. One of the data lines DTL may extend in the second direction DR2 on the left side of the sub-pixel circuit unit SEC, and the other two data lines DTL of the data lines DTL may extend in the second direction DR2 while traversing the center of the sub-pixel circuit SEC. Each of the data lines DTL may be electrically connected to the eighth conductive pattern CP8 through a seventh contact part CT7.

The first vertical line VDD_V may extend in the second direction DR2. The first vertical line VDD_V may also be arranged to overlap the lower metal layer BML and bypass the opening pattern TMP in the sub-display area SDA. The first vertical line VDD_V may extend in the second direction DR2 while traversing the center of the sub-pixel circuit unit SEC. The first vertical line VDD_V may be electrically connected to the second voltage distribution line CDL2 through a sixth contact part CT6.

The second connection pattern CNE2 may be connected to the thirteenth conductive pattern CP13 through a fifth contact part CTS. The second connection pattern CNE2 may be electrically connected to the sixth transistor T6 of the first semiconductor layer ACT1 through the thirteenth conductive pattern CP13.

Light emitting elements ED1, ED2, and ED3 of the sub-pixel SPX may include sub-pixel electrodes SAE1, SAE2, and SAE3, respectively. The sub-pixel electrodes SAE1, SAE2, and SAE3 may be arranged to correspond to the sub-emission areas SEA1, SEA2, and SEA3, respectively. The first sub-pixel electrode SAE1 and the second sub-pixel electrode SAE2 may be arranged to be spaced apart from each other in the second direction DR2, and the third sub-pixel electrode SAE3 may be arranged to be spaced apart from the first sub-pixel electrode SAE1 and the second sub-pixel electrode SAE2 in the first direction DR1. The first to third sub-pixel electrodes SAE1, SAE2, and SAE3 may be connected to different second connection patterns CNE2 through second pixel contact holes CNTA2, respectively.

Meanwhile, the transmission parts EOA of the sub-display area SDA may be areas in which a plurality of conductive layers and semiconductor layers are not located. The transmission parts EOA are areas overlapping the opening patterns TMP of the lower metal layer BML, and may be areas in which a plurality of insulating layers located on the first buffer layer BF1 are removed. For example, the transmission parts EOA may be areas in which the second buffer layer BF2, the first and second gate insulating layers GI1 and GI2, and the first to third interlayer insulating layers ILD1, ILD2, and ILD3 are removed. In the transmission part EOA, the first via layer VIA1 may be directly located on the first buffer layer BF1, and the thin film encapsulation layer TFEL may be located on the first via layer VIA1. In the display device 10, a step may be formed between areas in which the sub-pixels SPX are located and the transmission parts EOA in the sub-display area SDA. For example, a height of a portion of the first via layer VIA1 located in an area overlapping the sub-pixel SPX may be greater than a height of a portion of the first via layer VIA1 located in the transmission part EOA. The first encapsulation layer TFE1 of the thin film encapsulation layer TFEL may also have different heights at a portion thereof located in the area overlapping the sub-pixel SPX and a portion thereof located in the transmission part EOA.

The plurality of opening patterns TMP and transmission parts EOA may be located in the sub-display area SDA, and a boundary between the first sub-display area SDA1 and the second sub-display area SDA2 may be formed regardless of an arrangement of the plurality of opening patterns TMP. That is, the boundary between the first sub-display area SDA1 and the second sub-display area SDA2 may be formed to overlap several opening patterns TMP. The opening patterns TMP may be patterns irrelevant to the first sub-display area SDA1 and the second sub-display area SDA2, but the transmission parts EOA may be formed only in the first sub-display area SDA1. For example, the transmission parts EOA located on the opening patterns TMP overlapping the boundary between the first sub-display area SDA1 and the second sub-display area SDA2 among the opening patterns TMP may have a relatively small size in a plan view.

Figure 18:
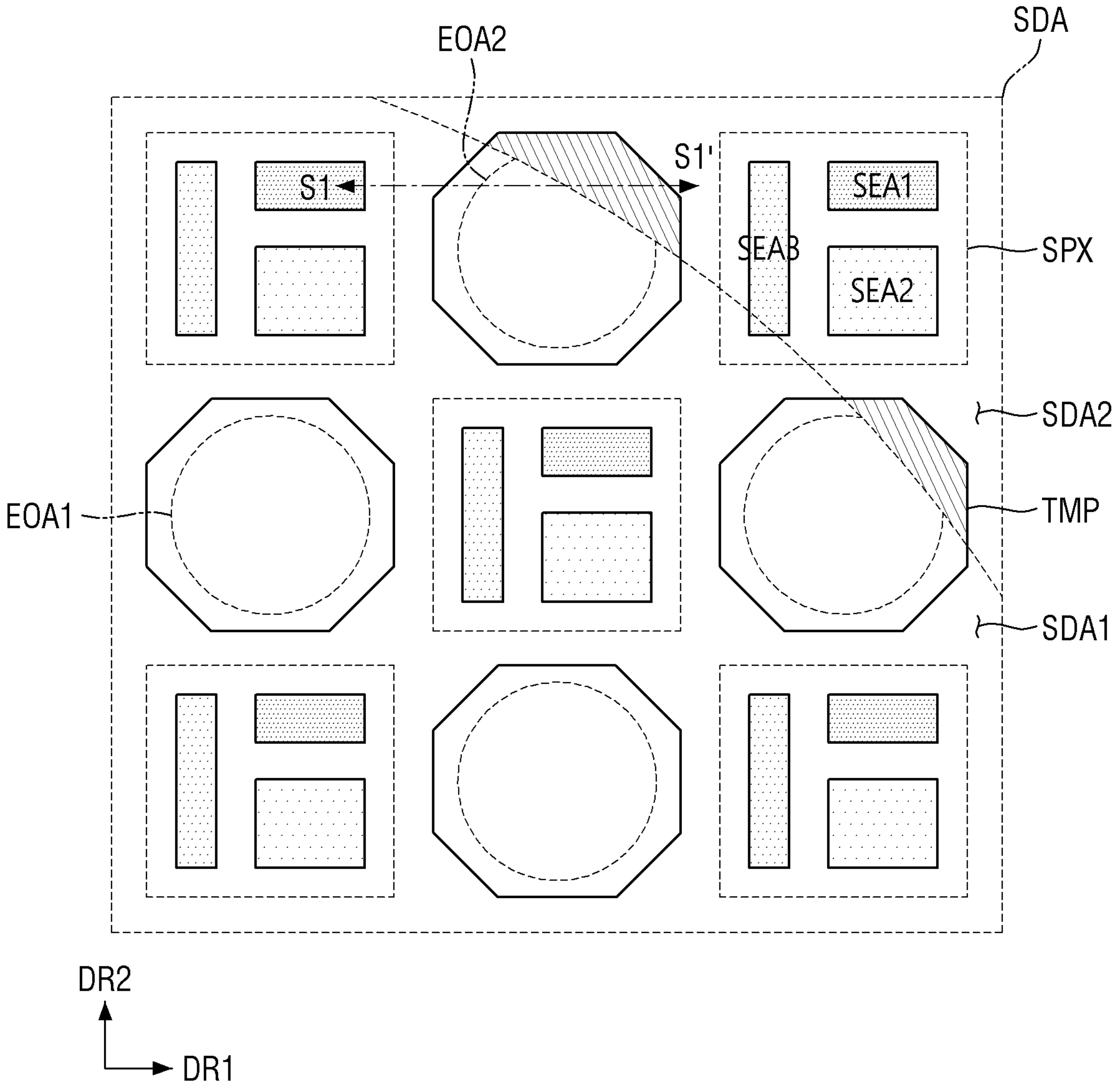
FIG. 18 is a schematic plan view illustrating a structure of a transmission part at a boundary between a first sub-display area and a second sub-display area of the display device according to some embodiments.
Figure 19:
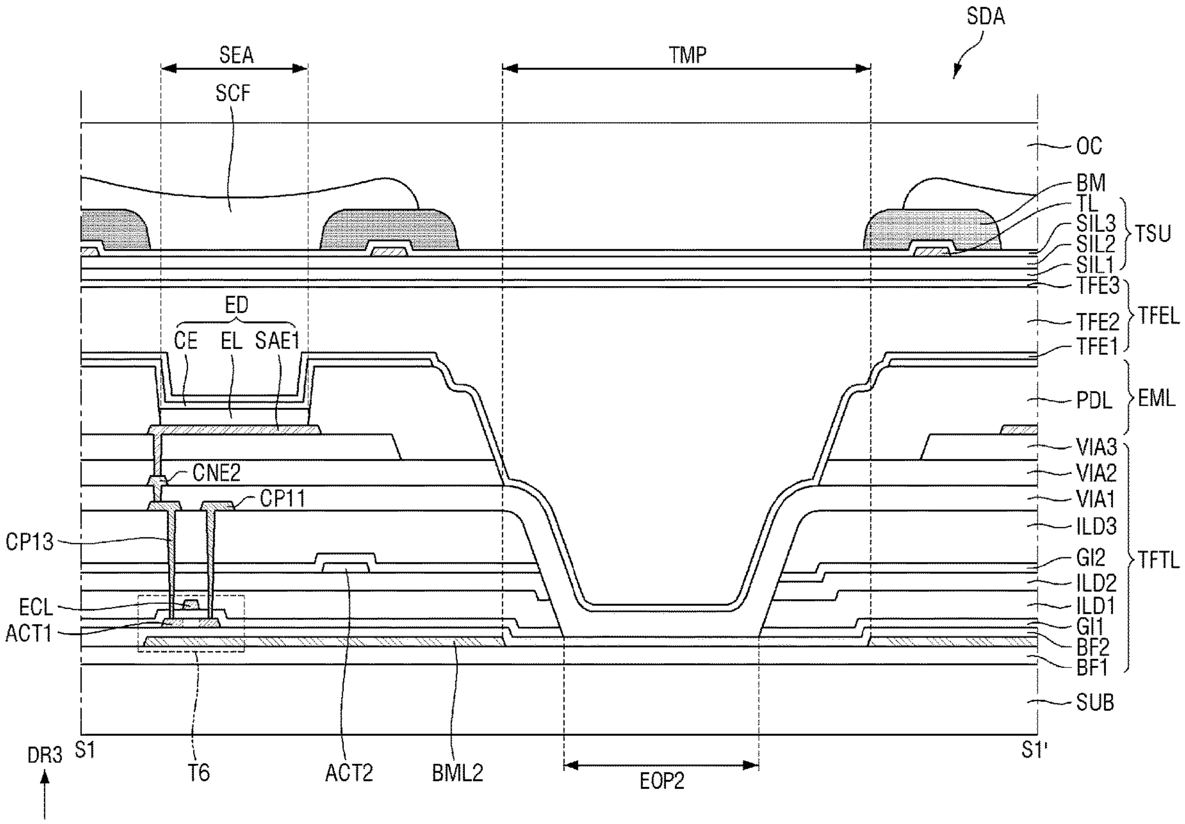
FIG. 19 is a cross-sectional view taken along the line S1-S1' of FIG. 18 according to some embodiments.

FIG. 18 is a schematic plan view illustrating a structure of a transmission part at a boundary between a first sub-display area and a second sub-display area of the display device according to some embodiments. FIG. 19 is a cross-sectional view taken along line S1-S1' of FIG. 18. FIG. 18 is a plan view illustrating an arrangement of the opening patterns TMP located at the boundary between the first sub-display area SDA1 and the second sub-display area SDA2, and FIG. 19 is a cross-sectional view crossing a second transmission part EOA2.

Referring to FIGS. 18 and 19, the display device 10 may include first transmission parts EOA1 and second transmission parts EOA2 having different sizes. The first transmission part EOA1 may be a transmission part overlapping an opening pattern TMP located within the first sub-display area SDA1. The second transmission part EOA2 may be a transmission part overlapping an opening pattern TMP arranged across the boundary between the first sub-display area SDA1 and the second sub-display area SDA2. In the display device 10, the transmission parts EOA1 and EOA2 may be formed on the opening patterns TMP only in the first sub-display area SDA1, and the transmission parts may not be formed in the second sub-display area SDA2 on the opening patterns TMP arranged across the boundary between the first sub-display area SDA1 and the second sub-display area SDA2.

Accordingly, the first transmission part EOA1 may have a perfectly circular shape in a plan view, similar to a shape of the opening pattern TMP On the other hand, the second transmission part EOA2 may have a shape along the boundary between the first sub-display area SDA1 and the second sub-display area SDA2, unlike the shape of the opening pattern TMP. The second transmission part EOA2 may be formed to be in contact with the second sub-display area SDA2, and an area of the first transmission part EOA1 in a plan view may be greater than an area of the second transmission part EOA2 in a plan view.

In the display device 10, an arrangement of the sub-pixels SPX and the transmission parts EOA located in the sub-display area SDA and an arrangement of the main pixels MPX located in the main display area MDA may be different from each other. A difference between the arrangements of the pixels MPX and SPX may cause a difference in an arrangement of the emission areas and a density of the emission areas per unit area, and in the display device 10, a boundary between different display areas may be viewed. According to some embodiments, the display device 10 may further include additional light emitting elements located at the outermost portion of the sub-display area SDA or in the second sub-display area SDA2 to prevent or reduce visibility of the boundary between the different display areas.

Figure 20:
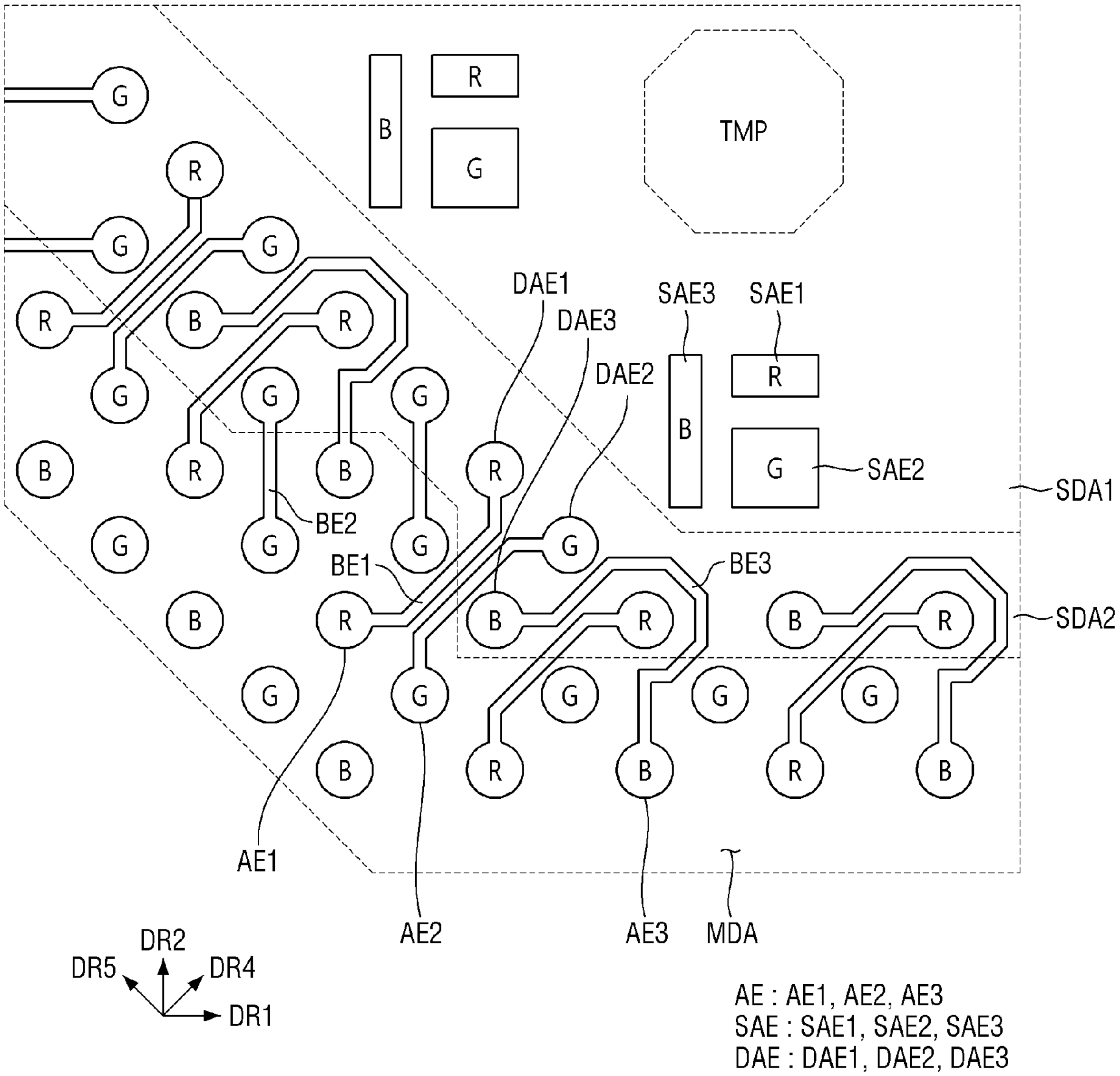
FIG. 20 is a plan view illustrating an arrangement of pixel electrodes located in the main display area and the sub-display area of the display device according to some embodiments.
Figure 21:
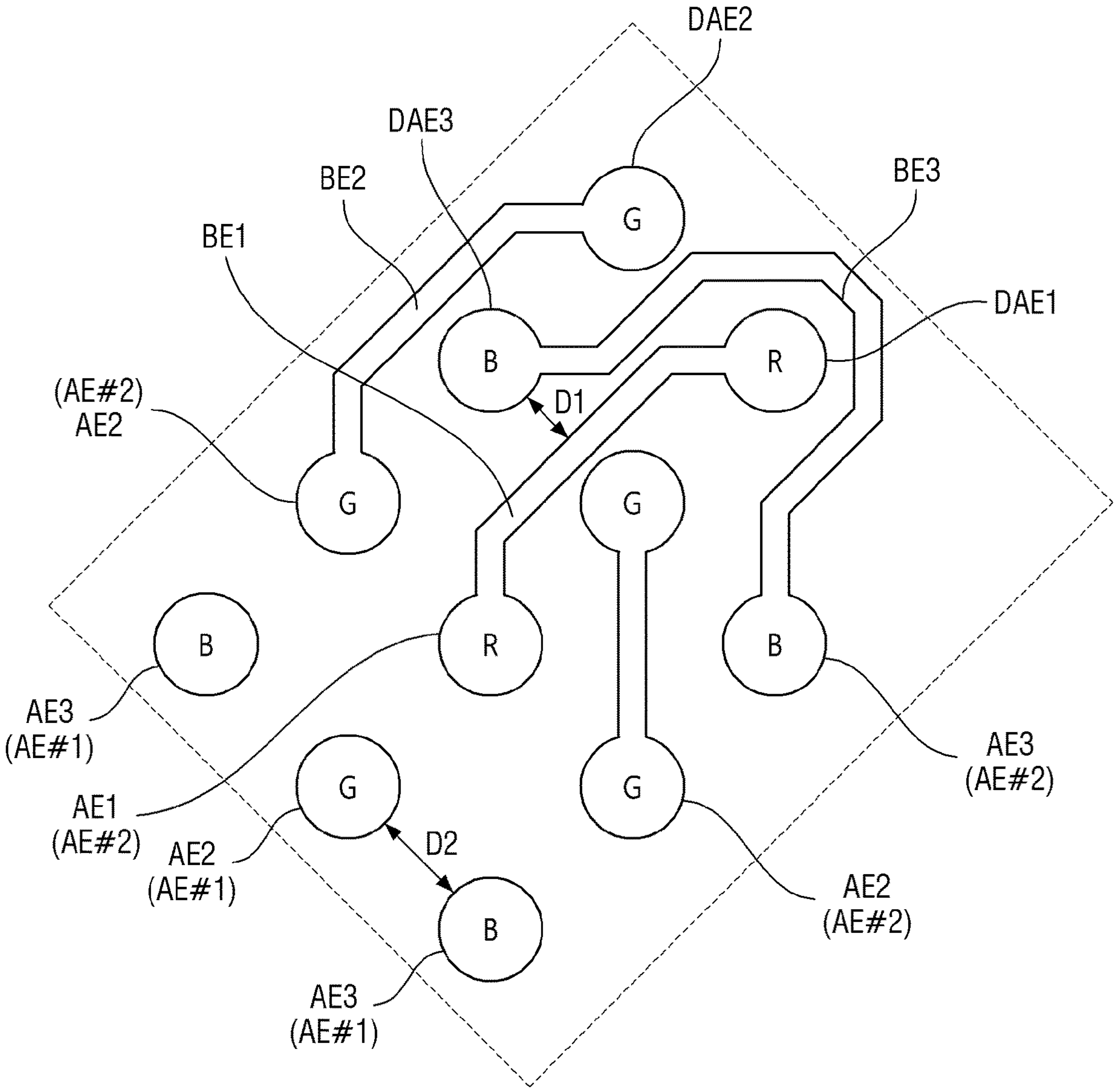
FIG. 21 is a plan view illustrating arrangements of the pixel electrodes and connection electrodes of FIG. 20 according to some embodiments.
Figure 22:
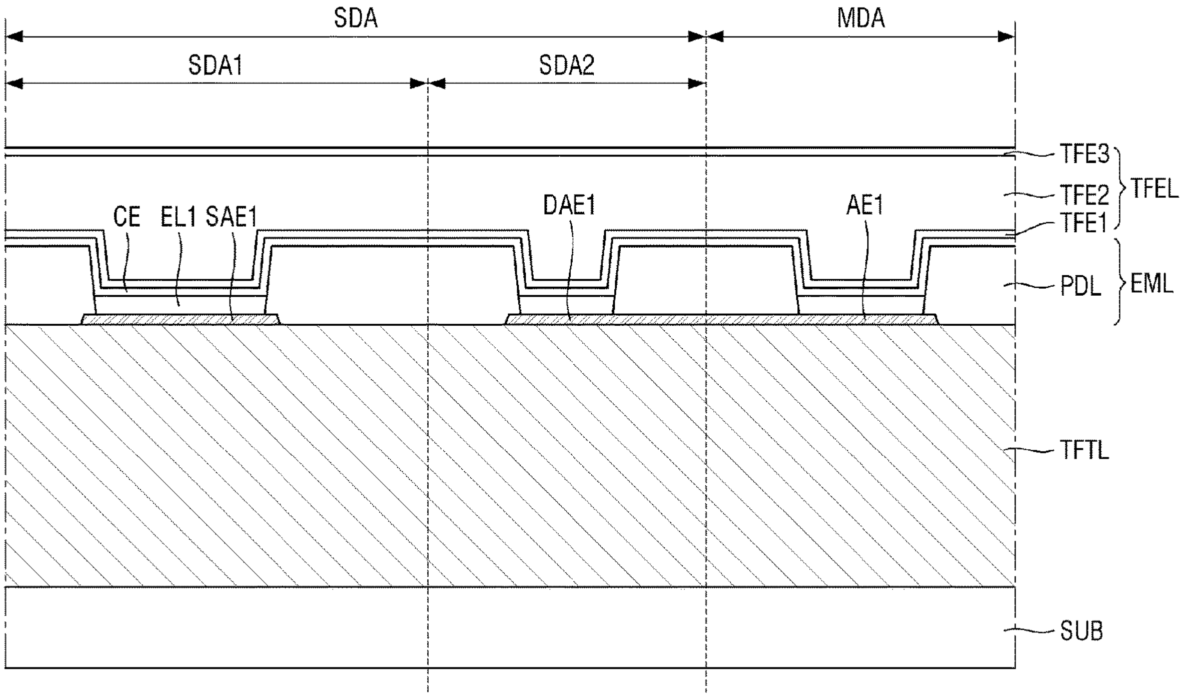
FIG. 22 is a cross-sectional view illustrating a structure of the pixel electrodes of the display device according to some embodiments.

FIG. 20 is a plan view illustrating an arrangement of pixel electrodes located in the main display area and the sub-display area of the display device according to some embodiments. FIG. 21 is a plan view illustrating arrangements of the pixel electrodes and connection electrodes of FIG. 20. FIG. 22 is a cross-sectional view illustrating a structure of the pixel electrodes of the display device according to some embodiments.

Referring to FIGS. 20 to 22, the display device 10 according to some embodiments may include main pixel electrodes AE located in the main display area MDA of the display area DA and sub-pixel electrodes SAE and dummy pixel electrodes DAE located in the sub-display area SDA of the display area DA.

A plurality of pixel electrodes AE may be located in the main display area MDA and may have the arrangement described above. For example, two adjacent pixel electrodes AE of different pixel electrodes AE1, AE2, and AE3 may be spaced apart in the fourth direction DR4 or the fifth direction DR5. The pixel electrodes AE1, AE2, and AE3 may be referred to as 'main pixel electrodes' in order to be distinguished from sub-pixel electrodes SAE and dummy pixel electrodes DAE to be described later.

A plurality of sub-pixel electrodes SAE may be located in the sub-display area SDA, for example, the first sub-display area SDA1 and the second sub-display area SDA2. The sub-pixel electrodes SAE may be arranged to be spaced apart from each other in the first direction DR1 or the second direction DR2 unlike the pixel electrodes AE. In FIG. 18, the sub-pixel electrodes SAE located in the second sub-display area SDA2 are illustrated.

A plurality of dummy pixel electrodes DAE may be located in the second sub-display area SDA2 of the sub-display area SDA. The dummy pixel electrodes DAE are not located on the first sub-display area SDA1, and may be located only in the second sub-display area SDA2 between the first sub-display area SDA1 and the main display area MDA. The dummy pixel electrodes DAE may have substantially the same arrangement as the main pixel electrodes AE. For example, adjacent dummy pixel electrodes DAE may be spaced apart from each other in the fourth direction DR5 or the fifth direction DR5. The dummy pixel electrodes DAE may be arranged in the fourth direction DR4 or the fifth direction DR5 together with the pixel electrodes AE1, AE2, and AE3.

The arrangements of the main pixel electrodes AE and the dummy pixel electrodes DAE are the same as each other, and accordingly, a dummy pixel electrode DAE spaced apart from a first main pixel electrode AE1 in the second direction DR2 may be a third dummy pixel electrode DAE3. A dummy pixel electrode DAE spaced apart from a second main pixel electrode AE2 in the second direction DR2 may be a second dummy pixel electrode DAE2, and a dummy pixel electrode DAE spaced apart from a third main pixel electrode AE3 may be a first dummy pixel electrode DAE1.

Light emitting layers EL1, EL2, and EL3 and a common electrode CE may be located on each of the main pixel electrodes AE, the sub-pixel electrodes SAE, and the dummy pixel electrodes DAE. The respective pixel electrodes may be anode electrodes of the light emitting elements ED1, ED2, and ED3, and the light emitting elements ED1, ED2, and ED3 including the respective pixel electrodes may emit light in the display area DA. In other words, in the main display area MDA, the light may be emitted by the light emitting elements ED1, ED2, and ED3 including the main pixel electrodes AE1, AE2, and AE3, and in the sub-display area SDA, for example, the second sub-display area SDA2, the light may be emitted by the light emitting elements ED1, ED2, and ED3 including the sub-pixel electrodes SAE and the dummy pixel electrodes DAE.

In the main display area MDA, the light emitting elements ED1, ED2, and ED3 including the main pixel electrodes AE may be electrically connected to the pixel circuit units EAC1 and EAC2 described above with reference to FIGS. 9 to 11. The main pixel electrodes AE of the main display area MDA may be electrically connected to the first transistors T1 and the sixth transistors T6 of the pixel circuit units EAC1 and EAC2, respectively. In the sub-display area SDA, the light emitting elements ED1, ED2, and ED3 including the sub-pixel electrodes SAE may be electrically connected to the sub-pixel circuit unit SEC described above with reference to FIGS. 14 to 17. The sub-pixel electrodes SAE of the sub-display area SDA may be electrically connected to the first transistor T1 and the sixth transistor T6 of the sub-pixel circuit unit SEC, respectively. The main pixel electrodes AE and the sub-pixel electrodes SAE may be pixel electrodes arranged to overlap the pixel circuit units EAC1 and EAC2 and the sub-pixel circuit unit SEC, respectively.

The dummy pixel electrodes DAE may be arranged to surround the plurality of sub-pixels SPX located in the sub-display area SDA, respectively. Only a portion of the sub-display area SDA has been illustrated in FIG. 20, but as illustrated in FIG. 6, dummy emission areas DEA1, DEA2, and DEA3 by the plurality of dummy pixel electrodes DAE may be located at the outermost portion of the sub-display area SDA. The dummy pixel electrodes DAE may be surrounded by the main pixel electrodes AE1, AE2, and AE3 of the main display area MDA. The sub-pixel electrodes SAE, the dummy pixel electrodes DAE, and the main pixel electrodes AE may be sequentially arranged from the center of the sub-display area SDA toward the main display area MDA.

The display device 10 according to some embodiments may include the dummy pixel electrodes DAE located in the sub-display area SDA and electrically connected to the main pixel electrodes AE of the main display area MDA. The dummy pixel electrodes DAE may be pixel electrodes that do not overlap the pixel circuit unit, and the same electrical signals as electrical signals applied to the main pixel electrodes AE1, AE2, and AE3 of the main display area MDA may be applied to the dummy pixel electrodes DAE. That is, the dummy pixel electrodes DAE do not directly receive light emitting signal from the pixel circuit unit, and may receive light emitting signals from the main pixel electrodes AE of the main display area MDA.

According to some embodiments, the main pixel electrodes AE and the dummy pixel electrodes DAE may be directly connected to each other through connection electrodes BE1, BE2, and BE3. The first dummy pixel electrode DAE1 may be connected to the first main pixel electrode AE1 through a first connection electrode BE1. The second dummy pixel electrode DAE2 may be connected to the second main pixel electrode AE2 through a second connection electrode BE2, and the third dummy pixel electrode DAE3 may be connected to the third main pixel electrode AE3 through a third connection electrode BE3. In the display device 10 of FIGS. 20 and 21, the dummy pixel electrodes DAE, the main pixel electrodes AE1, AE2, and AE3, and the connection electrodes BE1, BE2, and BE3 may be directly located on the third via layer VIA3 and may be integrated with each other. However, embodiments according to the present disclosure are not limited thereto. At least the dummy pixel electrodes DAE and the main pixel electrodes AE may be directly located on the third via layer VIA3, but the connection electrodes BE1, BE2, and BE3 may be located at another layer.

Each of the dummy pixel electrodes DAE may be connected to a main pixel electrode AE adjacent thereto, and the connection electrodes BE1, BE2, and BE3 connecting the dummy pixel electrodes DAE and the main pixel electrodes AE to each other may be located between the dummy pixel electrodes DAE or between the dummy pixel electrode DAE and the main pixel electrode AE. The connection electrodes BE1, BE2, and BE3 may be arranged to bypass the pixel electrodes so as not to overlap the pixel electrodes in the sub-display area SDA. For example, the first connection electrode BE1 connecting the first main pixel electrode AE1 and the first dummy pixel electrode DAE1 to each other may be located between the second dummy pixel electrode DAE2 and the third dummy pixel electrode DAE3. The first connection electrode BE1 may be arranged to bypass the second dummy pixel electrode DAE2 located between the first main pixel electrode AE1 and the first dummy pixel electrode DAE1. Similarly, the second connection electrode BE2 connecting the second main pixel electrode AE2 and the second dummy pixel electrode DAE2 to each other may be located between the first main pixel electrode AE1 and the third dummy pixel electrode DAE3. The third connection electrode BE3 connecting the third main pixel electrode AE3 and the third dummy pixel electrode DAE3 to each other may be located to bypass the first dummy pixel electrode DAE1. A portion of the third connection electrode BE3 may be located between the first dummy pixel electrode DAE1 and the second dummy pixel electrode DAE2 located adjacent to each other. The third connection electrode BE3 may be arranged to surround the first dummy pixel electrode DAE1.

The connection electrodes BE1, BE2, and BE3 are located at the same layer as the main pixel electrodes AE and the dummy pixel electrodes DAE, and accordingly, intervals between patterns located on the third via layer VIA3 may be different from each other. For example, the connection electrodes BE1, BE2, and BE3 are not located between the main pixel electrodes AE in the main display area MDA, and in the main display area MDA, an interval D1 between patterns of the conductive layer located on the third via layer VIA3 may be the same as an interval between the main pixel electrodes AE. On the other hand, the connection electrodes BE1, BE2, and BE3 may be located between the main pixel electrode AE and the dummy pixel electrode DAE or between the dummy pixel electrodes DAE in the sub-display area SDA. In an area in which the dummy pixel electrodes DAE are located in the sub-display area SDA, an interval D2 between patterns of the conductive layer located on the third via layer VIA3 may be smaller than an interval between the main pixel electrode AE and the dummy pixel electrode DAE or between the dummy pixel electrodes DAE.

However, this is only an example of arrangements of the main pixel electrodes AE, the dummy pixel electrodes DAE, and the connection electrodes BE1, BE2, and BE3, and arrangements and structures of the main pixel electrodes AE, the dummy pixel electrodes DAE, and the connection electrodes BE1, BE2, and BE3 may be variously modified. The display device 10 may include the plurality of dummy pixel electrodes DAE located at the outermost portion of the sub-display area SDA, and the dummy pixel electrodes DAE may have various arrangement structures as long as they are connected to the main pixel electrodes AE adjacent thereto.

When light emitting signals are applied to the main pixel electrodes AE of the main display area MDA and the light emitting elements ED1, ED2, and ED3 of the main display area MDA emit light, the light emitting signals may also be transferred to the dummy pixel electrodes DAE of the sub-display area SDA. The light emitting elements ED1, ED2, and ED3 including the dummy pixel electrodes DAE may emit light together with the light emitting elements ED1, ED2, and ED3 of the main display area MDA. The light emitting elements ED1, ED2, and ED3 located in the main pixels MPX of the main display area MDA and the sub-pixels SPX of the sub-display area SDA may individually emit the light. However, the light emitting elements ED1, ED2, and ED3 including the dummy pixel electrodes DAE of the sub-display area SDA may emit the light together with some of the main pixels MPX of the main display area MDA. The display device 10 may include additional light emitting elements located at the boundary between the main display area MDA and the sub-display area SDA to suppress the boundary from being viewed due to a structural difference.

According to some embodiments, the main pixel electrodes AE1, AE2, and AE3 of the display device 10 may include independent pixel electrodes AE #1 that are not electrically connected to the dummy pixel electrodes DAE and connected pixel electrodes AE #2 that are electrically connected to the dummy pixel electrodes DAE. The connected pixel electrodes AE #2 may be pixel electrodes located adjacent to the sub-display area SDA and electrically connected to the dummy pixel electrodes DAE through the connection electrodes BE1, BE2, and BE3. The independent pixel electrodes AE #1 may be pixel electrodes other than the connected pixel electrodes AE #2 among the main pixel electrodes AE1, AE2, and AE3. The independent pixel electrodes AE #1 may be arranged over the entirety of the main display area MDA, and the connected pixel electrodes AE #2 may be located only in an area of the main display area MDA surrounding the sub-display area SDA.

Electrical signals for light emission of one light emitting element may be applied to the independent pixel electrodes AE #1, while electrical signals for light emission of one or more light emitting elements may be applied to the connected pixel electrodes AE #2. For example, electrical signals only for the light emitting elements ED1, ED2, and ED3 corresponding to the independent pixel electrodes AE #1 may be applied to the independent pixel electrodes AE #1. On the other hand, electrical signals for light emission of the light emitting elements corresponding to the dummy pixel electrodes DAE connected to the connected pixel electrodes AE #2 as well as the light emitting elements ED1, ED2, and ED3 corresponding to the connected pixel electrodes AE #2 may be applied to the connected pixel electrodes AE #2. Accordingly, a pixel circuit unit connected to the independent pixel electrodes AE #1 and a pixel circuit unit connected to the connected pixel electrodes AE #2 among the pixel circuit units EAC1 and EAC2 connected to the main pixel electrodes AE1, AE2, and AE3 may have different structures.

Figure 23:
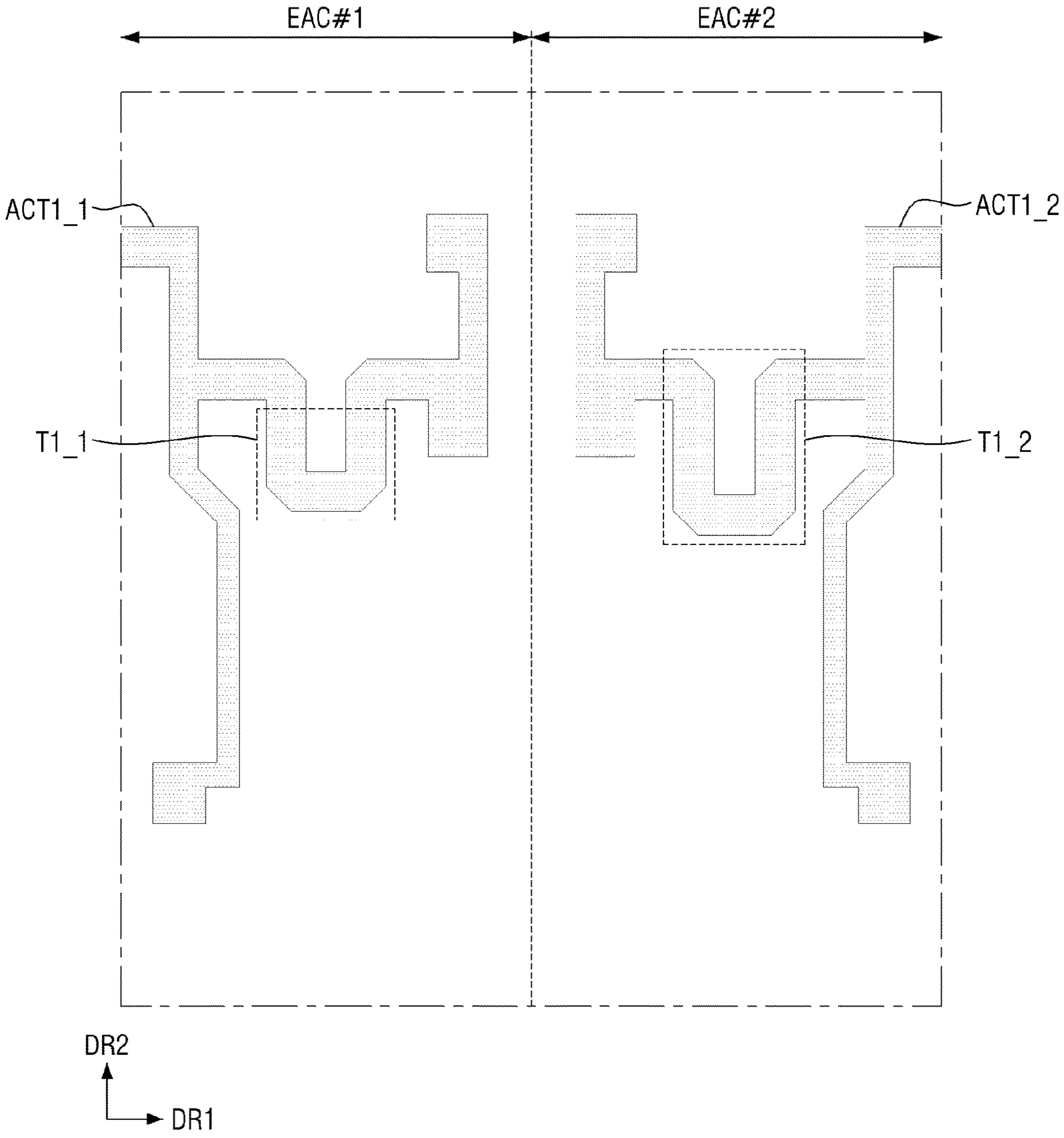
FIG. 23 is a plan view illustrating a semiconductor layer of one main pixel of the display device according to some embodiments.

FIG. 23 is a plan view illustrating a semiconductor layer of one main pixel of the display device according to some embodiments.

Referring to FIG. 23, the display device 10 may include an independent pixel circuit unit EAC #1 electrically connected to the independent pixel electrodes AE #1 and a connected pixel circuit unit EAC #2 electrically connected to the connected pixel electrodes AE #2 as pixel circuit units EAC #1 and EAC #2 located in the main display area MDA. A first semiconductor layer ACT1_1 of the independent pixel circuit unit EAC #1 may include a channel layer of a first transistor T1_1, which is a driving transistor. The channel layer of the first transistor T1_1 of the independent pixel circuit unit EAC #1 may have the same structure as that described above with reference to FIGS. 9 to 11. A first semiconductor layer ACT1_2 of the connected pixel circuit unit EAC #2 may also include a channel layer of a first transistor T1_2, which is a driving transistor. According to some embodiments, the channel layer of the first transistor T1_2 of the connected pixel circuit unit EAC #2 may be longer than the channel layer of the first transistor T1_1 of the independent pixel circuit unit EAC #1. The channel layer of the first transistor T1_2 of the connected pixel circuit unit EAC #2 may have a greater length in order to transfer light emitting signals to two light emitting elements, for example, light emitting elements located in the main display area MDA and the sub-display area SDA.

Figure 24:
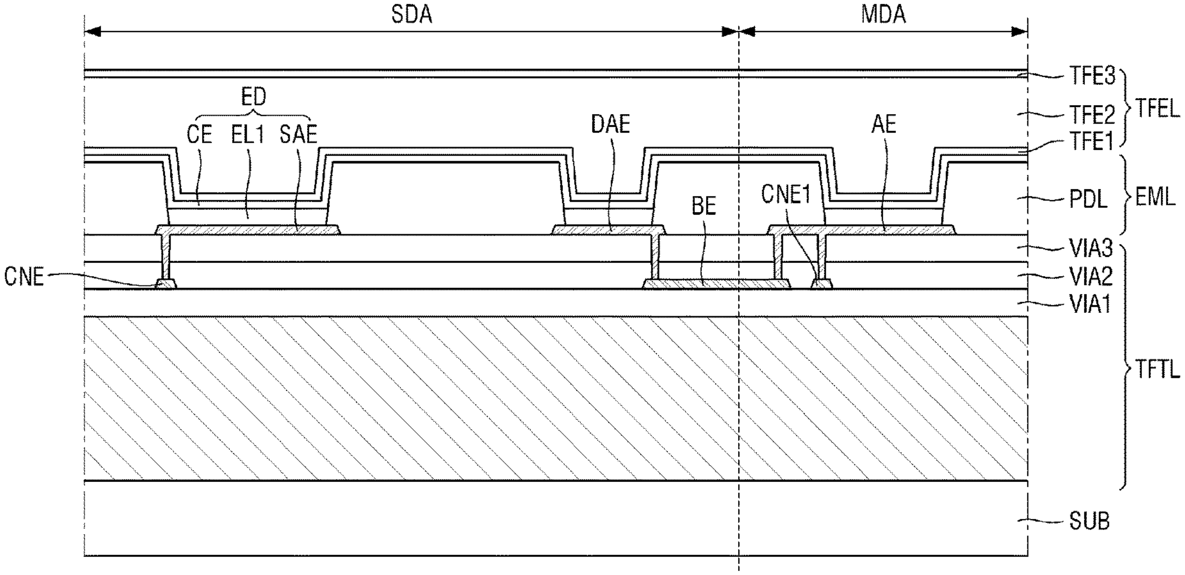
FIG. 24 is a cross-sectional view illustrating a portion of a display device according to some embodiments.

FIG. 24 is a cross-sectional view illustrating a portion of a display device according to some embodiments.

Referring to FIG. 24, in a display device 10 according to some embodiments, the connection electrode BE connecting the main pixel electrode AE and the dummy pixel electrode DAE to each other may be located at a different layer from the pixel electrodes. As an example, the connection electrode BE may be located at the same layer as the second data conductive layer. The connection electrode BE may be directly located on the first via layer VIA1, and the main pixel electrode AE and the dummy pixel electrode DAE may be connected to the connection electrode BE through contacts holes penetrating through the second via layer VIA2 and the third via layer VIA3. However, embodiments according to the present disclosure are not limited thereto, and the connection electrode BE may also be directly located on the second via layer VIA2.

The connection electrode BE is located at a layer below the pixel electrodes, and accordingly, an interval between the main pixel electrodes AE, an interval between the main pixel electrode AE and the dummy pixel electrode DAE, and an interval between the dummy pixel electrodes DAE on the third via layer VIA3 may be the same as each other. The main pixel electrodes AE and the dummy pixel electrodes DAE may have the same arrangement. The connection electrodes BE are not located at the same layer as the main pixel electrodes AE and the dummy pixel electrodes DAE between the main pixel electrodes AE and the dummy pixel electrodes DAE, and accordingly, patterns adjacent to the pixel electrodes AE and DAE at the same layer as the pixel electrodes AE and DAE may be other pixel electrodes AE and DAE. In the display device 10, patterns of the main pixel electrodes AE and the dummy pixel electrode DAE located on the third via layer VIA3 may be formed at equal intervals. Meanwhile, the light emitting elements ED1, ED2, and ED3 including the dummy pixel electrodes DAE may also emit the light of the first color, the second color, or the third color, respectively. An arrangement of the dummy pixel electrodes DAE may be changed depending on a type of light emitted from emission areas of an adjacent main pixel MPX and sub-pixel SPX.

Figure 25:
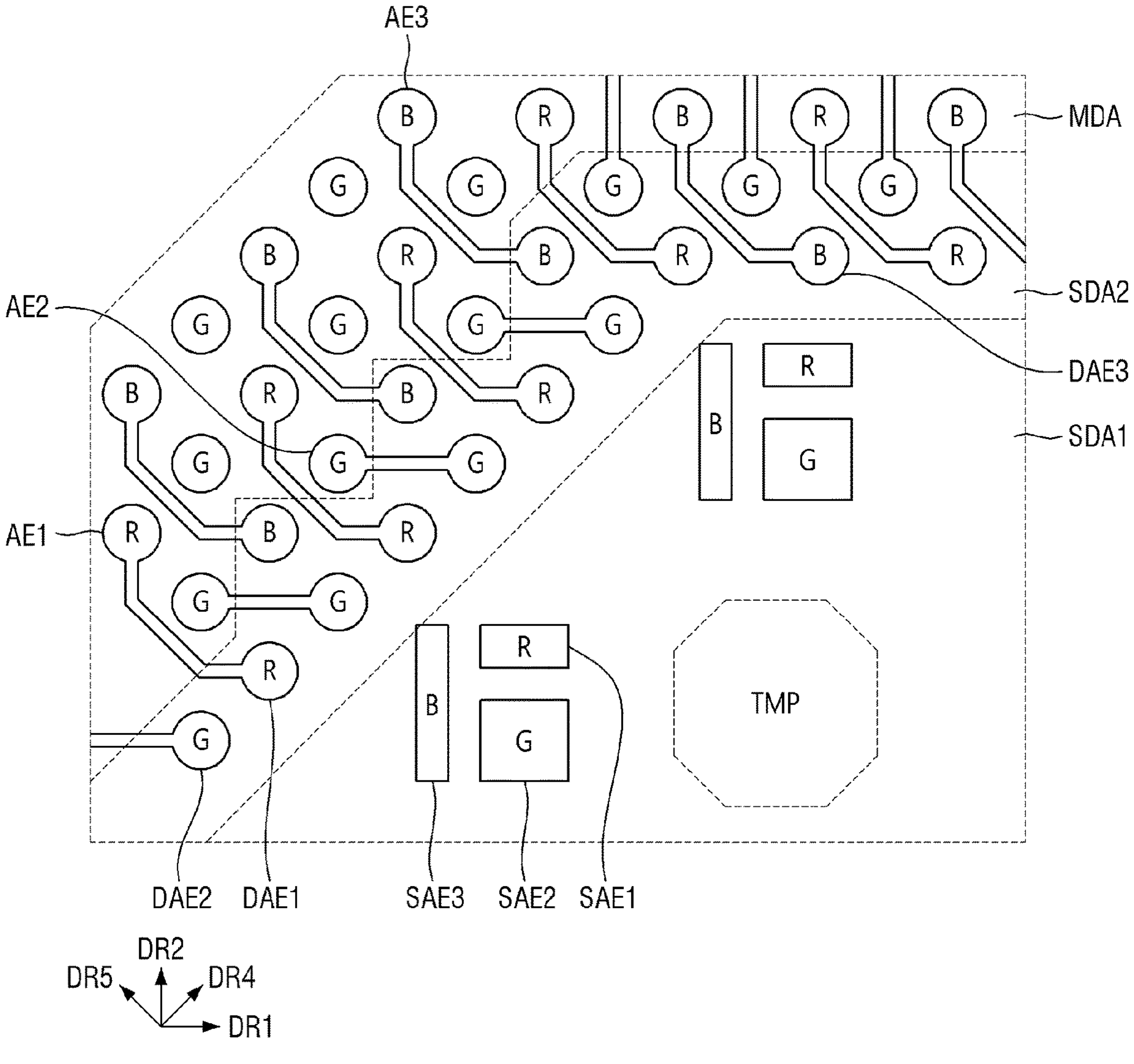
FIGS. 25 to 27 are plan views illustrating arrangements of pixel electrodes and connection electrodes of the display device according to some embodiments.
Figure 26:
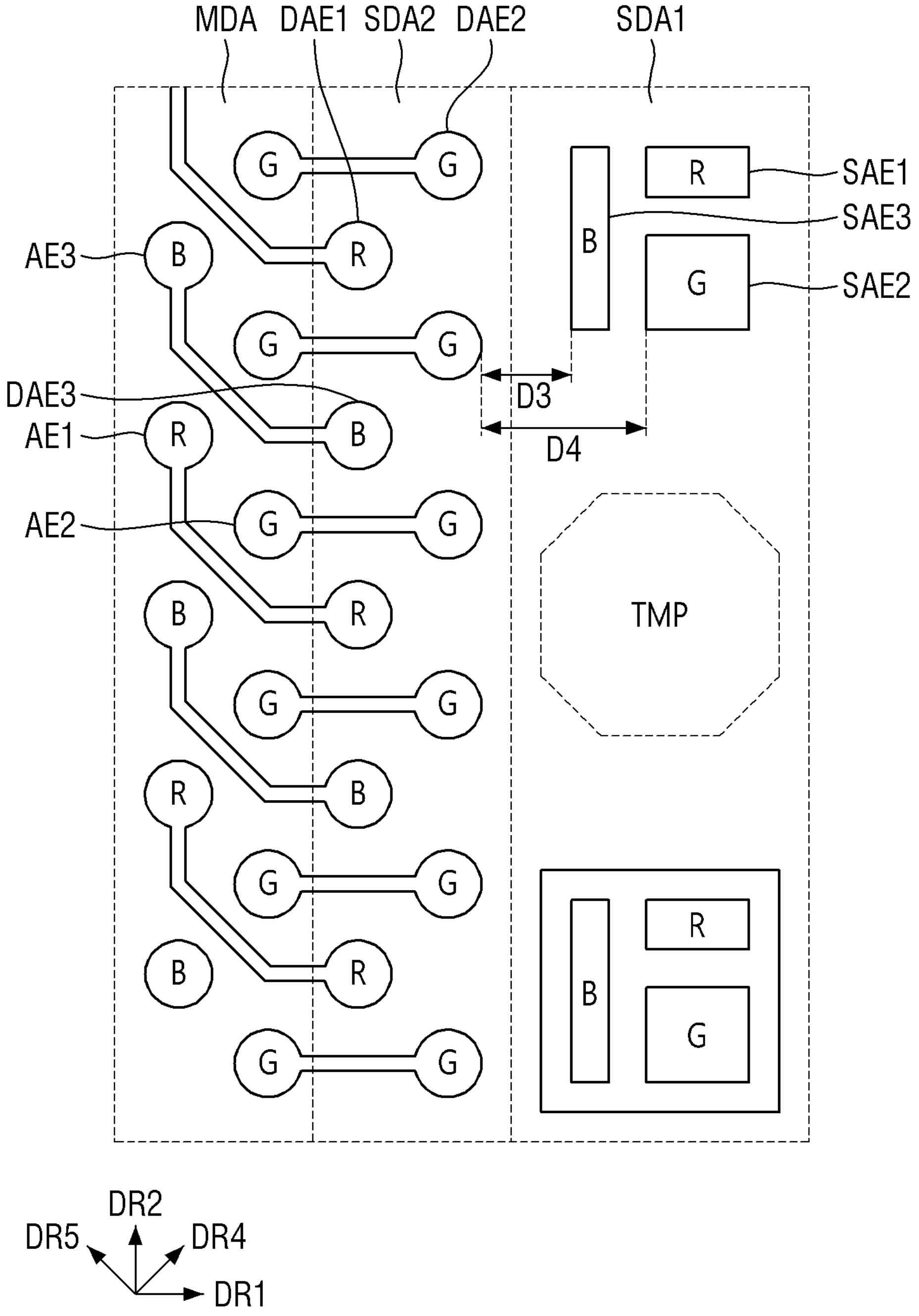
Figure 27:
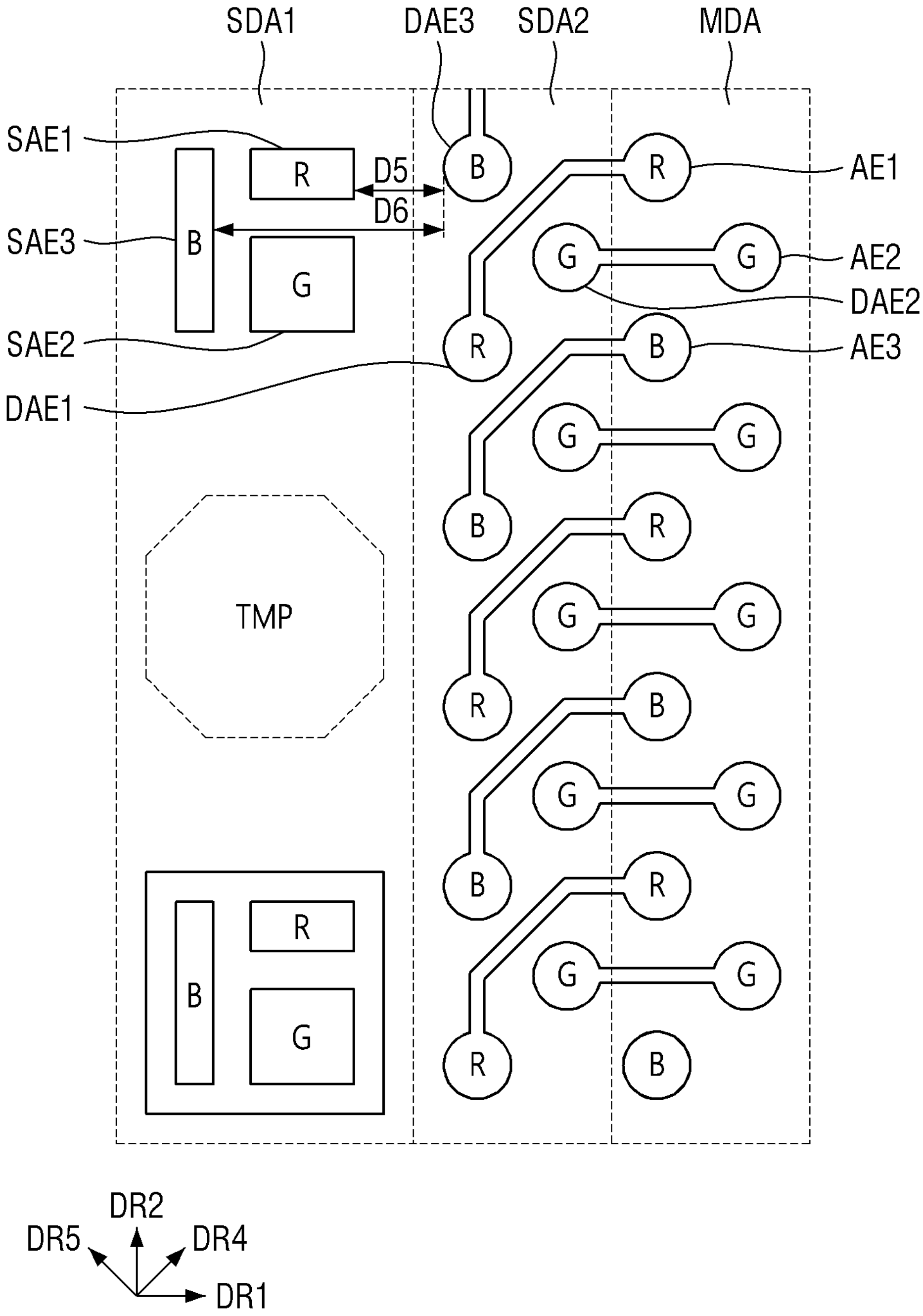

FIGS. 25 to 27 are plan views illustrating arrangements of pixel electrodes and connection electrodes of the display device according to some embodiments. FIGS. 25 to 27 illustrate arrangements of dummy pixel electrodes DAE located on the upper left side, the left side, and the right side of the sub-display area SDA, respectively.

Referring to FIGS. 25 to 27, arrangements of the main pixel electrodes AE and the dummy pixel electrodes DAE may be substantially the same as each other. For example, the main pixel electrodes AE and the dummy pixel electrodes DAE may be spaced apart from other adjacent pixel electrodes in the fourth direction DR4 or the fifth direction DR5. However, an arrangement of the sub-pixel electrodes SAE may be different from the arrangements of the main pixel electrodes AE and the dummy pixel electrodes DAE. In the sub-pixel SPX, the first sub-emission area SEA1 emitting the light of the first color and the second sub-emission area SEA2 emitting the light of the second color may be located on the right side, and the third sub-emission area SEA3 emitting the light of the third color may be located on the left side. The first sub-emission area SEA1 may be located on the upper side of the second sub-emission area SEA2.

According to some embodiments, an arrangement of the dummy pixel electrodes DAE may be different according to an arrangement of the sub-emission areas SEA1, SEA2, and SEA3 in an adjacent sub-pixel SPX. Arrangements of the sub-pixel electrodes SAE and the dummy pixel electrodes DAE may be determined so that the sub-emission areas SEA and the dummy emission areas DEA adjacent to each other emit light of different colors.

For example, as illustrated in FIG. 25, in the sub-pixel SPX located in the sub-display area SDA, emission areas located on the left side and the upper side may be the third sub-emission area SEA3 and the first sub-emission area SEA1. Correspondingly, in a second sub-display area SDA2 located on the upper left side of the first sub-display area SDA1, the second dummy pixel electrodes DAE2 may be located at a high density at a boundary with the first sub-display area SDA1. The first dummy pixel electrodes DAE1 or the third dummy pixel electrodes DAE3 may be located between the second dummy pixel electrodes DAE2. The second dummy pixel electrodes DAE2 may be located more adjacent to the first sub-pixel electrodes SAE1 and the third sub-pixel electrodes SAE3 emitting light of a different color from the second dummy pixel electrodes DAE2 than to the second sub-pixel electrodes SAE2 emitting light of the same color as the second dummy pixel electrodes DAE2.

As illustrated in FIGS. 26 and 27, the first sub-pixel electrode SAE1 and the second sub-pixel electrode SAE2 are located on the right side of the sub-pixel SPX, which is one side of the sub-pixel SPX in the first direction DR1, and the third sub-pixel electrode SAE3 is located on the left side of the sub-pixel SPX, which is the other side of the sub-pixel SPX in the first direction DR1. Correspondingly, in a second sub-display area SDA2 located on the left side of the first sub-display area SDA1 among the second sub-display areas SDA2, the second dummy pixel electrodes DAE2 may be repeatedly located adjacent to a boundary with the first sub-display area SDA1. On the other hand, in a second sub-display area SDA2 located on the right side of the first sub-display area SDA1 among the second sub-display areas SDA2, the first dummy pixel electrodes DAE1 and the third dummy pixel electrodes DAE3 may be alternately located adjacent to a boundary with the first sub-display area SDA1.

Dummy pixel electrodes DAE located adjacent to the left boundary of the first sub-display area SDA1 among boundaries between the first sub-display area SDA1 and the second sub-display areas SDA2 may be the second dummy pixel electrodes DAE2, and dummy pixel electrodes DAE located adjacent to the right boundary of the first sub-display area SDA1 among the boundaries between the first sub-display area SDA1 and the second sub-display areas SDA2 may be the first dummy pixel electrodes DAE1 or the third dummy pixel electrodes DAE3. The dummy pixel electrodes located adjacent to the first sub-display area SDA1 on the left side and the right side of the first sub-display area SDA1 may be different dummy pixel electrodes.

In addition, in the second sub-display area SDA2, an interval D3 between the second dummy pixel electrode DAE2 and the third sub-pixel electrode SAE3 adjacent to the second dummy pixel electrode DAE2 may be smaller than an interval D4 between the second dummy pixel electrode DAE2 and the second sub-pixel electrode SEA2 adjacent to the second dummy pixel electrode DAE2. In addition, in the second sub-display area SDA2, an interval D5 between the third dummy pixel electrode DAE3 and the first sub-pixel electrode SAE1 adjacent to the third dummy pixel electrode DAE3 may be smaller than an interval D6 between the third dummy pixel electrode DAE3 and the third sub-pixel electrode SEA3 adjacent to the third dummy pixel electrode DAE3. The display device 10 according to some embodiments may include the plurality of dummy pixel electrodes DAE as the light emitting elements located in the second sub-display area SDA2 to prevent or reduce visibility of the boundary between the main display area MDA and the sub-display area SDA due to a difference in density of light emitting elements between the main display area MDA and the sub-display area SDA.

What is claimed is:

1. A display device comprising:

a main display area and a sub-display area surrounded by the main display area and having a plurality of transmission parts;

a plurality of main pixel electrodes in the main display area;

a plurality of sub-pixel electrodes in the sub-display area and a plurality of dummy pixel electrodes in the sub-display area and electrically connected to any one of the main pixel electrodes, respectively; and a plurality of connection electrodes connecting any one of the plurality of main pixel electrodes and any one of the plurality of dummy pixel electrodes to each other, respectively, wherein the sub-display area includes a first sub-display area in which the transmission parts and the sub-pixel electrodes are located and a second sub-display area which surrounds the first sub-display area and in which the sub-pixel electrodes and the dummy pixel electrodes are located, at least portions of the plurality of connection electrodes are between the dummy pixel electrodes adjacent to each other or between a dummy pixel electrode and the main pixel electrode adjacent to the dummy pixel electrode, a planer shape of each of the sub-pixel electrodes in the first sub-display area is different from a planer shape of each of the dummy pixel electrodes in the second sub-display area, and at least one connection electrode of the plurality of connection electrodes has a first portion and a second portion, the first portion and the second portion extending in directions perpendicular to each other.

2. The display device of claim 1, wherein an interval between the main pixel electrodes adjacent to each other and an interval between the dummy pixel electrodes adjacent to each other is greater than an interval between a dummy pixel electrode from among the dummy pixel electrodes and another connection electrode that is not connected to the dummy pixel electrode.

3. The display device of claim 1, wherein an arrangement in which the plurality of main pixel electrodes and the plurality of dummy pixel electrodes are spaced apart from each other is different from an arrangement in which the plurality of sub-pixel electrodes are spaced apart from each other.

4. The display device of claim 1, wherein the plurality of main pixel electrodes overlap a pixel circuit unit electrically connected to the main pixel electrodes, the plurality of sub-pixel electrodes overlap a sub-pixel circuit unit electrically connected to the sub-pixel electrodes, and the dummy pixel electrodes do not overlap the pixel circuit unit and the sub-pixel circuit unit.

5. The display device of claim 1, wherein the main pixel electrodes include a first main pixel electrode of a light emitting element emitting light of a first color and a second main pixel electrode of a light emitting element emitting light of a second color different from the first color, the dummy pixel electrodes include a first dummy pixel electrode connected to the first main pixel electrode and in a light emitting element emitting the light of the first color and a second dummy pixel electrode connected to the second main pixel electrode and in a light emitting element emitting the light of the second color, and an interval between the first main pixel electrode and the first dummy pixel electrode is greater than an interval between the first main pixel electrode and the second dummy pixel electrode.

6. The display device of claim 5, wherein the sub-pixel electrodes include a first sub-pixel electrode of a light emitting element configured to emit the light of the first color and a second sub-pixel electrode of a light emitting element configured to emit the light of the second color, and an interval between the first sub-pixel electrode and the first dummy pixel electrode is greater than an interval between the second sub-pixel electrode and the first dummy pixel electrode.

7. The display device of claim 1, wherein the main pixel electrodes include a first main pixel electrode, a second main pixel electrode, and a third main pixel electrode spaced apart from the first main pixel electrode in a first direction, the dummy pixel electrodes include a first dummy pixel electrode spaced apart from the third main pixel electrode in a second direction and connected to the first main pixel electrode through a first connection electrode and a second dummy pixel electrode spaced apart from the second main pixel electrode in the second direction and connected to the second main pixel electrode through a second connection electrode, and the first connection electrode is spaced apart from the second dummy pixel electrode in the second direction.

8. The display device of claim 7, wherein the second connection electrode is between the second main pixel electrode and the second dummy pixel electrode.

9. The display device of claim 7, wherein the dummy pixel electrodes further include a third dummy pixel electrode spaced apart from the first main pixel electrode in the second direction and connected to the third main pixel electrode through a third connection electrode, and the third connection electrode surrounds the first dummy pixel electrode.

10. The display device of claim 7, wherein a dummy pixel electrode adjacent to a boundary at one side of the first sub-display area in the first direction among boundaries between the first sub-display area and the second sub-display area and a dummy pixel electrode adjacent to a boundary at the other side of the first sub-display area in the first direction among the boundaries between the first sub-display area and the second sub-display area are different from each other.

11. The display device of claim 1, wherein the plurality of main pixel electrodes include a plurality of connected pixel electrodes electrically connected to the dummy pixel electrodes and a plurality of independent pixel electrodes that are not connected to the dummy pixel electrodes, and a channel region of a first transistor of a pixel circuit unit electrically connected to the independent pixel electrode has a length different from that of a channel region of a first transistor of a pixel circuit unit electrically connected to the connected pixel electrode.

12. The display device of claim 11, wherein the connected pixel electrodes surround the sub-display area, and the independent pixel electrodes surround the connected pixel electrodes.

13. The display device of claim 1, wherein the sub-display area includes a plurality of sub-pixels including the sub-pixel electrodes, and any one of the transmission parts is between the plurality of sub-pixels spaced apart from each other in one direction.

14. The display device of claim 13, wherein the transmission parts include first transmission parts within the first sub-display area and second transmission parts in contact with the second sub-display area at a boundary between the first sub-display area and the second sub-display area, and an area of the first transmission part is greater than an area of the second transmission part.

15. A display device comprising:

a substrate including a main display area and a sub-display area surrounded by the main display area and having a plurality of transmission parts;

a thin film transistor layer including a pixel circuit unit in the main display area on the substrate, a sub-pixel circuit unit not overlapping the transmission parts in the sub-display area on the substrate, and a via layer on the pixel circuit unit and the sub-pixel circuit unit;

a plurality of main pixel electrodes on the via layer and spaced apart from each other in the main display area;

a plurality of sub-pixel electrodes and a plurality of dummy pixel electrodes on the via layer and spaced apart from each other in the sub-display area and a plurality of connection electrodes electrically connected to any one of the plurality of dummy pixel electrodes and any one of the plurality of main pixel electrodes, respectively;

a plurality of light emitting layers on the main pixel electrodes, the sub-pixel electrodes, and the dummy pixel electrodes, respectively; and a common electrode on the plurality of light emitting layers, wherein the main pixel electrodes overlap the pixel circuit unit, the sub-pixel electrodes overlap the sub-pixel circuit unit, and the dummy pixel electrodes do not overlap the pixel circuit unit and the sub-pixel circuit unit, wherein the sub-display area includes a first sub-display area in which the sub-pixel electrodes and the transmission parts are located and a second sub-display area surrounding the first sub-display area and in which the sub-pixel electrodes and the dummy pixel electrodes are located, the dummy pixel electrodes surround the first sub-display area, a planer shape of each of the sub-pixel electrodes in the first sub-display area is different from a planer shape of each of the dummy pixel electrodes in the second sub-display area, and at least one connection electrode of the plurality of connection electrodes has a first portion and a second portion, the first portion and the second portion extending in directions perpendicular to each other.

16. The display device of claim 15, wherein the thin film transistor layer includes a lower metal layer on the substrate and including a plurality of opening patterns overlapping the transmission parts, and the transmission parts include first transmission parts within the first sub-display area and second transmission parts in contact with the second sub-display area and having a smaller area than the first transmission parts.

17. The display device of claim 15, wherein the thin film transistor layer further includes:

a lower metal layer on the substrate;

a buffer layer on the lower metal layer;

a first semiconductor layer on the buffer layer;

a gate insulating layer on the first semiconductor layer;

a gate conductive layer on the gate insulating layer;

an interlayer insulating layer on the gate conductive layer; and a data conductive layer on the interlayer insulating layer, and the via layer is on the data conductive layer.

18. The display device of claim 17, wherein the lower metal layer overlaps the pixel circuit unit and the sub-pixel circuit unit, and does not overlap the transmission parts.

19. The display device of claim 17, wherein the first semiconductor layer, the gate insulating layer, the gate conductive layer, the interlayer insulating layer, and the data conductive layer are not in a transmission part of the transmission parts, but only a portion of the via layer is in the transmission part.

* * * * *